United States Patent
Maresca, Jr.

(10) Patent No.: US 10,775,293 B1
(45) Date of Patent: Sep. 15, 2020

(54) MEASUREMENT-BASED, IN-SERVICE METHOD FOR UPDATING THE INTERNAL INSPECTION INTERVAL OF AN AST

(71) Applicant: Vista Precision Solutions, Inc., Richland, WA (US)

(72) Inventor: Joseph W. Maresca, Jr., Sunnyvale, CA (US)

(73) Assignee: Vista Precision Solutions, Inc., Richland, WA (US)

( * ) Notice: Subject to any disclaimer, the term of this patent is extended or adjusted under 35 U.S.C. 154(b) by 149 days.

(21) Appl. No.: 15/917,277

(22) Filed: Mar. 9, 2018

Related U.S. Application Data

(63) Continuation-in-part of application No. 15/905,227, filed on Feb. 26, 2018, and a continuation-in-part of application No. 15/707,872, filed on Sep. 18, 2017, now Pat. No. 10,495,564, and a continuation-in-part of application No. 15/490,688, filed on Apr. 18, 2017, now Pat. No. 10,345,270, and a continuation-in-part
(Continued)

(51) Int. Cl.
*G01N 17/00* (2006.01)
*G01M 3/24* (2006.01)
*G01N 29/14* (2006.01)

(52) U.S. Cl.
CPC ............. *G01N 17/00* (2013.01); *G01M 3/24* (2013.01); *G01N 29/14* (2013.01); *G01N 2291/02854* (2013.01); *G01N 2291/2695* (2013.01)

(58) Field of Classification Search
CPC . G01M 3/3263; G01M 3/3236; G01M 3/3245
See application file for complete search history.

(56) References Cited

U.S. PATENT DOCUMENTS 4,418,574 A  12/1983  Flournoy
4,918,989 A   4/1990  Desruelles et al.
(Continued)

OTHER PUBLICATIONS

United States Patent and Trademark Office, Office Action issued in U.S. Appl. No. 15/678,023, dated May 21, 2020.
(Continued)

*Primary Examiner* — Jennifer E Simmons
(74) *Attorney, Agent, or Firm* — Pillsbury Winthrop Shaw Pittman LLP

(57) ABSTRACT

Methods for quantitatively determining the time (TNI) between (1) the application of this method and (2) the time at which the next out-of-service API 653 internal inspection of a steel, field-erected, aboveground storage tank (AST) containing petroleum/water products should be performed. These methods combine four in-service measurements of the thickness, integrity, and corrosion rate of the tank bottom with an empirical corrosion rate cumulative frequency distribution (CFD) for the tank of interest to develop a Bayesian tank bottom survival probability distribution to determine TNI. During this entire TNI time period, the risk of tank bottom failure is less than at the time these methods were applied. If available, the results of a previous out-of-service API 653 internal inspection are also used. These methods can be applied at any time while the tank is in-service to update the internal inspection interval previously determined in an out-of-service internal inspection of the tank.

32 Claims, 36 Drawing Sheets

Related U.S. Application Data of application No. 14/979,307, filed on Dec. 22, 2015, now Pat. No. 10,281,387, said application No. 15/707,872 is a continuation of application No. 14/258,609, filed on Apr. 22, 2014, now Pat. No. 9,766,175, which is a continuation-in-part of application No. 14/061,484, filed on Oct. 23, 2013, now abandoned, said application No. 15/905,227 is a continuation of application No. 14/061,484, and a continuation-in-part of application No. 13/886,316, filed on May 3, 2013, now Pat. No. 9,466,880, said application No. 14/979,307 is a continuation of application No. 13/786,316, filed on Mar. 5, 2013, now Pat. No. 9,228,932, said application No. 14/258,609 is a continuation-in-part of application No. 13/783,316, filed on Mar. 3, 2013, now Pat. No. 9,367,378.

(60) Provisional application No. 62/469,401, filed on Mar. 9, 2017, provisional application No. 62/324,099, filed on Apr. 18, 2016, provisional application No. 61/814,886, filed on Apr. 23, 2013, provisional application No. 61/814,786, filed on Apr. 22, 2013, provisional application No. 61/795,737, filed on Oct. 23, 2012, provisional application No. 61/634,786, filed on Mar. 5, 2012.

(56) References Cited

U.S. PATENT DOCUMENTS

| | | |
|---|---|---|
| 5,231,866 A | 8/1993 | Peacock |
| 5,375,455 A | 12/1994 | Maresca, Jr. et al. |
| 5,499,640 A | 3/1996 | Whaley |
| 5,634,378 A | 6/1997 | Burkhardt, Jr. |
| 5,854,557 A | 12/1998 | Tiefnig |
| 6,047,241 A * | 4/2000 | Sparago ............... G21D 3/001 |
| | | 702/34 |
| 6,253,615 B1 | 7/2001 | Simmonds et al. |
| 6,556,924 B1 | 4/2003 | Kariyawasam et al. |
| 7,143,635 B1 | 12/2006 | Major |
| 7,508,223 B1 | 3/2009 | Yang et al. |
| 9,228,932 B1 | 1/2016 | Maresca, Jr. et al. |
| 9,766,175 B1 | 9/2017 | Maresca, Jr. et al. |
| 10,281,387 B2 | 5/2019 | Maresca, Jr. et al. |
| 10,495,564 B2 | 12/2019 | Maresca, Jr. et al. |
| 2002/0043973 A1 | 4/2002 | Amini et al. |
| 2005/0011278 A1 | 1/2005 | Brown et al. |
| 2005/0246112 A1 | 11/2005 | Abhulimen et al. |
| 2006/0010995 A1 | 1/2006 | Silverman |
| 2006/0101920 A1 | 5/2006 | Carnal et al. |
| 2006/0169022 A1 | 8/2006 | Sato et al. |
| 2006/0283251 A1 | 12/2006 | Hunaidl et al. |
| 2009/0158850 A1 | 6/2009 | Alleyne et al. |
| 2009/0301203 A1 * | 12/2009 | Brussieux ............ G01N 29/225 |
| | | 73/627 |
| 2010/0212404 A1 * | 8/2010 | Wolford ............ G01M 3/3263 |
| | | 73/45.5 |
| 2011/0185814 A1 | 8/2011 | Piccolo |
| 2012/0317058 A1 | 12/2012 | Abhulimen |
| 2015/0204821 A1 | 7/2015 | Adams et al. |
| 2016/0123864 A1 | 5/2016 | Maresca, Jr. |

OTHER PUBLICATIONS

United States Patent and Trademark Office, Office Action issued in U.S. Appl. No. 15/905,227, dated May 8, 2020.

* cited by examiner

| FIG. 2A | FIG. 2B | FIG. 2C | FIG. 2D | FIG. 2E | FIG. 2F |

FIG. 2

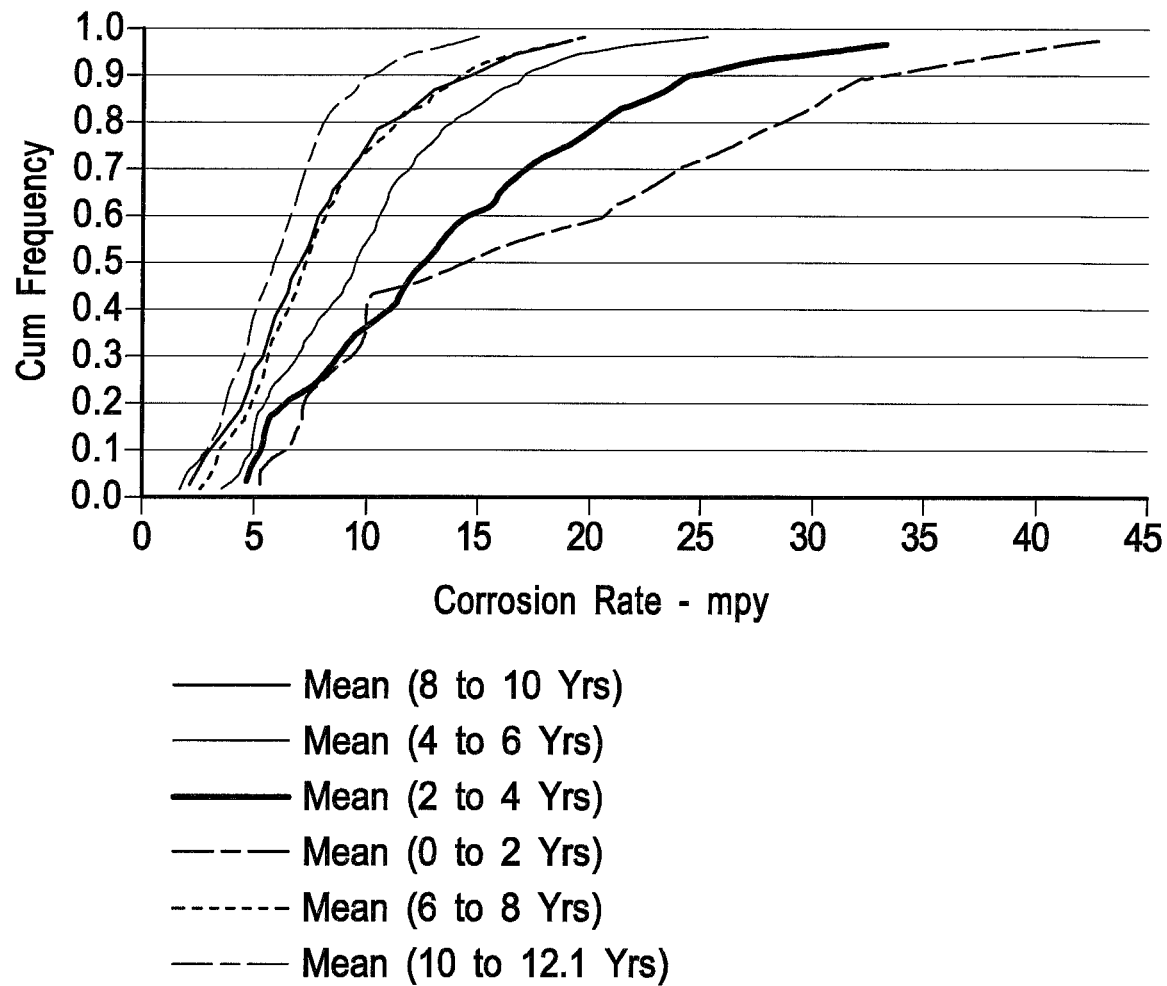
FIG. 7.1

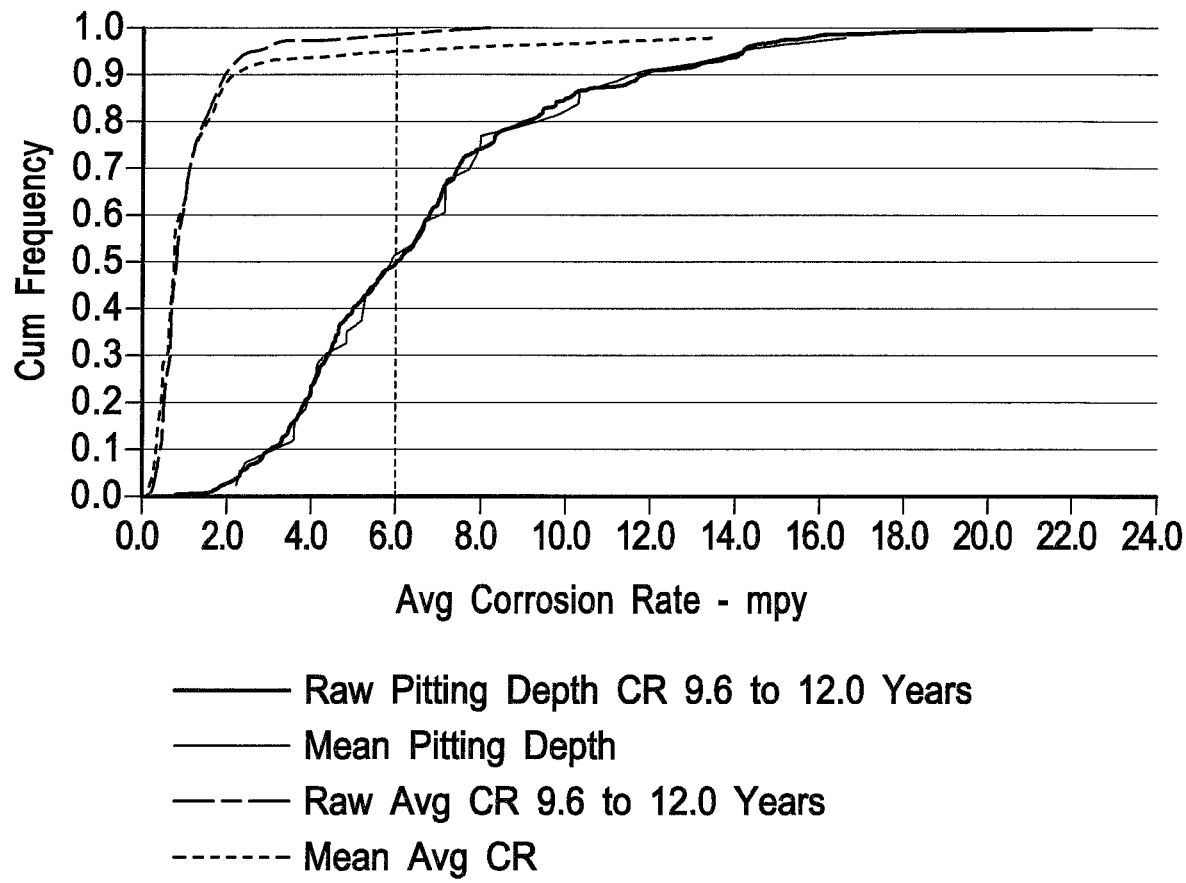
FIG. 7.2

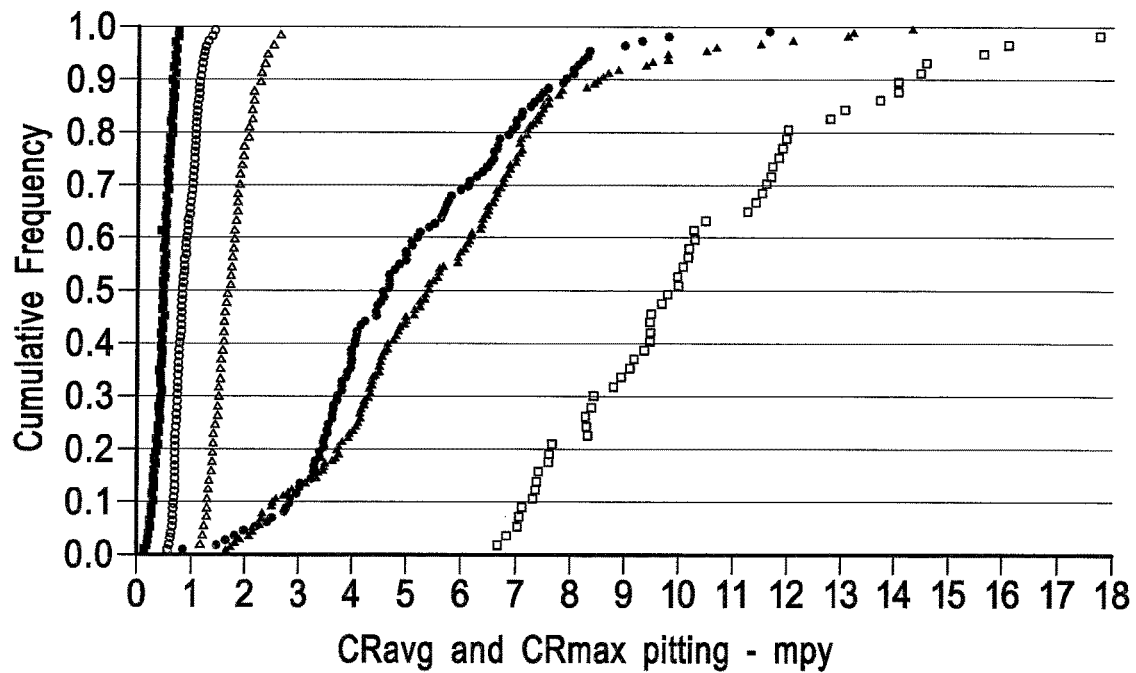
FIG. 8.1

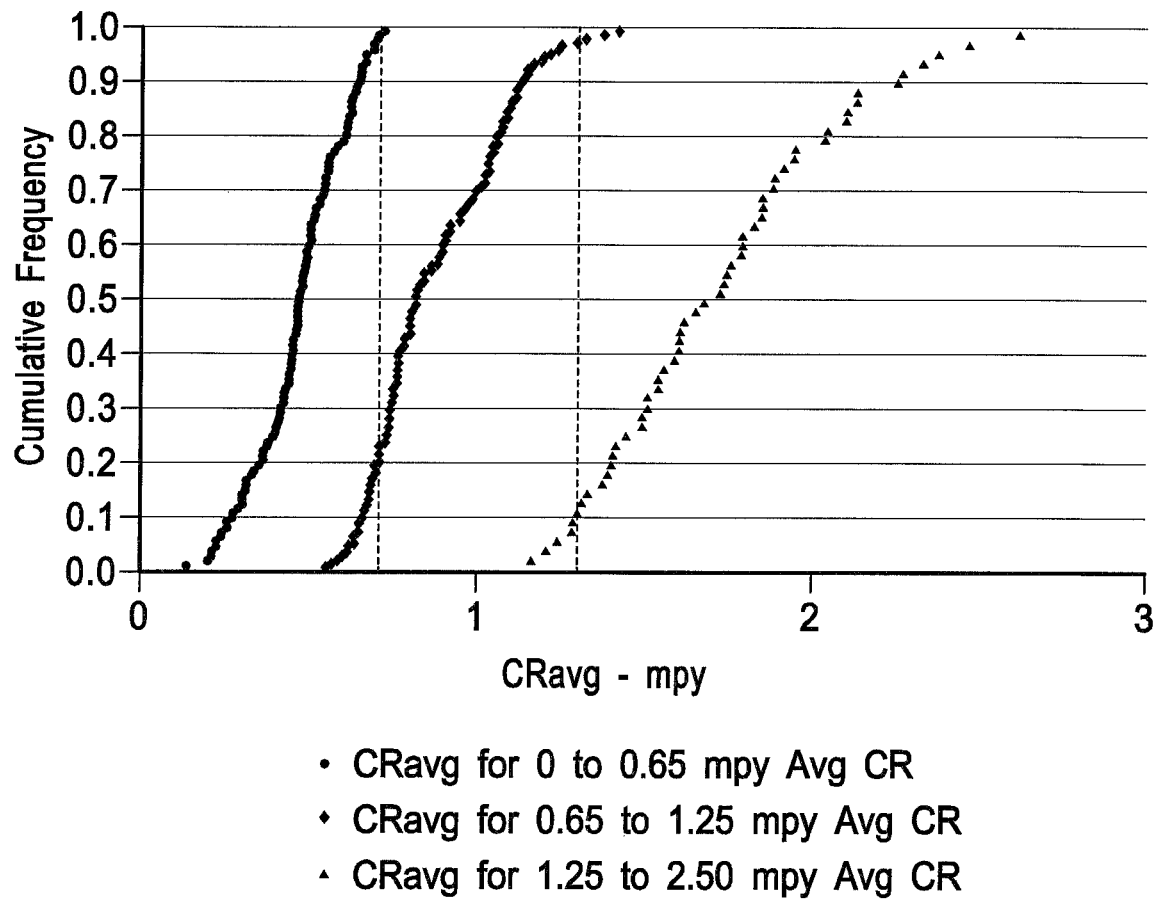
FIG. 8.2

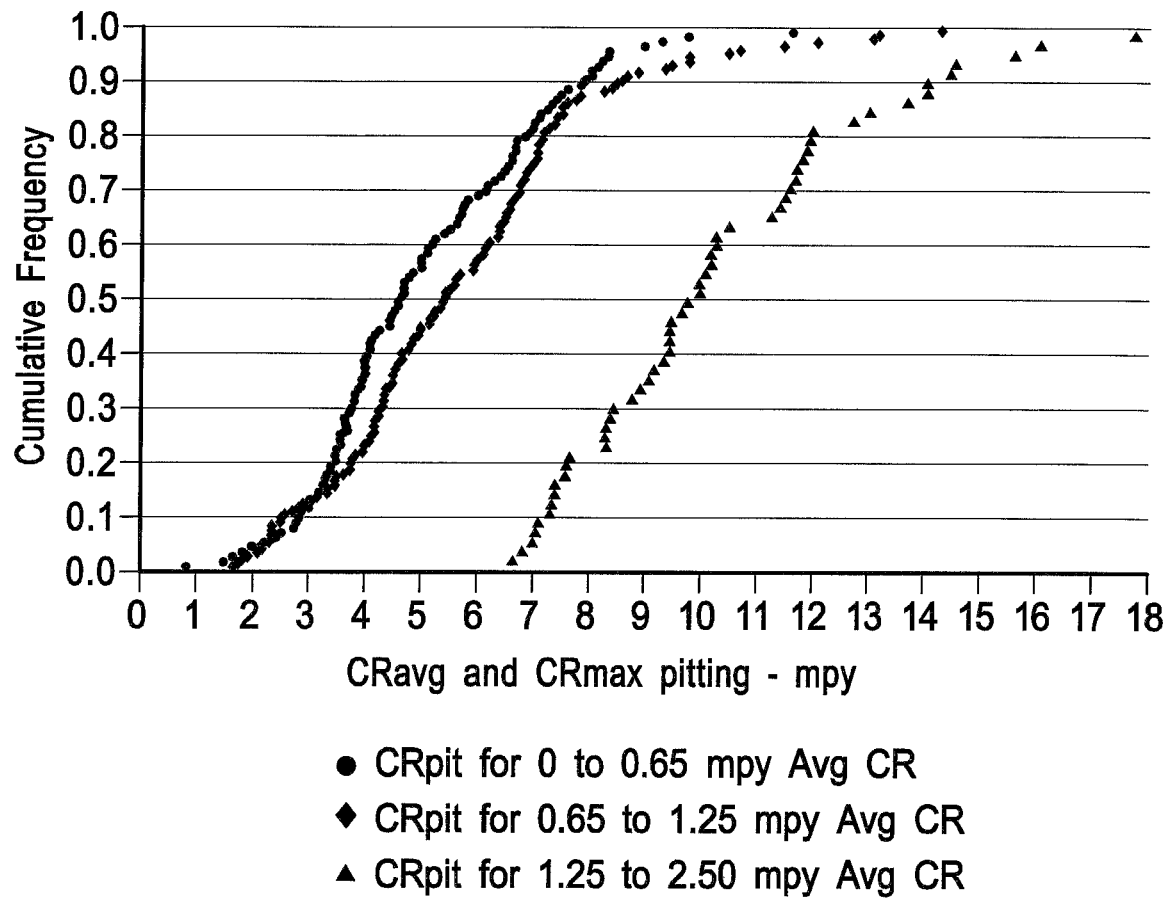
FIG. 8.3

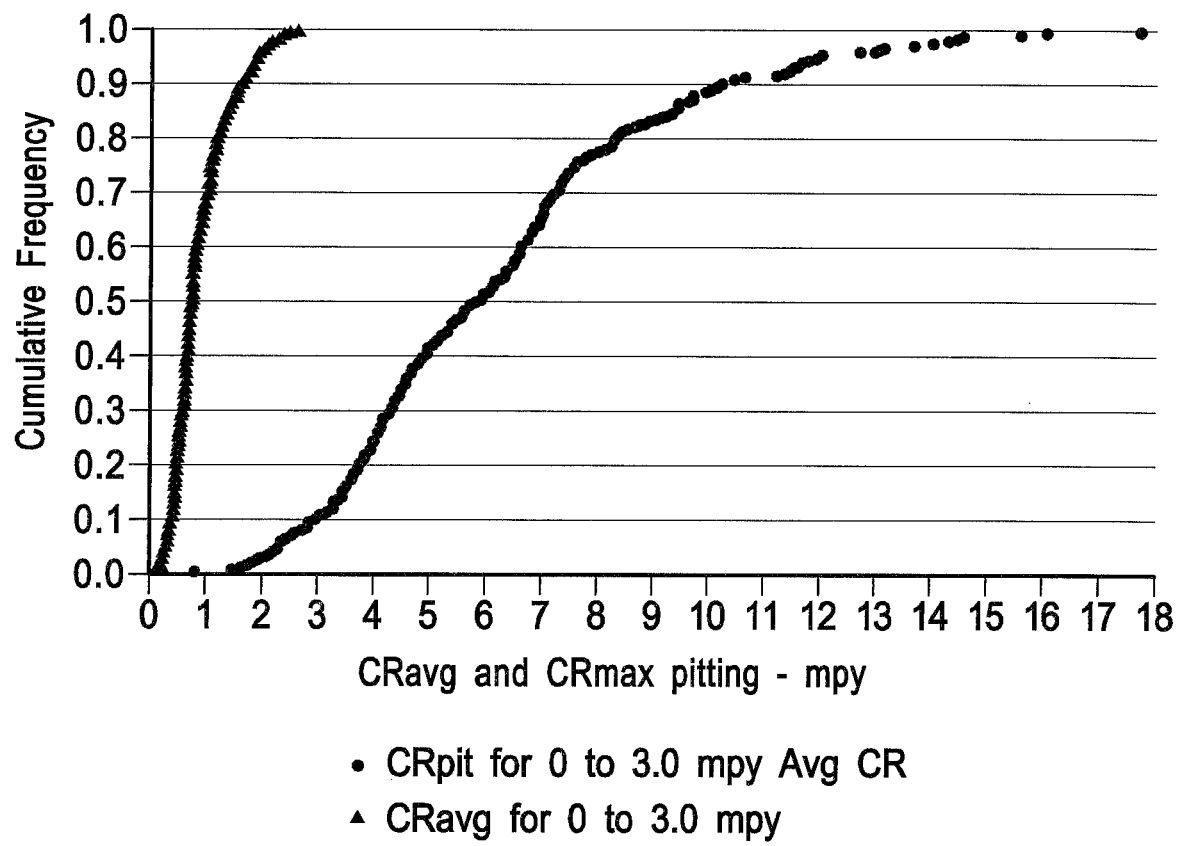
FIG. 8.4

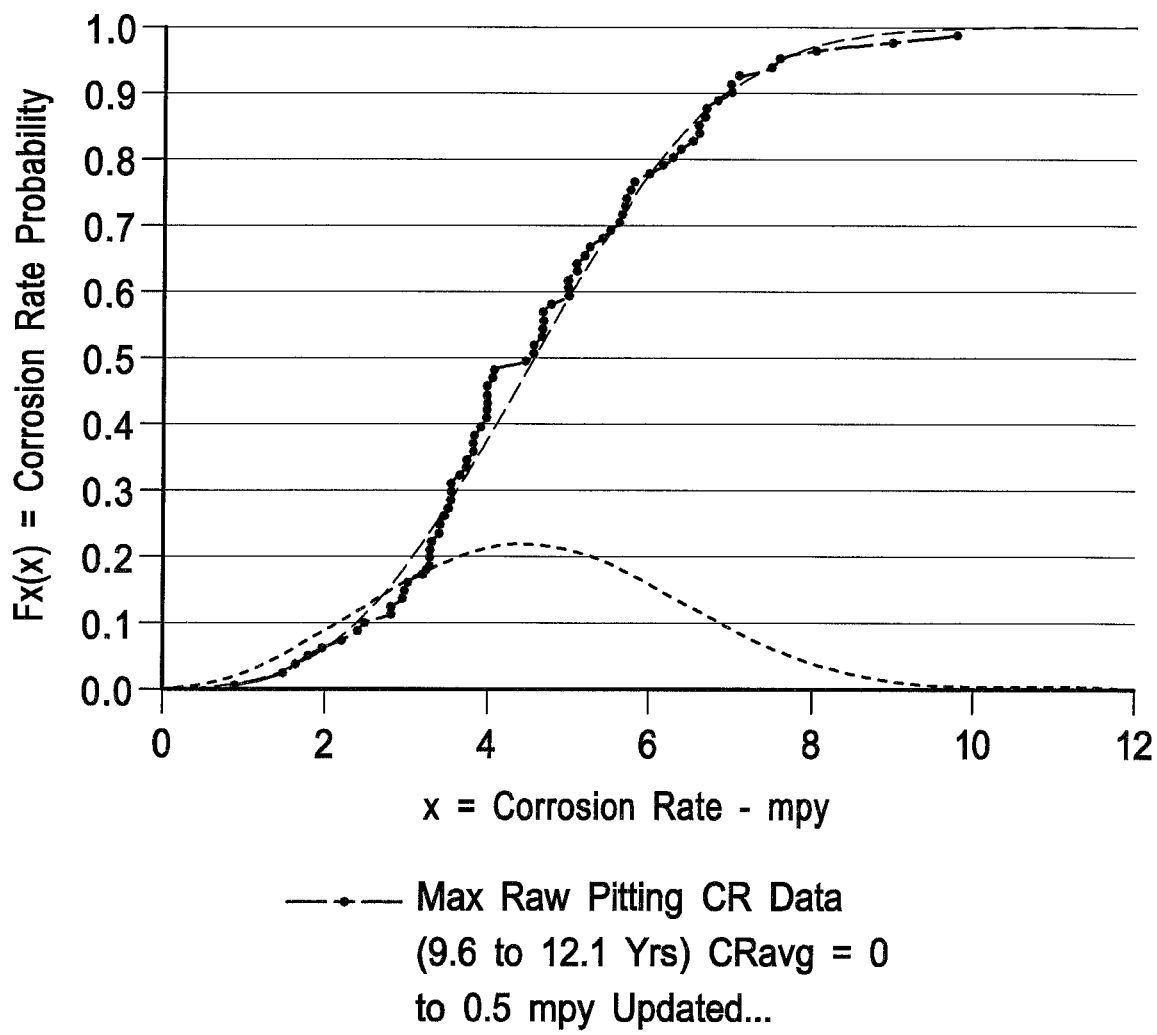
FIG. 8.5

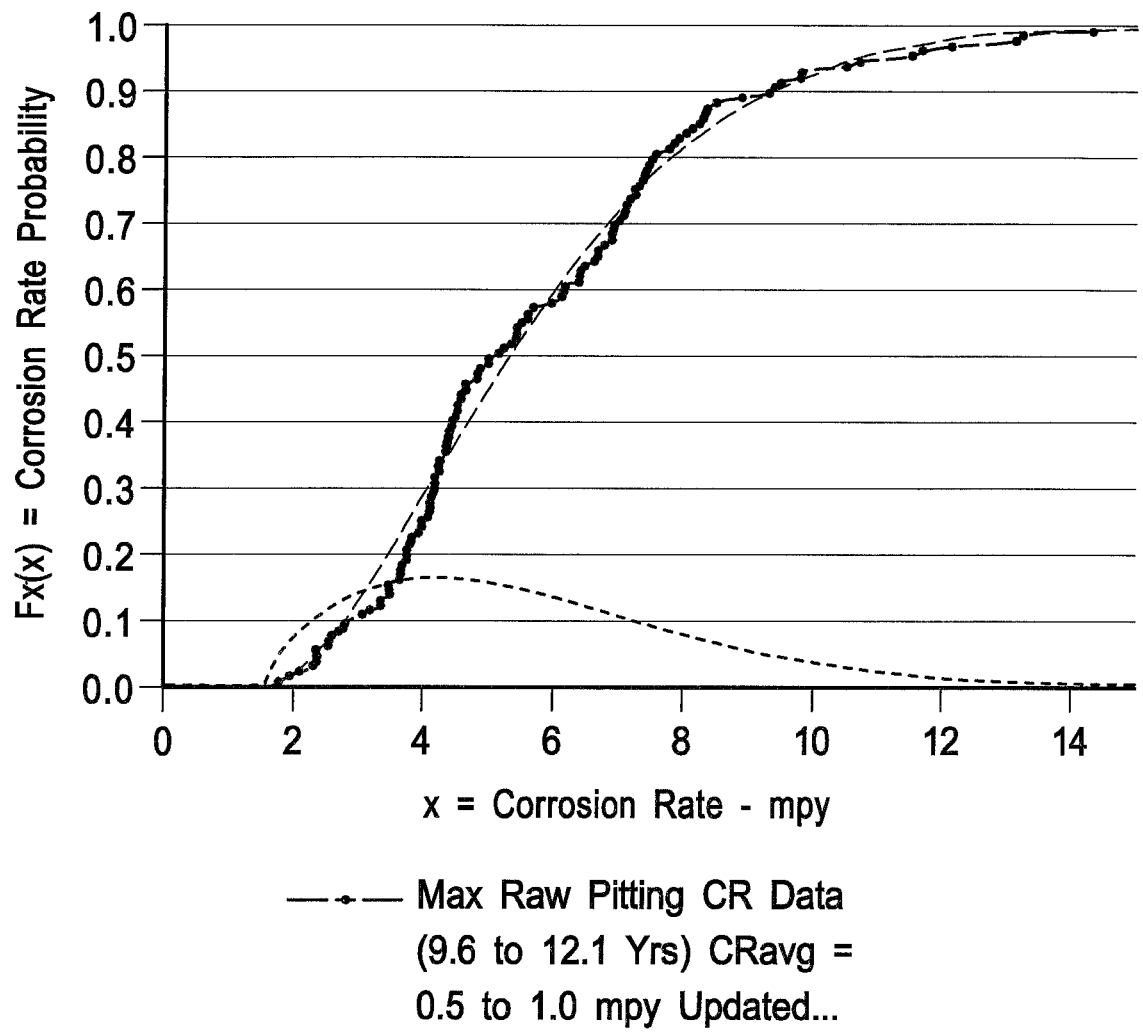
FIG. 8.6

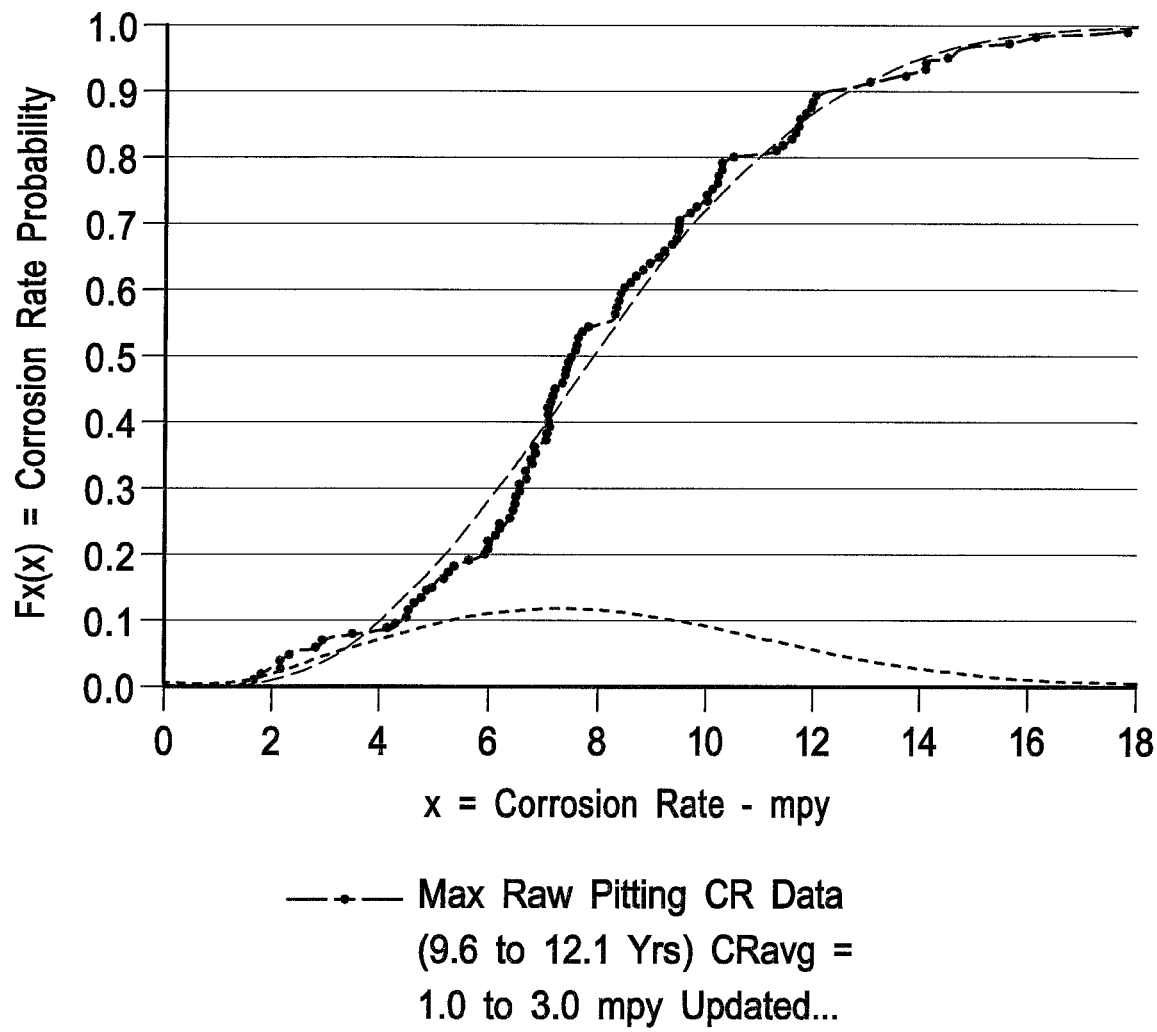
FIG. 8.7

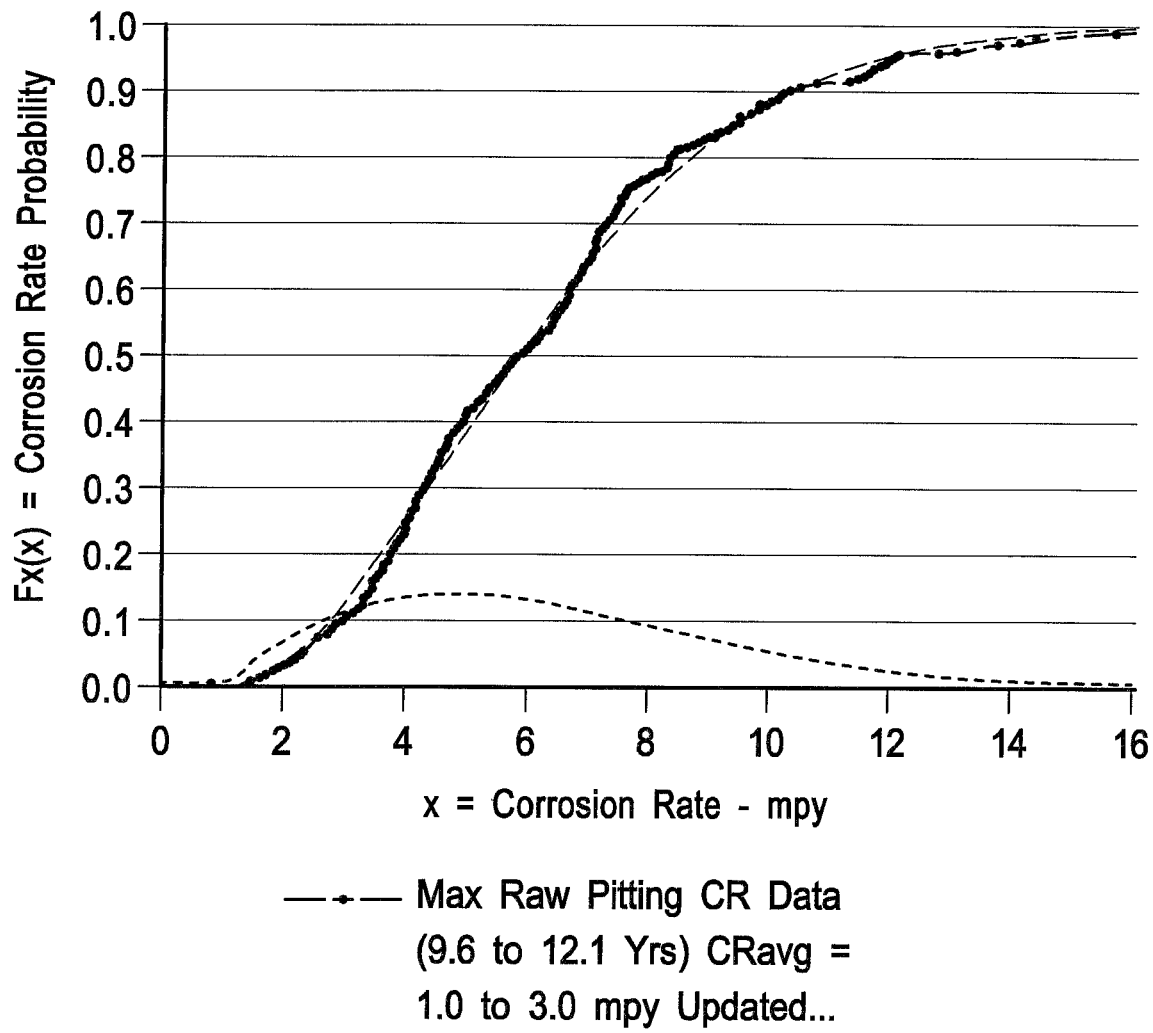
FIG. 8.8

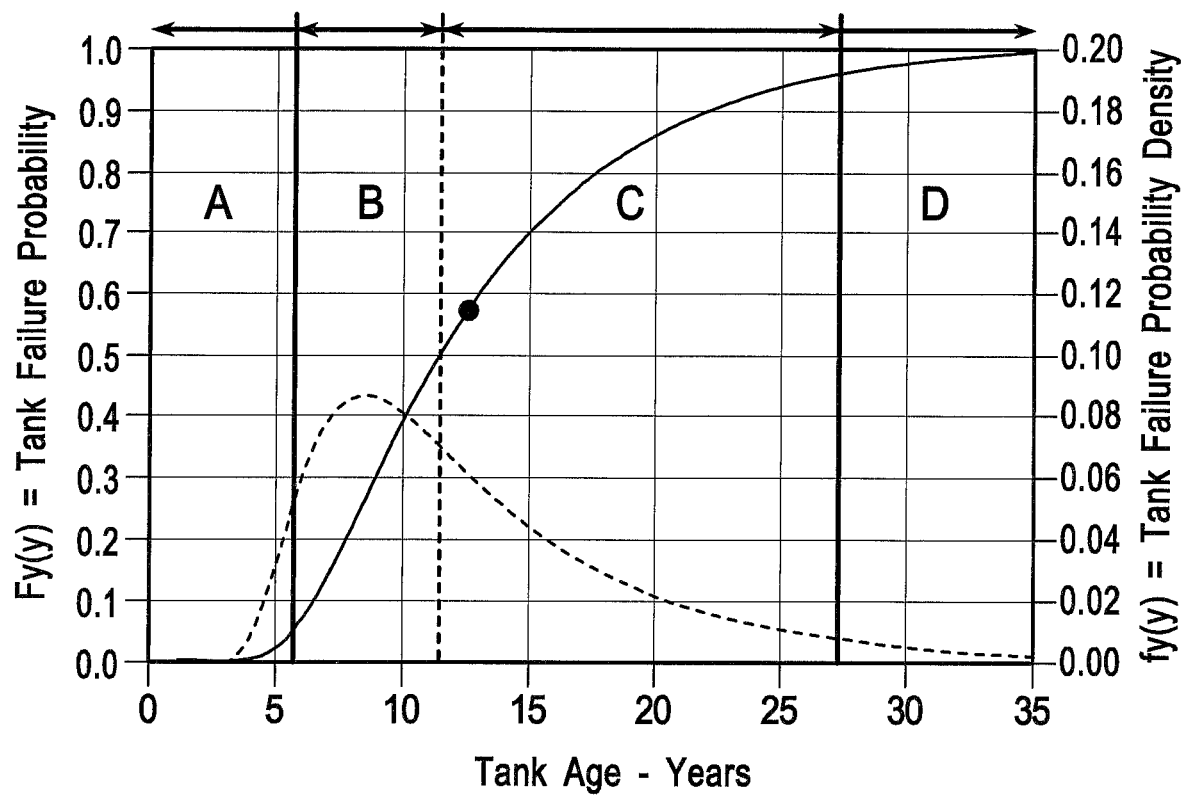
FIG. 9.1

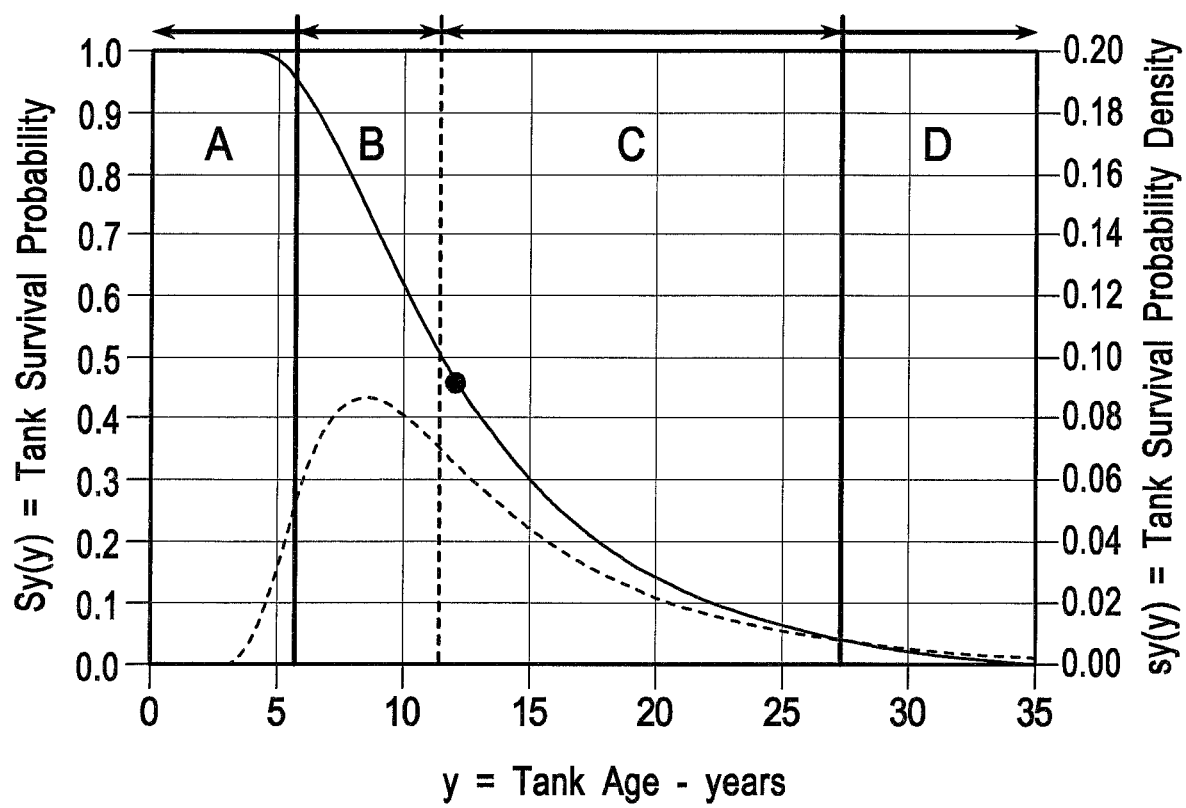
FIG. 9.2

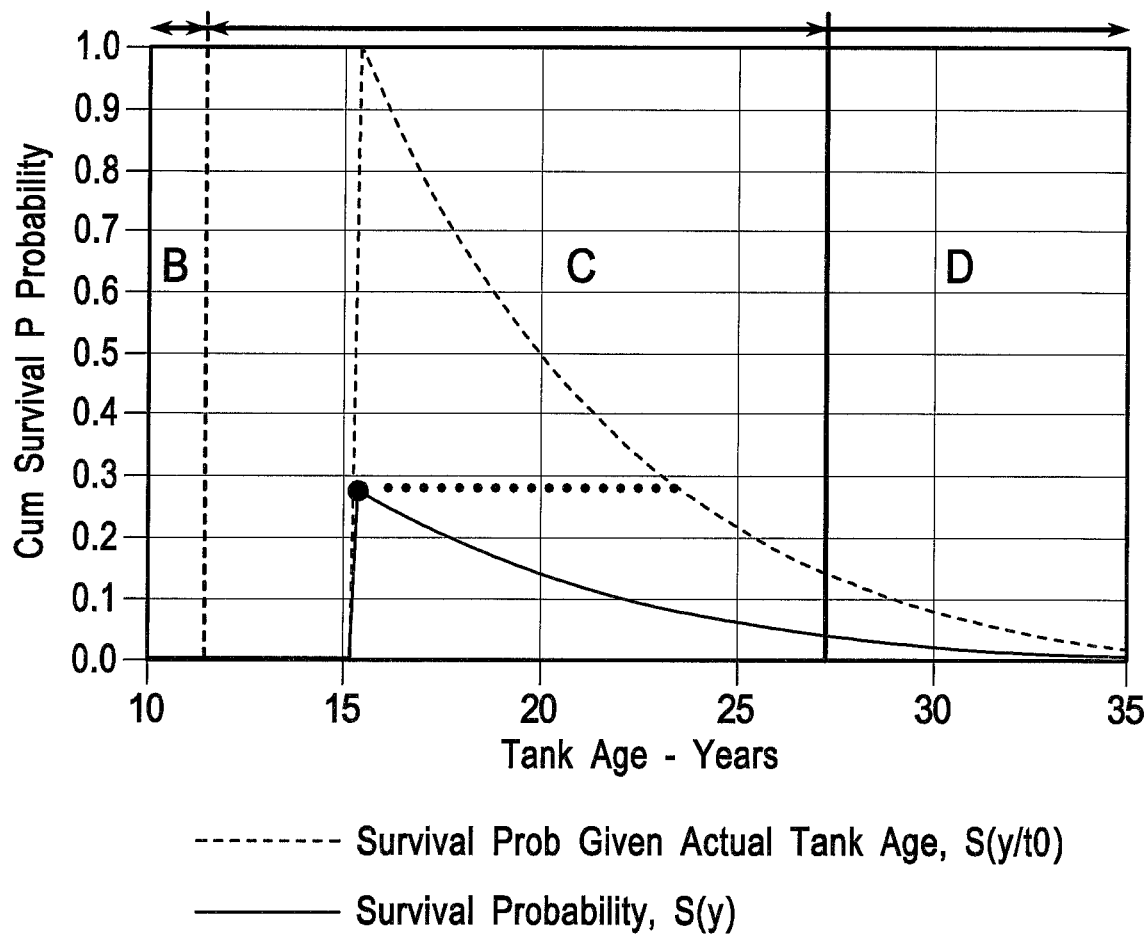
FIG. 9.3

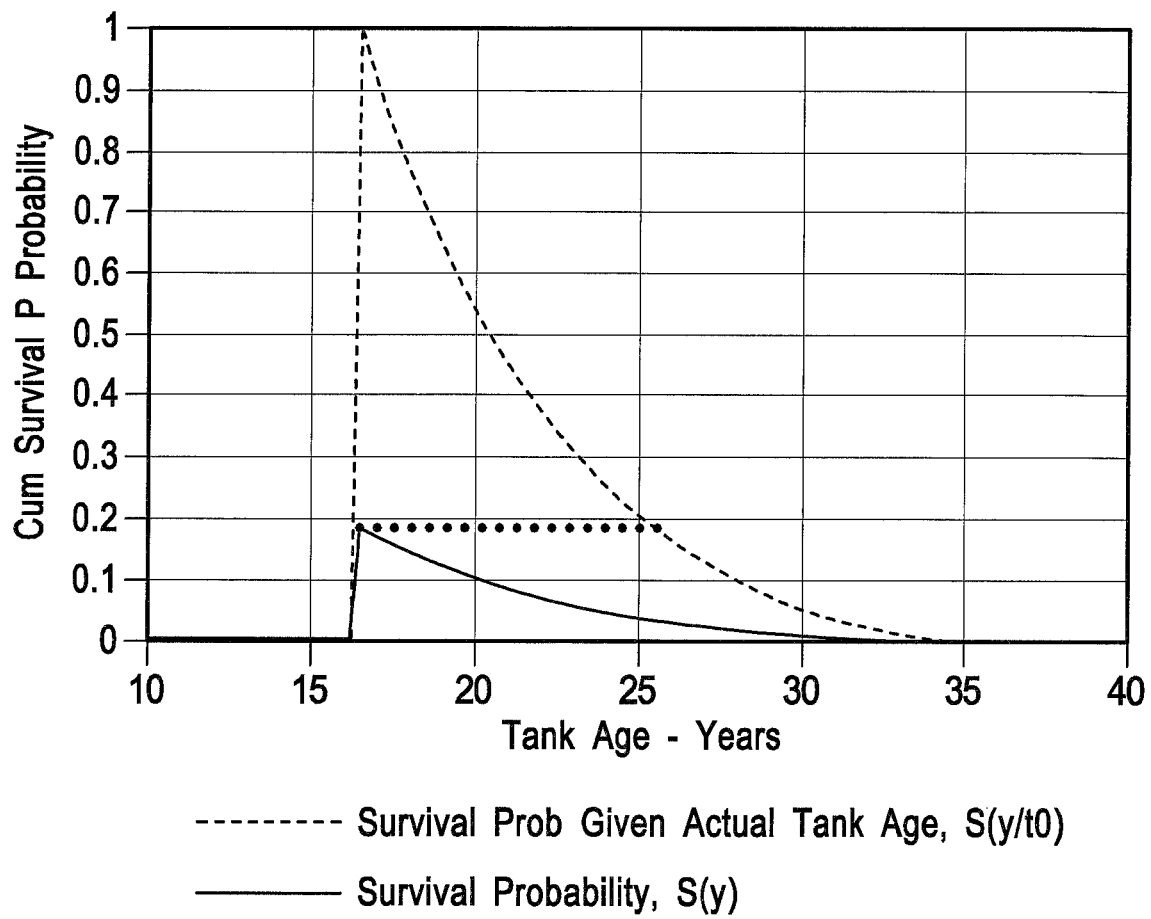
FIG. 10.1

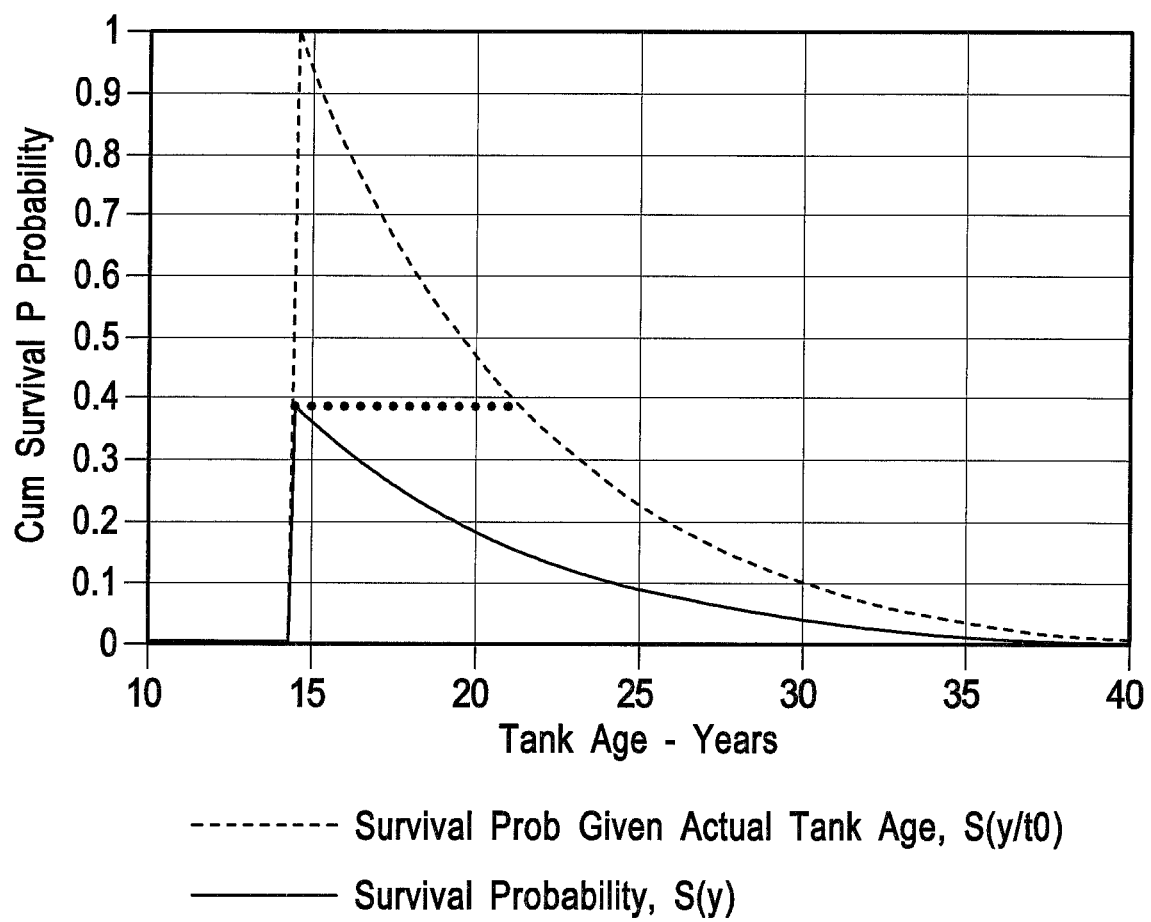
FIG. 10.2

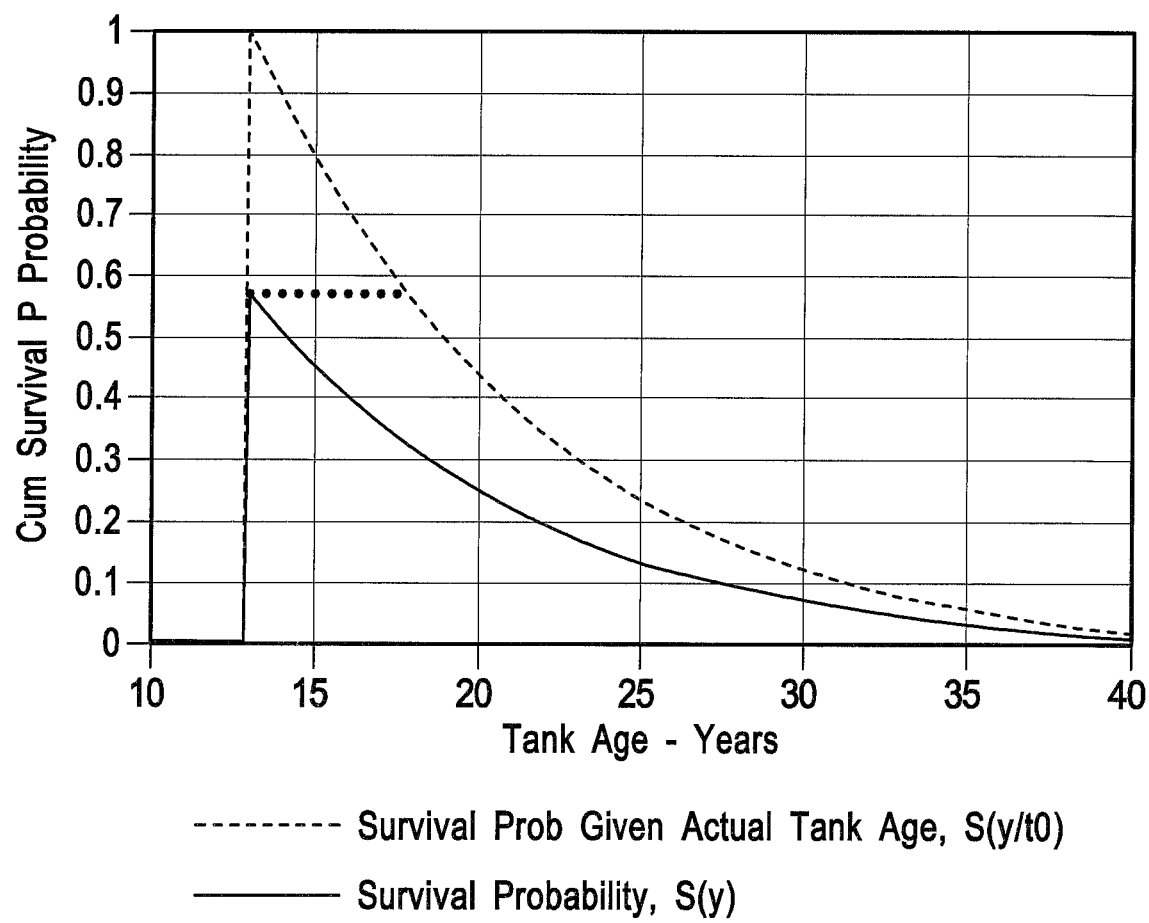
FIG. 10.3

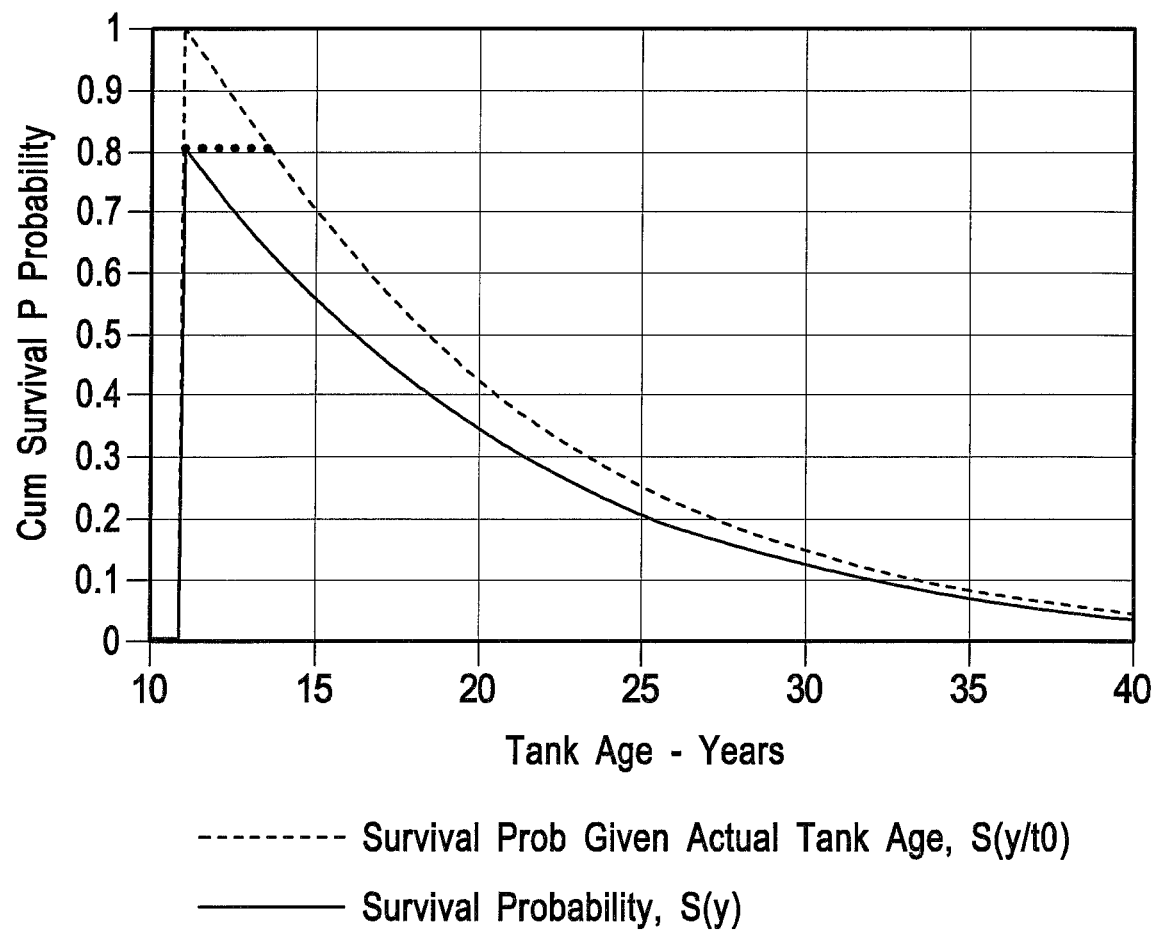
FIG. 10.4

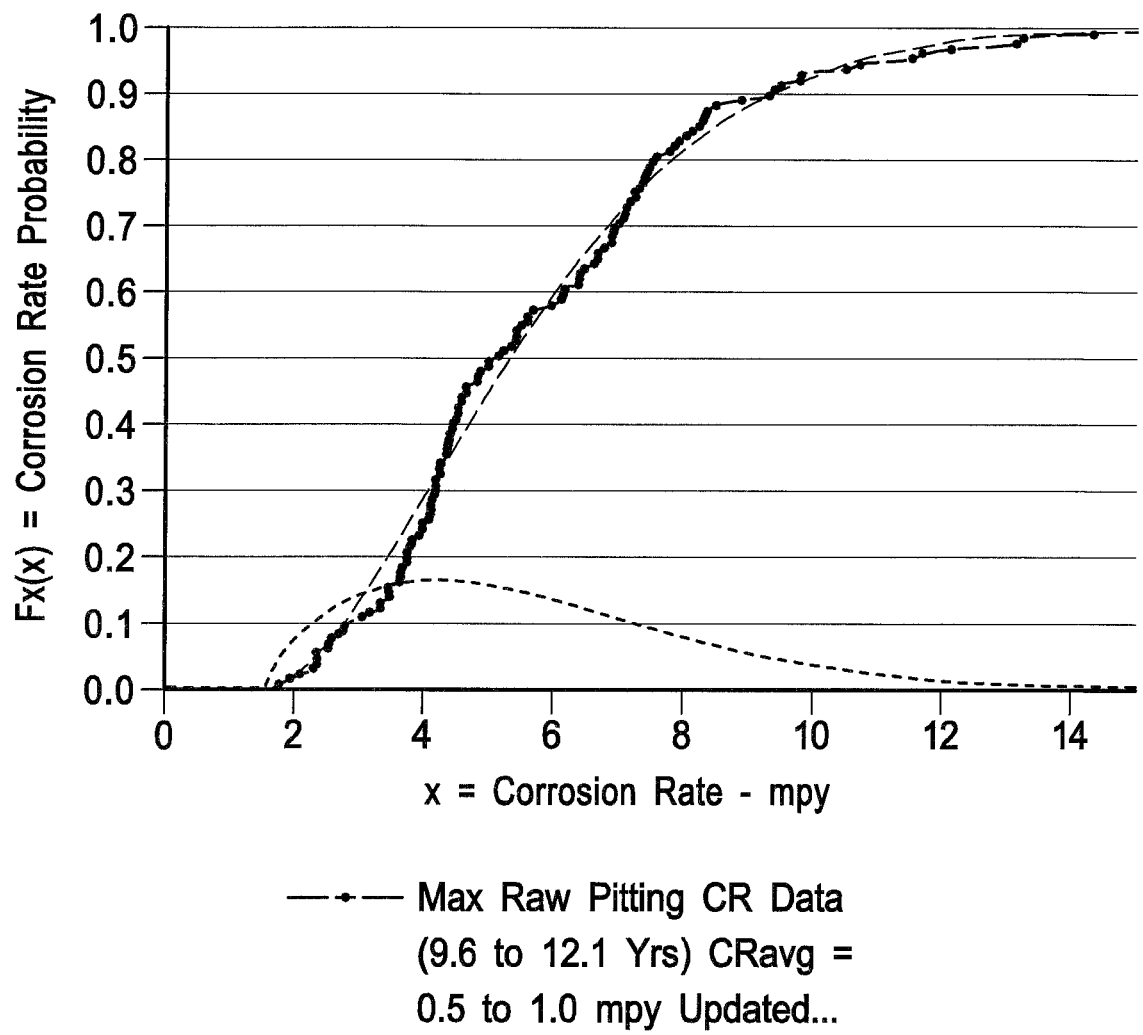
FIG. 11.1

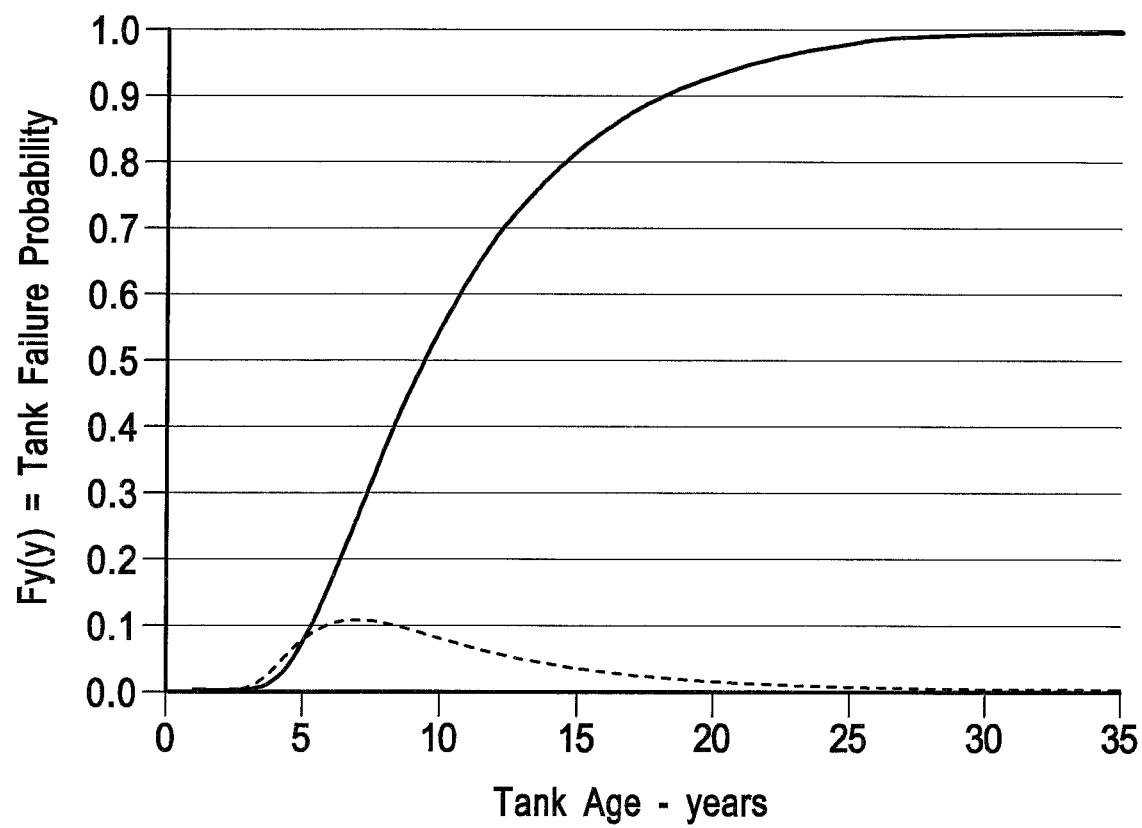
FIG. 11.2

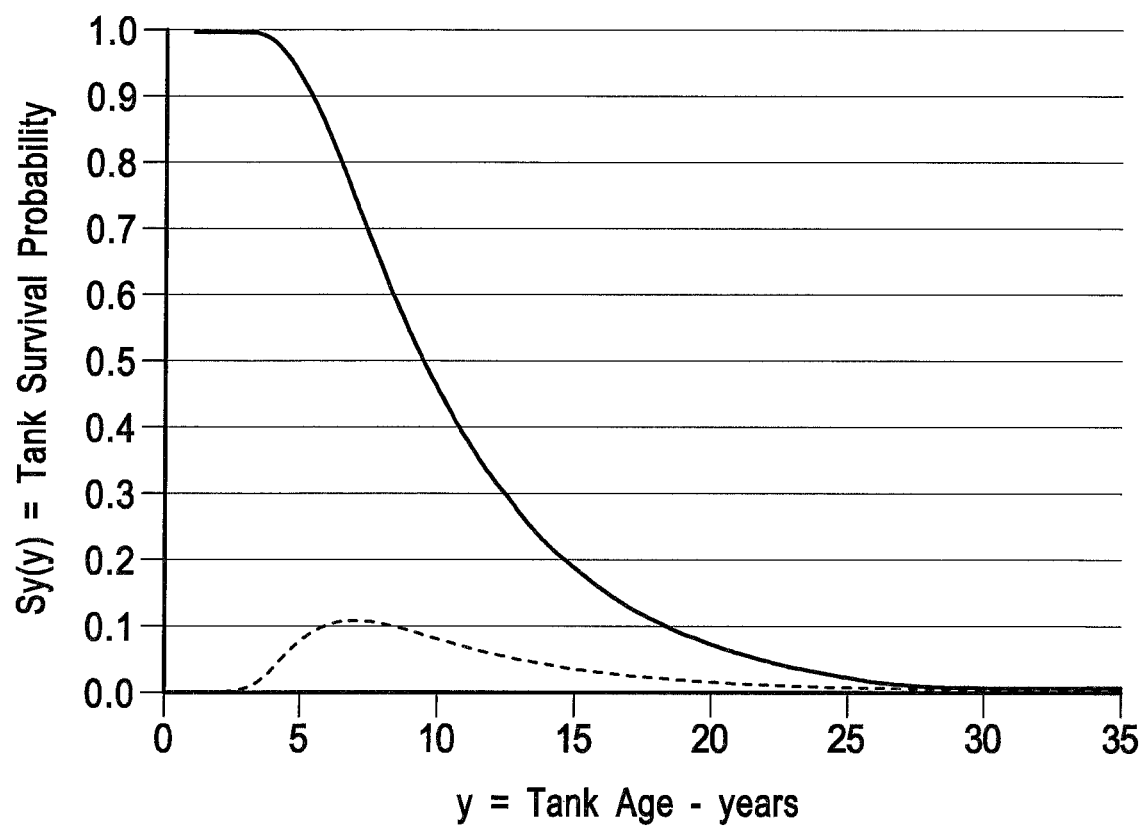
FIG. 11.3

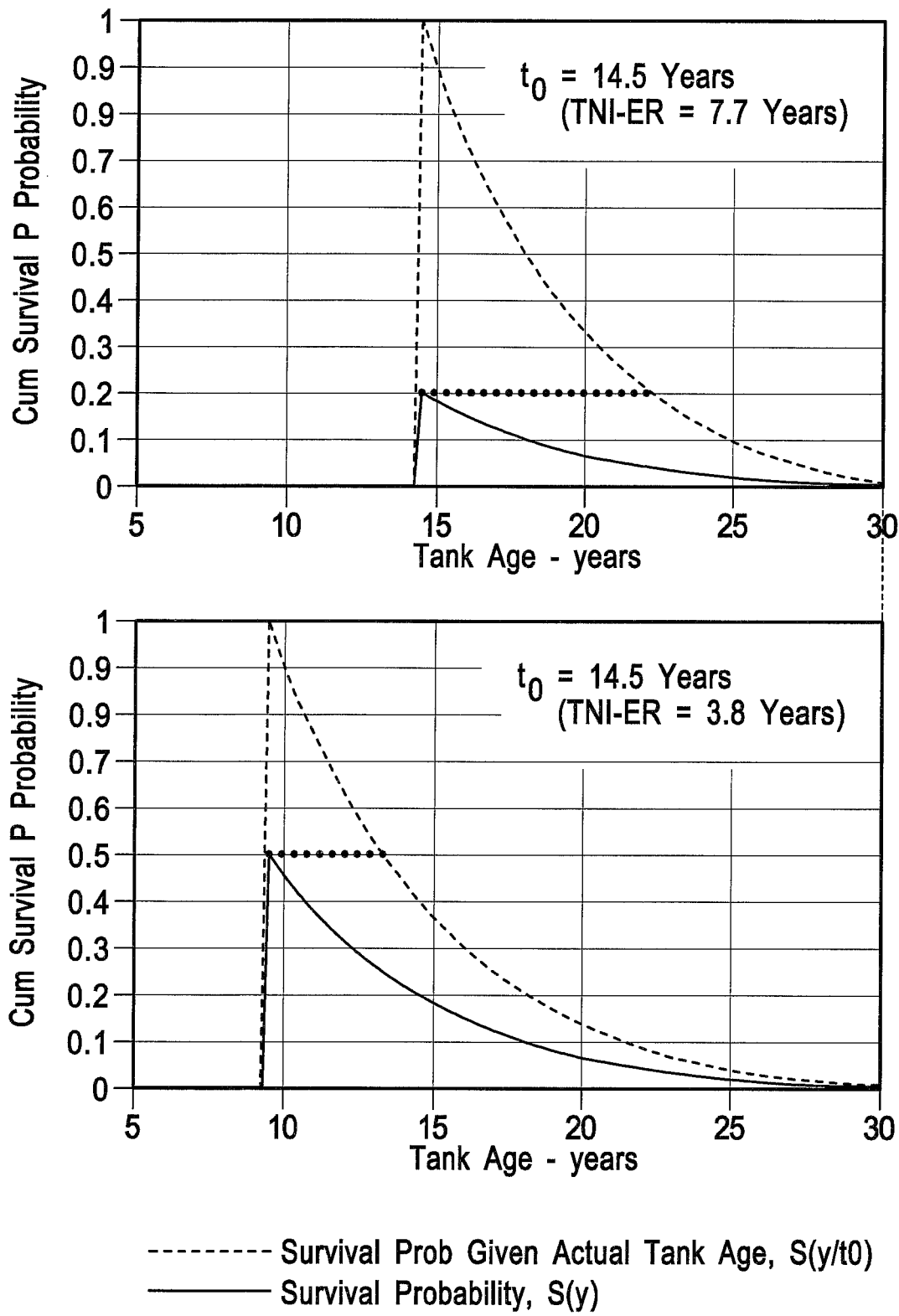
FIG. 11.4

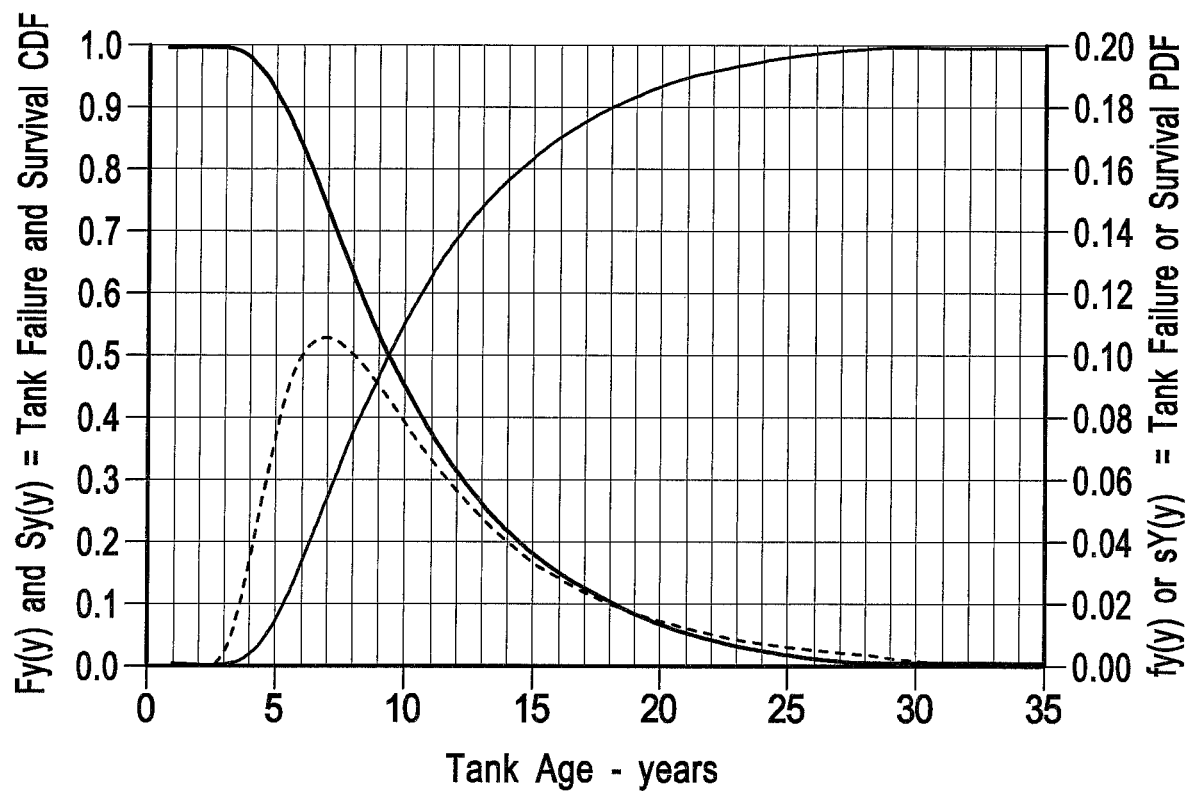
FIG. 11.5

MEASUREMENT-BASED, IN-SERVICE METHOD FOR UPDATING THE INTERNAL INSPECTION INTERVAL OF AN AST

This application claims the benefit of U.S. Provisional Patent Application Ser. No. 62/469,401 filed Mar. 9, 2017, and (a) is a continuation-in-part of U.S. patent application Ser. No. 14/979,307 filed Dec. 22, 2015, which is a continuation of U.S. patent application Ser. No. 13/786,316 filed Mar. 5, 2013 (now U.S. Pat. No. 9,228,932), which claims priority to U.S. Provisional Patent Application Ser. No. 61/634,786 filed Mar. 5, 2012; (b) is a continuation-in-part of U.S. patent application Ser. No. 15/707,872 filed Sep. 18, 2017, which is a continuation of U.S. patent application Ser. No. 14/258,609 filed Apr. 22, 2014 (now. U.S. Pat. No. 9,766,175 and claiming priority from U.S. Provisional Patent Application Ser. No. 61/814,786 filed Apr. 22, 2013), which is (i) a continuation-in-part of U.S. patent application Ser. No. 14/061,484 (now abandoned) filed Oct. 23, 2013 claiming priority from U.S. Provisional Patent Application Ser. No. 61/795,737 filed Oct. 23, 2012, and U.S. Provisional Patent Application Ser. No. 61/814,786 filed Apr. 22, 2013 and (ii) a continuation-in-part of U.S. patent application Ser. No. 13/783,316 filed Mar. 5, 2013 (now U.S. Pat. No. 9,228,932), claiming priority from U.S. Provisional Patent Application Ser. No. 61/634,786 filed Mar. 5, 2012; (c) is a continuation-in-part of U.S. patent application Ser. No. 15/490,688 filed Apr. 18, 2017, which claims priority to U.S. Provisional Patent Application Ser. No. 62/324,099 filed Apr. 28, 2016; and (d) is a continuation-in-part of U.S. patent application Ser. No. 15/905,227 filed Feb. 26, 2018, which is (i) a continuation of U.S. patent application Ser. No. 14/061,484 filed Oct. 23, 2013 (now abandoned), which claims priority from U.S. Provisional Patent Application Ser. No. 61/795,737 filed Oct. 23, 2012, and Ser. No. 61/814,886 filed Apr. 22, 2013, and is (ii) a continuation-in-part of U.S. patent application Ser. No. 13/886,316 filed Mar. 5, 2013 (now U.S. Pat. No. 9,228,932), which claims priority from U.S. Provisional Patent Application Ser. No. 61/634,786 filed Mar. 5, 2012, all of which are incorporated by reference herein.

FIELD OF THE INVENTION

Methods for quantitatively determining the time (TNI) between (1) the application of this method and (2) the time at which the next out-of-service API 653 internal inspection of a steel, field-erected, aboveground storage tank (AST) should be performed [3-5]. This method is applied to a single tank containing a refined petroleum product and can be used at any time during the service life of a tank to check or update the internal inspection interval specified in API 653 for the next out-of-service internal inspection. This method can be applied directly to the tank of interest and does not require a control tank or detailed knowledge about some or all of the tanks in the facility to implement. TNI is based on a comprehensive set of measurements made on the tank of interest to determine the condition (thickness, corrosion rate, and integrity) of the tank bottom (or floor). This method uses the minimum allowable thickness, $T_{MAT}$, of the tank bottom, as defined in API 653, to determine when the tank should be taken out-of-service for a full API 653 internal inspection. Four different in-service measurements, tests, or inspections, which are currently used by the petroleum industry, are made and used in the determination of TNI. If available, the results of a previous out-of-service API 653 internal inspection are also used. The data from these five sources and an empirical corrosion rate cumulative frequency distribution (CFD) are then combined and used in a novel way to determine TNI. The analysis methods used in this method are similar to those used by the life insurance industry to determine life expectancy, or by a company to determine the period of a warranty (i.e., life expectancy) of its products, but these methods are used very differently to determine TNI. This method has substantial operational, cost-saving, and environment benefits and is relevant for a variety of important internal inspection applications for ASTs.

TNI is determined by appropriately combining two estimates of TNI (TNI-ER and TNI-a). TNI-ER determines the time to the next out-of-service internal inspection without any additional risk of tank bottom failure (as defined by $T_{MAT}$). During this entire time interval, TNI-ER, the risk or probability of tank bottom failure, is lower than determined at the time of the application of the method. It is based on a Bayesian update of the probability of survival of the tank bottom and is determined using a novel method called Equivalent Risk. If the probability of survival of the tank bottom is high and if a previous out-of-service API internal inspection is available that meets the criteria in this method, a second estimate of TNI (i.e., TNI-α) can be made and combined with TNI-ER to determine TNI.

This method can also be applied to a bulk underground storage tank (bulk UST) with a flat bottom like those owned and operated by the US Department of Defense (DoD), and it can also be applied to shop-fabricated steel ASTs. The method focuses on refined petroleum applications, but it can be applied to water tanks and a wide range of other liquid products where tank bottom corrosion is the major failure mechanism.

BRIEF DESCRIPTION OF THE PRIOR ART

There are several recommended practices or methods for inspecting the integrity of welded or riveted, steel, atmospheric-pressure, aboveground storage tanks (ASTs) after they have been placed in service. API 653 covers the maintenance inspection, repair, alteration, relocation, and reconstruction of petroleum tanks containing refined petroleum fuels. It is a performance-based inspection with the time between inspections being 10 years or more for out-of-service internal inspections, where the tank bottom can be inspected, and 5 years or less for in-service external inspections, where the tank bottom is not accessible for inspection. The scope of this API publication is limited to the tank foundation, bottom, shell, structure, roof, attached appurtenances, and nozzles to the face of the first flange, first threaded joint, or first welding-end connection. While it can be used for inspecting shop-fabricated tanks, it is mainly intended for field-erected ASTs. It is also used for many of the military's large, bulk underground storage tanks owned or operated by the US Department of Define (DoD). In September 2000, the Steel Tank Institute (STI SP001) published a method for inspection and repair of shop-fabricated steel tanks. The STI method addresses double wall tanks and tanks with integral secondary containment pans as well as horizontal tanks; none of these tanks are within the scope of API 653. This method includes a risk-based approach to inspections, where tanks with the most risk requiring more frequent inspections. The risk-based approach is a function of the size, containment, release prevention and detection, and corrosion history of the tank. Internal Inspection of a Tank—A formal, complete inspection, as supervised by an authorized/certified inspector, of all accessible internal tank surfaces. The main intent of the internal inspection is to ensure that the tank bottom is not severely corroded or leaking and to gather the data necessary for the minimum bottom, shell, and roof thickness assessments. For petroleum tanks storing refined products, this is performed in accordance with API 653.

An Internal Inspection of a Tank is a formal, complete inspection, as supervised by an authorized/certified inspector, of all accessible internal tank surfaces. The main intent of the internal inspection is to ensure that the tank bottom is not severely corroded or leaking and to gather the data necessary for the minimum bottom, shell, and roof thickness assessments. For petroleum tanks storing refined products, this is performed in accordance with API 653.

In general, API 653 and most regulatory agencies require an out-of-service inspection every 10 years unless the tank is in good shape (i.e., no maintenance or repairs are needed), has certain protective features or secondary containment, the corrosion rate is low, and the minimum required thickness of the tank floor will not be exceeded during the interval between internal inspections (typically, 10 years). An out-of-service inspection is very expensive, not only because of the inspection itself, but because the maintenance and repairs made and the loss of the tank for operations during the inspection, repairs, and maintenance activities are expensive. The out-of-service inspection interval, i.e., the time until the tank must be taken out of service and inspected internally is determined from API 653 or equivalent standards. This internal inspection interval determines the maximum corrosion rate for the underside and the topside of the tank bottom from the minimum tank bottom thickness of the underside and topside before maintenance and repairs were made. The maximum corrosion rates of the underside and topside corrosion rate are added together, and this sum is then used to computed this time interval based on the thickness of the tank bottom after the maintenance and repairs were made and after subtracting the minimum allowable thickness of the tank bottom, $T_{MAT}$. $T_{MAT}$ is 0.10 in. for tanks without a release prevention barrier (RPB) and 0.05 in. with a RPB. Thus, if the tank bottom after maintenance and repairs is 0.25 in., the internal inspection interval is determined assuming only 0.15 in. or 0.20 in. could corrode before that the tank needs to be taken out-of-service and internally inspected following API 653, or equivalent.

The internal inspection interval computed in this fashion is extremely conservative and the tank bottoms often do not need any maintenance or repairs when the time for another out-of-service API 653 internal inspection occurs. This method and apparatuses based on this method presented herein allow the tank owner/operator to check the condition of the tank bottom using an in-service inspection to determine whether or not there is useful life left in the tank bottom. If there is, then the internal inspection interval computed using API 653 can be updated and used to schedule the next out-of-service API 653 internal inspection. This method recommends that a current API 653 external inspection be reviewed or performed at the same time to minimize the possibility of other non-tank-bottom issues that might require taking the tank out-of-service for an internal inspection. If a previous API 653 external inspection is used, it should be current, i.e., within 5 years of the previous external inspection, or this method should not be applied. This method recommends performing a new API 653 internal inspection if the previous external inspection is older than 4 years. While not required, this method highly recommends that an API 653 External Inspection be included when applying this method.

Loo reported on a study of 148 aboveground storage tanks inspected using an acoustic emissions (AE) method of assessing the corrosion activity in the floor of an aboveground storage tank while in-service. The AE results for each of these 148 tanks were compared to the results of an internal tank floor inspection performed as part of an out-of-service inspection to verify the results of the AE test. Of the 148 tanks, 33 were crude tanks and 115 were refined product tanks. The results were summarized in FIG. 2 of Loo's paper. The results of the internal inspections (i.e., the actual or true condition of the tank) were reported in terms of four categories (FU1, FU2, FU3, and FU4). The results of the AE tests, which were reported in terms of five corrosion grades from A to E (as defined below), were compared to the out-of-service inspection results. Analysis of the results of the out-of-service internal inspections indicated that no maintenance or repairs were required on the tank bottom in 64.2% of the tanks tested. This suggests that the internal inspection interval was too conservative and could have been longer. Furthermore, 58% of all of the tanks tested with the AE test that did not need maintenance or repairs of the tank bottom could be identified with the AE test. These test results verify the fact that the internal inspection interval could be longer if it could be reliably checked. The methods of the present invention provide methods to check or update this inspection interval. These methods apply to a wide variety of tanks containing a wide variety of different types of products/liquids, particularly petroleum fuels and water.

The methods of the present invention have very substantial environmental, operational, cost-saving and cost avoidance benefits. For example, the environmental risk associated with the potential release of petroleum vapors associated with opening and emptying the tank for an out-of-service internal inspection is eliminated. Also, this method reduces the operational downtime per tank from weeks or months, which is required for an out-of-service API 653 internal inspection, to a day or two, which is required to implement this method. The cost savings associated with the application of this method are real, immediate, and substantial and could be over 80 to 90% of the total cost of an out-of-service API 653 internal, which includes both the inspection and any maintenance or repairs. The cost savings can be calculated from the difference in cost between the application of this method and the performance of an out-of-service internal inspection, before considering the loss of revenue due to the operational downtime required to perform the internal inspection. Finally, this method minimizes avoidance costs such as the eventual cleanup costs associated with a leak that may have gone undetected.

This methods of the present invention are based on the methods and apparatuses taught by Maresca and Maresca, et. al., in U.S. Pat. No. 9,228,932 and at least four pending patent applications: (1) "A Method and Apparatus for Extending the Time Between Out-of-Service, In-Tank Inspections," (2) "A Method and Apparatus for Determining the Time Between Internal Inspections of a Tank," (3) "A Method and Apparatus for an In-Service Measurement of the Bottom Thickness and Corrosion Rate of a Tank Bottom," and (4) "A Measurement-based, In-service Method for Determining the Time to the Next Internal Inspection of an AST." The methods of the present invention describe methods for determining the time until the next internal inspection (TNI) by and combining the Bayesian survival probability approach taught in these patents to determine TNI-ER using Equivalent Risk and TNI-a Determined from additional measurements of the entire tank bottom for higher survival probability tank bottoms.

Equivalent Risk is a new term that is used in previous patents and patent applications by Maresca and Maresca, et. al. to determine the time from the application of this method until the time that the next out-of-service internal inspection can be performed without any additional risk or probability of tank bottom failure. It is determined from the underlying survival probability distribution of the tank bottom and a Bayesian updated survival probability distribution of the tank bottom that is developed at the time when and once the integrity of the tank bottom is verified. It is the time that it takes for the survival probability of the updated Bayesian survival probability distribution to decrease to the survival probability of the underlying probability distribution at the time of the application of this method.

SUMMARY OF THE INVENTION

It is the object of this invention to provide methods for accurately and reliably determining or updating the time until or between out-of-service inspections, TNI, using an in-service, quantitative measurement method to determine the integrity, corrosion rate, and thickness of the tank bottom.

It is the object of this invention to provide methods for accurately and reliably determining or updating the time until or between out-of-service inspections, TNI, by combining the results of in-service measurements of the tank bottom to determine TNI-ER using a Bayesian survival approach with in-service measurements of integrity, corrosion rate, and bottom thickness (leak detection precision test, bottom thickness measurements, and AE corrosion activity test) and TNI-a using additional measurements of the entire tank bottom using the results of a previous out-of-service API 653 internal inspection report, or equivalent.

It is the object of this invention to provide methods for accurately and reliably determining or updating the time until or between out-of-service inspections, TNI, where the integrity of the tank is determined by passing a leak detection integrity test.

The preferred method of the present invention can be used to determine or update the time until the next out-of-service inspection of an aboveground storage tank (AST) or a bulk underground storage tank (UST) based in-service measurements of the tank bottom to determine TNI from the combination of TNI-ER and TNI-α. TNI-ER is based on a Bayesian survival analysis approach to determine the time, TNI-ER, between the underlying survival probability of a tank and the same survival probability in the future once it can be determined that the tank bottom has survived, i.e., has integrity, to the time that this method is being applied. Survival, i.e., integrity, is determined by passing a leak detection test. The underlying survival probability distribution and the Bayesian update of this survival probability distribution are determined by in-service measurements of the bottom thickness and corrosion rate made at one or more location in the tank. The method requires passing an AE corrosion activity test indicating that no active corrosion is occurring. TNI-a is determined by combining the in-service measurements of the tank bottom with a previous out of-service API 653 internal inspection.

The preferred method of measuring thickness of the tank floor is to use one or more ultrasonic (UT) thickness probes on a vertical staff that is inserted into the tank from an opening at the top of the tank. The preferred method of performing AE corrosion activity test is by placing one or more, and preferably three or more, sensors in the product inside the tank on the staff, where at least one of the sensors is at a different elevation than the other sensors. Alternatively, the AE sensors can be placed on the outside wall of an AST. All of these proposed measurement procedures have been used for tank integrity assessments for many years, but they have not been used for in-service inspections or in combination to estimate the thickness and corrosion rate for the entire tank floor. The preferred method of the present invention for determining integrity is comprised of a mass-based leak detection test (Vista Precision Solution's LRDP) with a reference sensor tube inserted into the tank at a convenient opening from the top of the tank. For double-bottom tanks, a pressure decay method is the preferred method (Vista Precision Solution's Double-Bottom Pressure Decay Method).

IN THE DRAWINGS

Figure 2A:
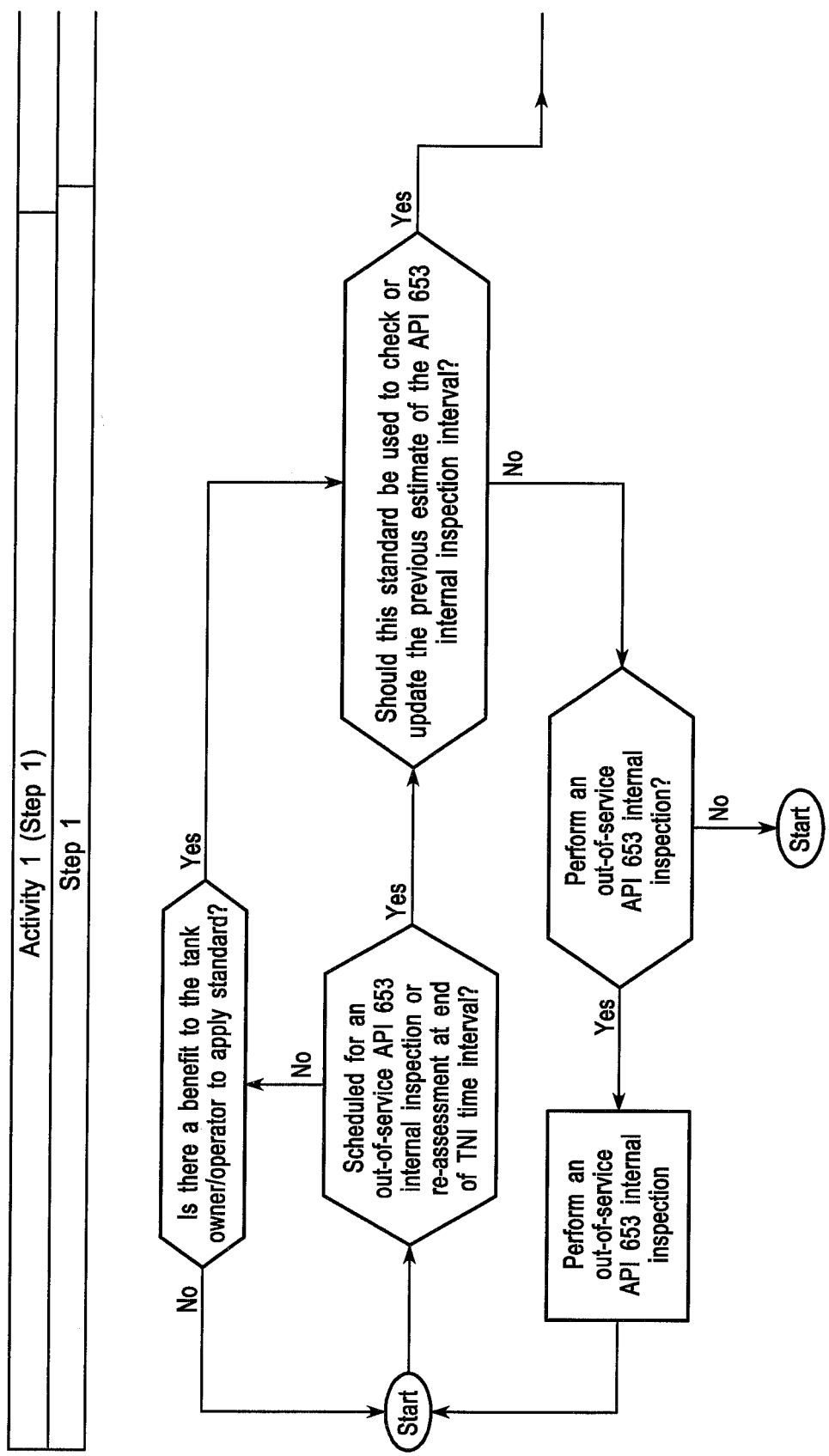
FIG. 2A illustrates a view of activity 1 (step 1) of a detailed overview flow chart of the six major activities to implement this method.
Figure 2B:
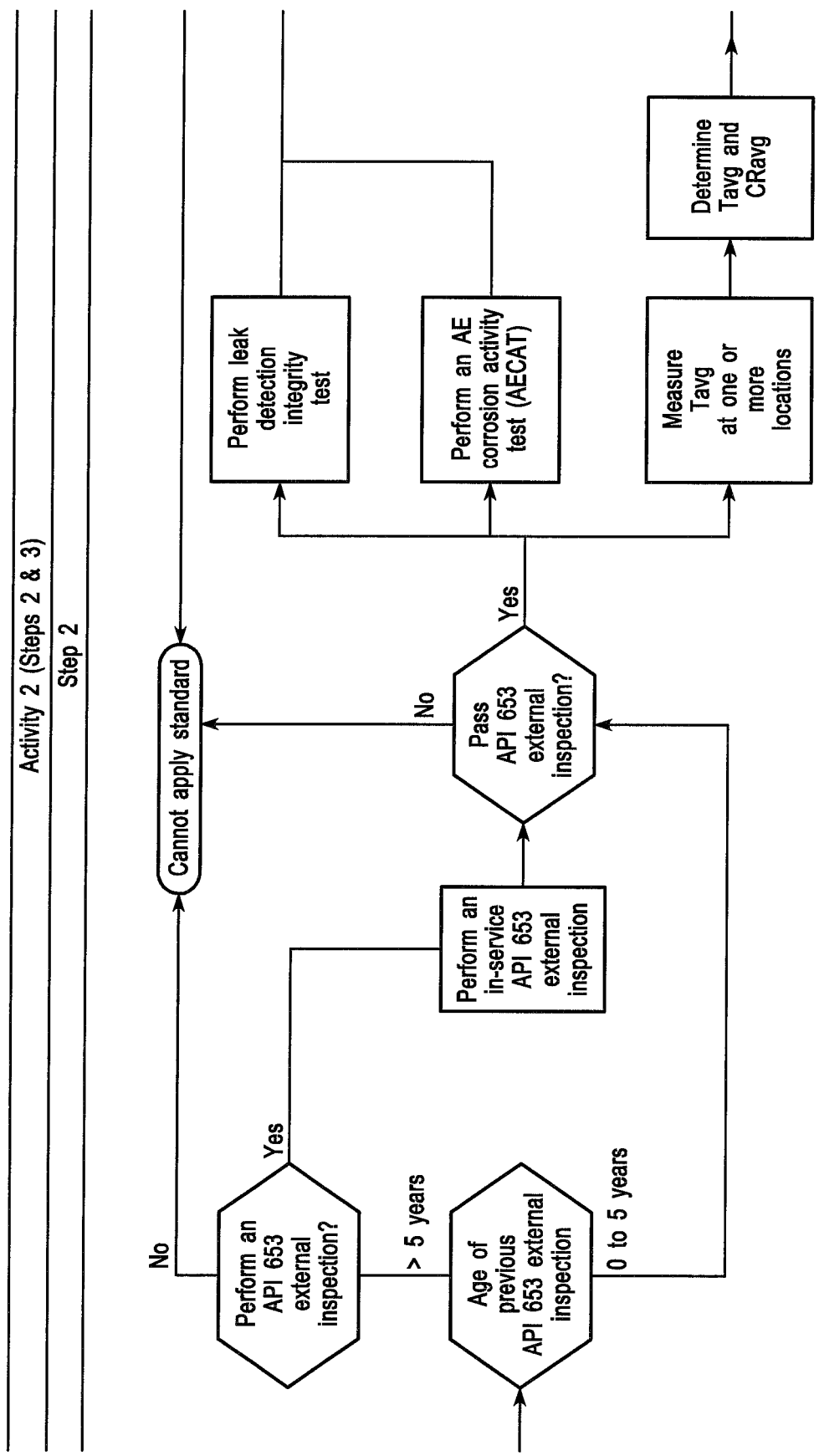
FIG. 2B illustrates a view of activity 2 (steps 2 & 3) of a detailed overview flow chart of the six major activities to implement this method.
Figure 2C:
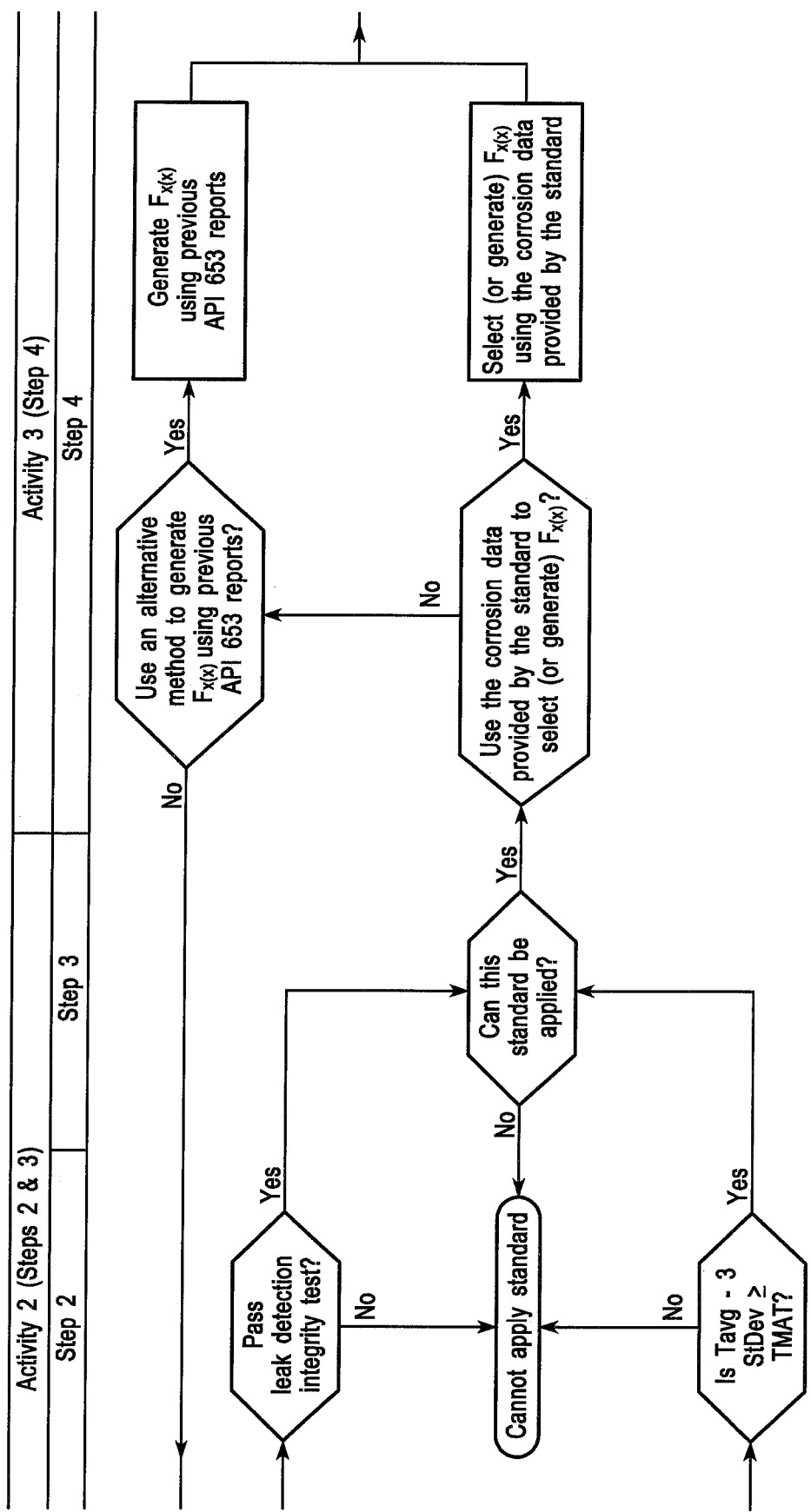
FIG. 2 is a diagramatic layout showing the relationship of FIG. 2A, FIG. 2B, FIG. 2C, FIG. 2D, FIG. 2E, and FIG. 2F.

FIG. 2C illustrates a continuation of a view of activity 2 (steps 2 & 3) and a view of activity 3 (step 4) of a detailed overview flow chart of the six major activities to implement this method.

Figure 2D:
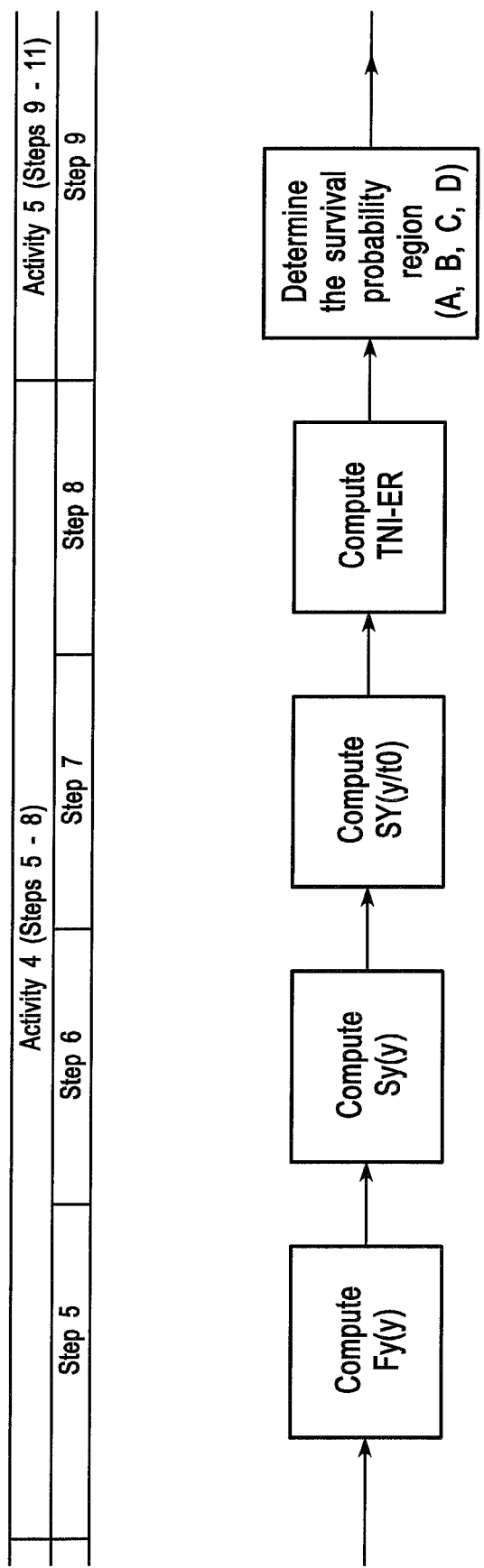

FIG. 2D illustrates a view of activity 4 (steps 5-8) and activity 5 (steps 9-11—showing beginning of step 9 only in this view) of a detailed overview flow chart of the six major activities to implement this method.

Figure 2E:
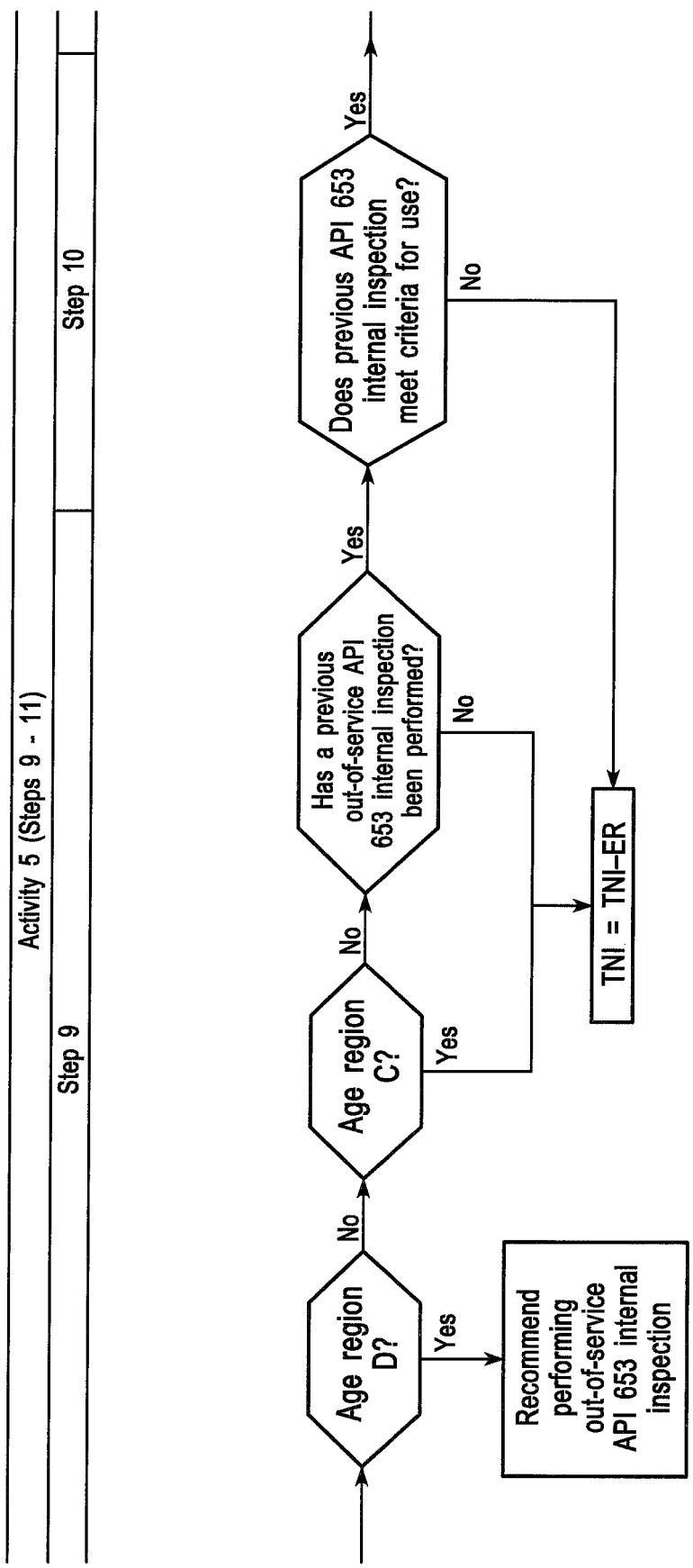

FIG. 2E illustrates a continuation of a view of activity 5 (steps 9-11—showing remainder of step 9 and step 10 only in this view) of a detailed overview flow chart of the six major activities to implement this method.

Figure 2F:
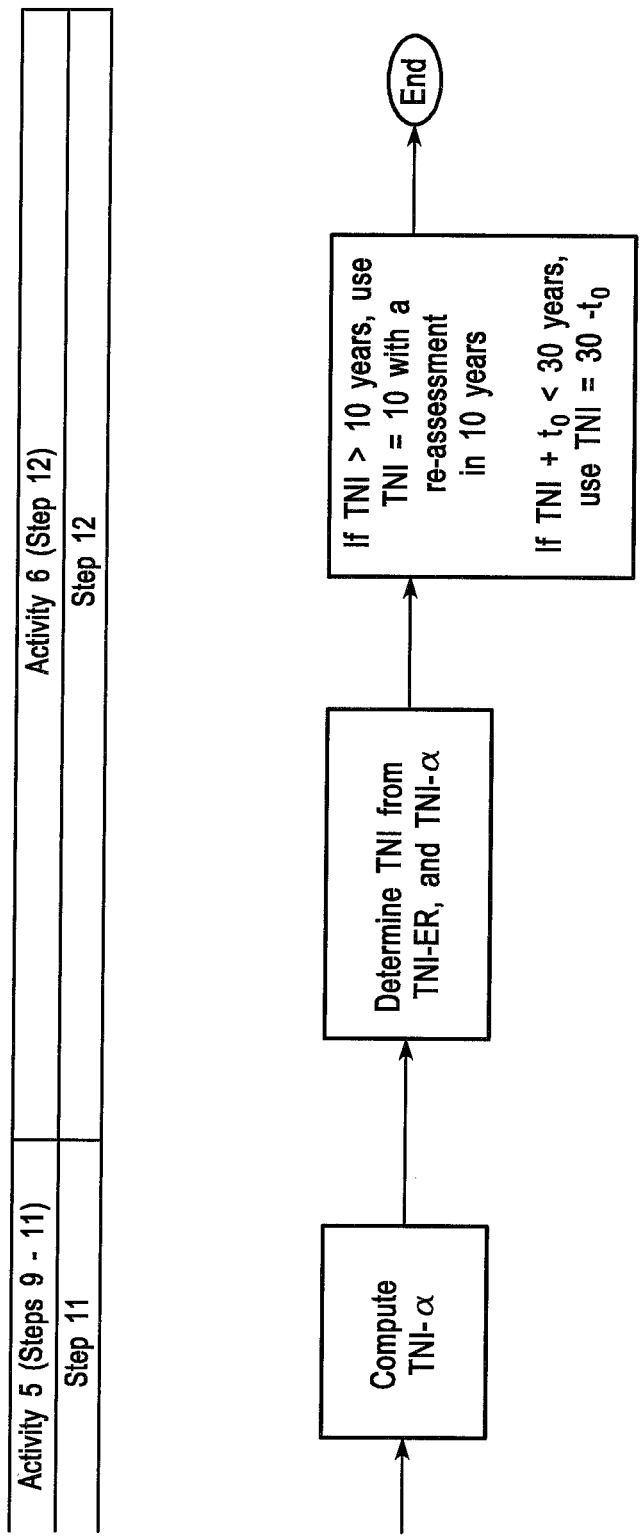

FIG. 2F illustrates a continuation of a view of activity 5 (steps 9-11—showing step 11 only in this view) and activity 6 (step 12) of a detailed overview flow chart of the six major activities to implement this method.

Figure 3:
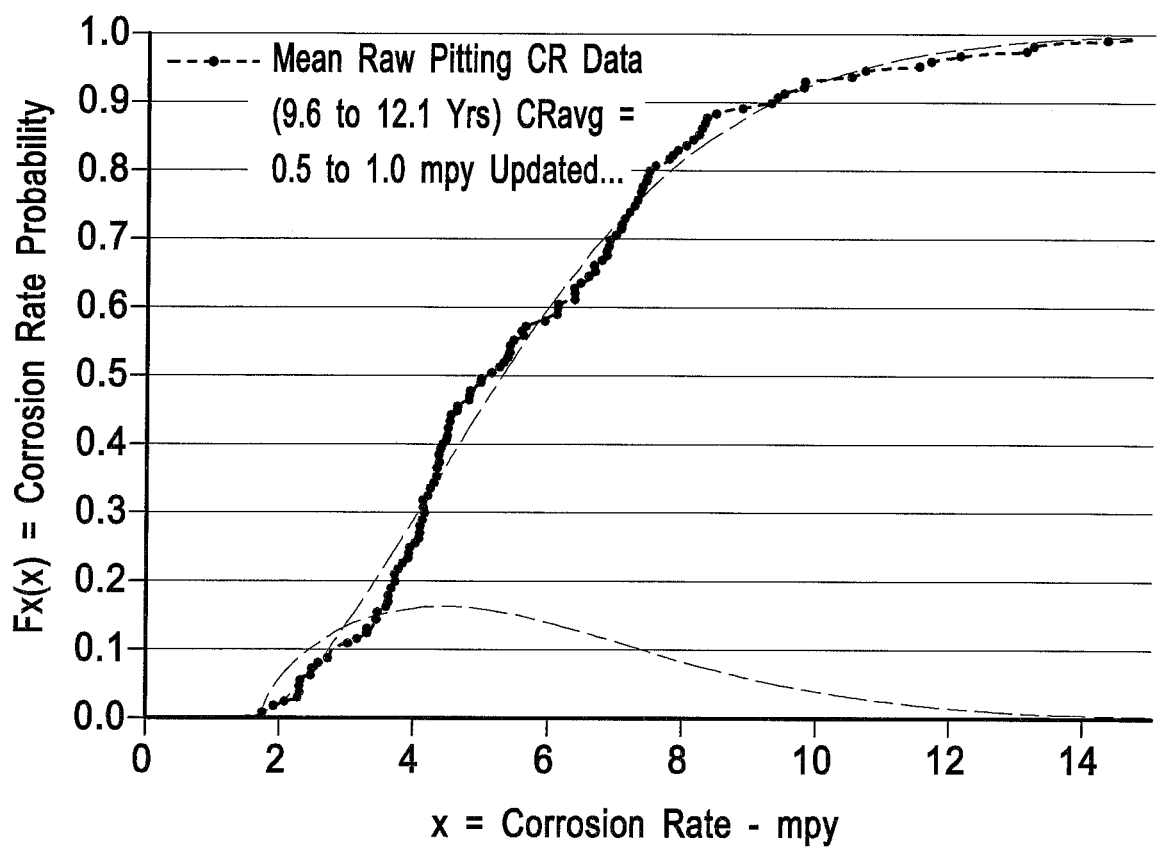

FIG. 3 illustrates $F_X(x)$ and $f_X(x)$ for a $CR_{max}$ determined for a uniform corrosion rate, $CR_{avg}=CR_{uniform}$, between 0.50 and 1.0 mpy. The dashed line represents the Weibull CDF fit to the empirical CFD.

Figure 4:
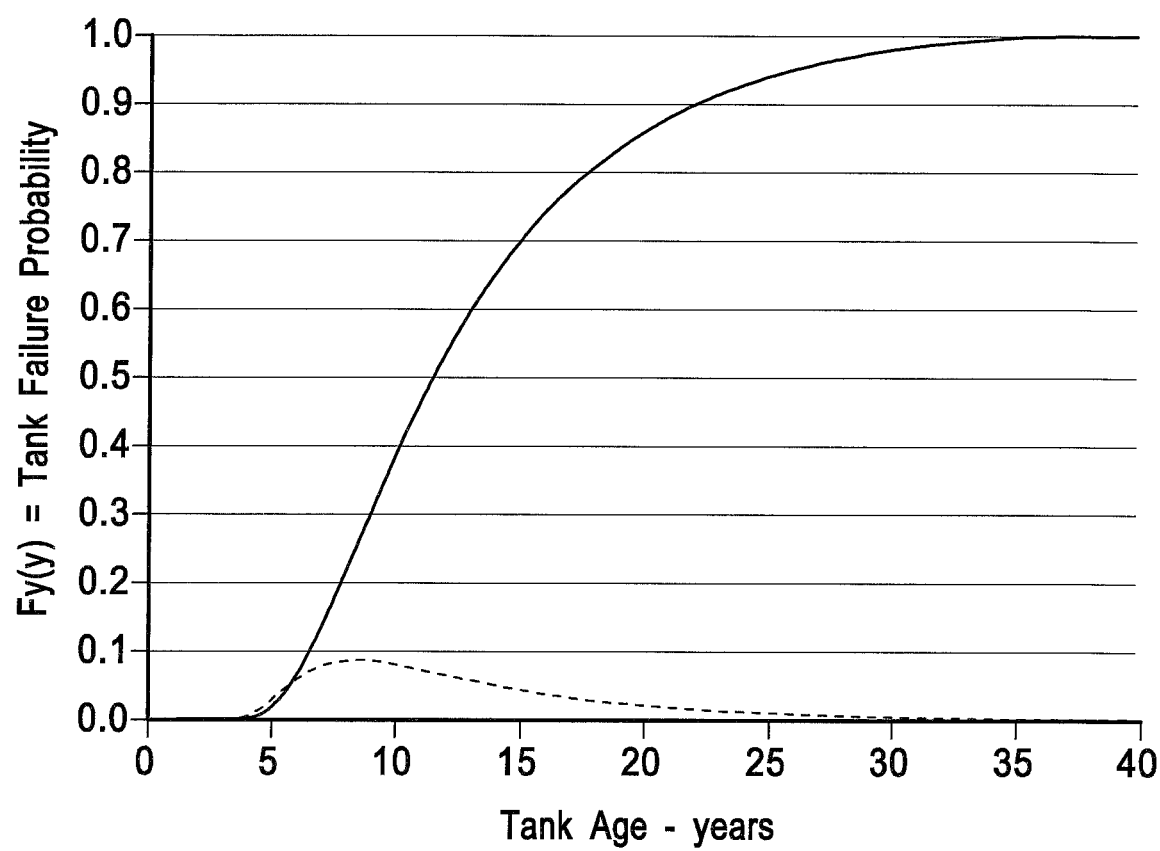

FIG. 4 illustrates $F_Y(y)$ and $f_Y(y)$ for $F_X(x)$ in FIG. 3 using the Weibull CDF.

Figure 5:
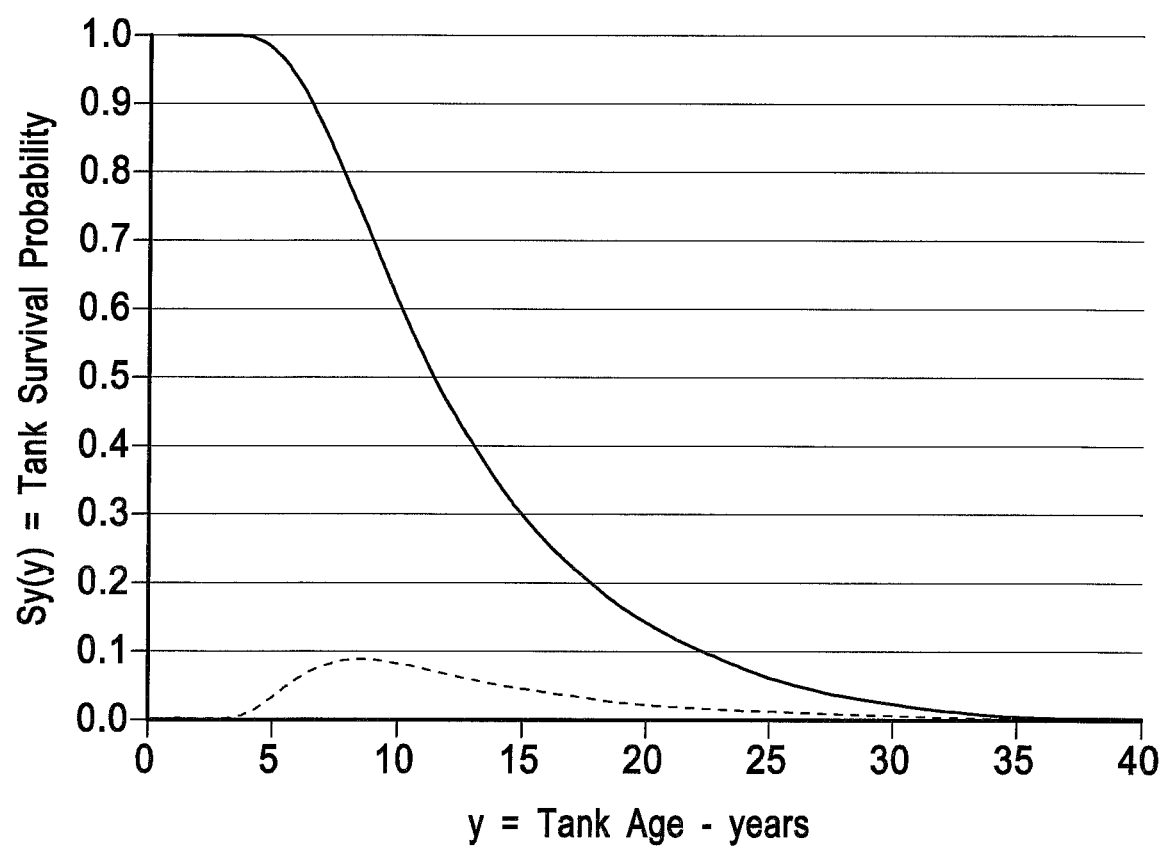

FIG. 5 illustrates $S_Y(y)$ and $s_Y(y)$ for $F_Y(y)$ and $f_Y(y)$ in FIG. 4.

Figure 6:
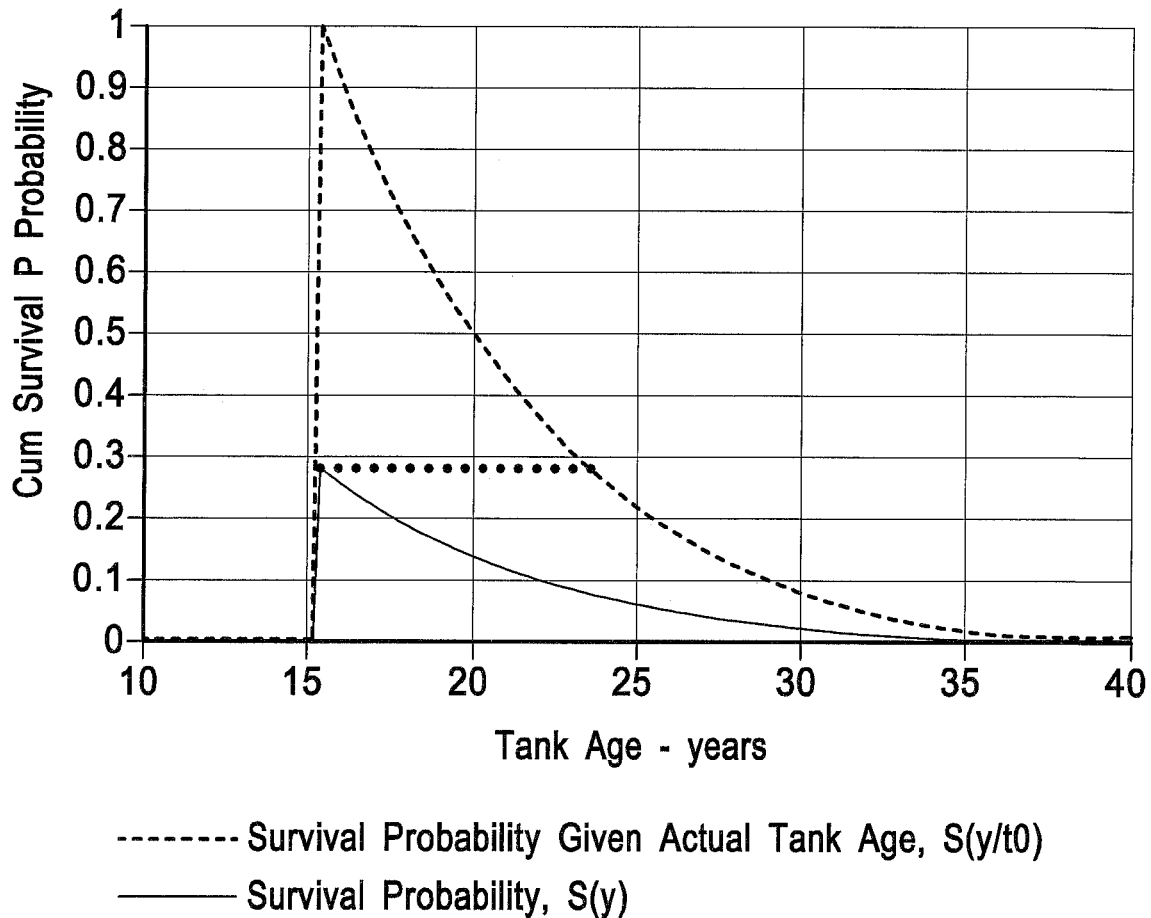

FIG. 6 illustrates $S_Y(y)$ and $S_Y(y/t_0)$ superimposed on $S_Y(y)$ between $y=t_0$ and $y=t_N$, where $S_Y(y=t_N/t_0)=S_Y(y=t_0)$, for $F_X(x)$ in Appendix X3 to illustrate the determination of TNI-ER using Equivalent Risk. TNI-ER=8.4 years, as illustrated by the dotted line.

FIG. 7.1 illustrates Cumulative Frequency Distributions (CFDs) of the mean corrosion data obtained over an 18-year period at 47 different locations in the US and partitioned in ~2-year groups of years after burial. The corrosion rate was determined from an average of the maximum penetration depth on two replicate samples. The maximum penetration on these samples was typically 10 times greater than the average loss of material due to corrosion.

FIG. 7.2 illustrates cumulative Frequency Distribution (CFDs) of the mean and raw uniform corrosion rate and the mean and raw maximum pitting corrosion rate CFDs generated from all of the corrosion data obtained between 9.6 and 12.1 years after sample burial that was obtained at the 47 locations throughout the continental United States. The main differences between the mean and the raw corrosion rates occur in the upper tails of the CFDs. The raw corrosion rate data is comprised of the individual samples from the 8 replicates, and the mean corrosion rate data is comprised of the average of the 8 replicates.

FIG. 8.1 illustrates the three uniform and pitting corrosion rate CFDs used to develop three $F_X(x)$s from the maximum penetration due to pitting as a function of the uniform corrosion rate, $CR_{uniform}=CR_{avg}$, for three groups of uniform corrosion rate data: (1) 0 to 0.50 mpy, (2) 0.50 to 1.0 mpy, and 1.0 to 3.0 mpy.

FIG. 8.2 illustrates the three groups of uniform corrosion rate, $CR_{uniform}=CR_{avg}$, CFDs illustrated in FIG. 8.1 [(1) 0 to 0.50 mpy, (2) 0.50 to 1.0 mpy, and 1.0 to 3.0 mpy].

FIG. 8.3 illustrates the three groups of CFDs of the maximum corrosion rate due to pitting, $CR_{pitting}$, illustrated in FIG. 8.1 from the three groups of uniform corrosion rate [(1) 0 to 0.50 mpy, (2) 0.50 to 1.0 mpy, and 1.0 to 3.0 mpy].

FIG. 8.4 illustrates the CFD to use in developing $F_X(x)$ from the corrosion rate data used to develop the three CFDs in FIG. 8.1.

FIG. 8.5 illustrates $F_X(x)$ and $f_X(x)$ for a $CR_{max}$ developed for a uniform corrosion rate, $CR_{avg}=CR_{uniform}$, between 0 and 0.50 mpy with Weibull parameters $\gamma=0.10$, $\beta=2.80$, and $\eta=5.10$. The dashed line represents the Weibull CDF fit to the empirical CFD.

FIG. 8.6 illustrates $F_X(x)$ and $f_X(x)$ for a $CR_{max}$ developed for a uniform corrosion rate, $CR_{avg}=CR_{uniform}$, between 0.50 and 1.0 mpy with Weibull parameters $\gamma=1.55$, $\beta=1.65$, and $\eta=4.70$. The dashed line represents the Weibull CDF fit to the empirical CFD.

FIG. 8.7 illustrates $F_X(x)$ and $f_X(x)$ for a $CR_{max}$ developed for a uniform corrosion rate, $CR_{avg}=CR_{uniform}$, between 1.0 and 3.0 mpy with Weibull parameters $\gamma=1.00$, $\beta=2.30$, and $\eta=8.10$. The dashed line represents the Weibull CDF fit to the empirical CFD.

FIG. 8.8 illustrates $F_X(x)$ and $f_X(x)$ for a $CR_{max}$ developed for a uniform corrosion rate, $CR_{avg}=CR_{uniform}$, between 0 and 3.0 mpy with Weibull parameters $\gamma=1.10$, $\beta=1.80$, and $\eta=5.80$. The dashed line represents the Weibull CDF fit to the empirical CFD.

FIG. 9.1 illustrates the Survival Age Regions for $F_Y(y)$ and $f_Y(y)$ generated for $F_X(x)$ of the maximum pitting corrosion rate data generated for a uniform corrosion rate, $CR_{avg}=CR_{uniform}$, between 0.50 and 1.0 mpy illustrated in FIG. 4. The mean and method deviation of $F_Y(y)$ and $S_Y(y)$ is 13.05 years and 5.93 years.

FIG. 9.2 illustrates the Survival Age Regions for $S_Y(y)$ and $s_Y(y)$ generated for $F_Y(y)$ and $f_Y(y)$ in FIG. 9.1.

FIG. 9.3 illustrates the determination of TNI-ER for Survival Age Region C for $S_Y(y)$ generated in FIG. 9.2 15.5 years after the previous out-of-service API 653 internal inspection. TNI-ER=8.4 years, as illustrated by the dotted line.

FIG. 10.1 illustrates $S_Y(y)$ and $S_Y(y/t_0)$ superimposed on $S_Y(y)$ between $y=y_1=t_0$ and $y=y_2=t_N$, where $S_Y(y=y_2/y_1=t_N/t_0)=S_Y(y=y_1=t_0)$, for $F_X(x)$ in Appendix X3 to illustrate the determination of TNI-ER in Age Region C for $y=t_0=16.5$ years using Equivalent Risk. TNI-ER=9.1 years, as illustrated by the dotted line.

FIG. 10.2 illustrates $S_Y(y)$ and $S_Y(y/t_0)$ superimposed on $S_Y(y)$ between $y=t_0$ and $y=t_N$, where $S_Y(y=y_2/y_1=t_N/t_0)=S_Y(y=y_1=t_0)$, for $F_X(x)$ in Appendix X3 to illustrate the determination of TNI-ER in Age Region C for $y=t_0=14.5$ years using Equivalent Risk. TNI-ER=7.0 years, as illustrated by the dotted line.

FIG. 10.3 illustrates $S_Y(y)$ and $S_Y(y/t_0)$ superimposed on $S_Y(y)$ between $y=t_0$ and $y=t_N$, where $S_Y(y=y_2/y_1=t_N/t_0)=S_Y(y=y_1=t_0)$, for $F_X(x)$ in Appendix X3 to illustrate the determination of TNI-ER in Age Region B for $y=t_0=13.0$ years using Equivalent Risk. TNI-ER=4.9 years, as illustrated by the dotted line.

FIG. 10.4 illustrates $S_Y(y)$ and $S_Y(y/t_0)$ superimposed on $S_Y(y)$ between $y=t_0$ and $y=t_N$, where $S_Y(y=y_2/y_1=t_N/t_0)=S_Y(y=y_1=t_0)$, for $F_X(x)$ in Appendix X3 to illustrate the determination of TNI-ER in Age Region B for $y=t_0=11.0$ years using Equivalent Risk. TNI-ER=2.7 years, as illustrated by the dotted line.

FIG. 11.1 illustrates $F_X(x)$ and $f_X(x)$ for a $CR_{max}$ determined for uniform corrosion rate, $CR_{avg}$, between 0.50 and 1.0 mpy. The red dashed line represents the Weibull CDF fit to the empirical CFD.

FIG. 11.2 illustrates $F_Y(y)$ and $f_Y(y)$ for $F_X(x)$ in FIG. 11.1 using the Weibull CDF.

FIG. 11.3 illustrates $S_Y(y)$ and $s_Y(y)$ for $F_Y(y)$ and $f_Y(y)$ in FIG. 11.2.

FIG. 11.4 illustrates $S_Y(y)$ and $S_Y(y/t_0)$ superimposed on $S_Y(y)$ between $y=t_0$ and $y=t_N$, where $S_Y(y=t_N/t_0)=S_Y(y=t_0)$, for $F_X(x)$ in FIG. 12.1 to illustrate the determination of TNI-ER using . . . in Age Region C for $y=t_0=16.5$ years using Equivalent Risk. TNI-ER=9.1 years, as illustrated by the dotted line.

FIG. 11.5 illustrates $F_Y(y)$ and $f_Y(y)$ and $S_Y(y)$ and $s_Y(y)$ for $F_X(x)$ in FIGS. 12.2 and 12.3.

DESCRIPTION OF THE PREFERRED EMBODIMENT

The methods of the present invention are based on the methods and apparatuses taught by Maresca and Maresca, et. al., in U.S. Pat. No. 9,228,932 and at least four pending patent applications: (1) "A Method for Extending the Time Between Out-of-Service, In-Tank Inspections," (2) "A Method and Apparatus for Determining the Time Between Internal Inspections of a Tank," (3) "A Method and Apparatus for an In-Service Measurement of the Bottom Thickness and Corrosion Rate of a Tank Bottom," and (4) "A Measurement-based, In-service Method for Determining the Time to the Next Internal Inspection of an AST." The methods of the present invention describe a method and apparatuses for determining the time until the next internal inspection (TNI) by and combining the Bayesian survival probability approach taught in these patents to determine TNI-ER using Equivalent Risk and TNI-α determined from additional measurements of the entire tank bottom for higher survival probability tank bottoms. This specification focuses on accurately, reliably, and safely determining TNI by combing the results of TNI-ER and TNI-a taught in these previous patents and patent applications.

There are five Annexes and 16 Appendices included in this method. These annexes and appendices are listed in Tables 4 and 5. The next to last three appendices are definitions, mathematical terminology, and acronyms and abbreviations. The Annexes provide essential information for understanding and implementing the method. The appendices provide illustrations of the method and additional detail about the method.

5.1 Scope of Method 5.1.1 This method provides a quantitative in-service, measurement-based method for determining the time (TNI) between (1) the application of this method and (2) the time at which an out-of-service, internal inspection of a steel, field-erected aboveground storage tank (AST) should be performed or should be reevaluated by reapplying this method. This method can be used to check or update the internal inspection interval specified in Section 6.4.2 of API 653 for the next out-of-service internal inspection for either an initial inspection (Section 6.4.2.1) or a subsequent inspection (Section 6.4.2.2). In accordance with API 653, TNI is based upon not exceeding the minimum allowable thickness ($T_{M}AT$) of the tank bottom specified in API 653.

5.1.2 This method can be used to determine TNI without any additional risk of tank bottom failure during the entire time period defined by TNI-ER. During this entire TNI-ER time period, the probability of tank bottom failure is lower than the probability of tank bottom failure determined at the time of the application of the method. For this method, tank bottom failure is defined by $T_{MAT}$.

5.1.3 This method was developed for and can be used for ASTs at approximately atmospheric pressure with steel bottoms containing refined petroleum products or water. Refined petroleum products might include, for example, gasoline, diesel, and jet fuels. This method covers steel storage tanks built to API 650 and its predecessor API 12C.

5.1.4 This method can also be used for bulk underground storage tanks (bulk USTs) at approximately atmospheric pressure with vertical walls and flat steel bottoms containing refined petroleum products, like those owned and operated by Department of Defense (DoD). This method can also be applied to any type of steel storage tank, including shop fabricated ASTs and shop fabricated USTs.

5.1.5 This method provides a step-by-step method that can be implemented for the tank of interest using actual in-service measurements of the condition (thickness, corrosion rate, and integrity) of the bottom (or floor) of the tank made directly in or on the tank of interest at the time of the application of this method.

5.1.6 This method can be applied at any time during the service life of a tank, including any time between a previous out-of-service internal inspection and the internal inspection interval determined in the previous internal inspection, or any time since the installation of a new tank or the refurbishment or replacement of a tank bottom.

5.1.7 This method has a number of important applications specified in or directly relevant to internal inspection standards like the one in API 653. A few beneficial examples are indicated below:

5.1.7.1 This method can be used for checking or updating the internal inspection interval of an AST specified in Section 6.4.2 of API 653 for an Initial Inspection (Section 6.4.2.1) or a Subsequent Inspection (Section 6.4.2.2) at the time it is due for an out-of-service internal inspection to determine if there is any additional service life in the tank bottom.

5.1.7.2 This method can be used to perform the 10-year re-assessment for those tanks that have previously undergone an out-of-service API 653 internal inspection using a Risk Based Inspection (RBI) method (as required by Section 6.4.2.1.2 and Section 6.4.2.2.2 of API 653).

5.1.8 The references to API 653 in this method refer to the $5^{th}$ edition, but this method is also applicable to previous editions of API 653 such as the $3^{rd}$ and $4^{th}$ editions.

5.1.9 This method refers to and is applied in accordance with and in conjunction with API 653. This method can also be applied in accordance with and in conjunction with other industry-accepted practices and standard for an out-of-service, internal inspection that are primarily controlled by the condition of the tank bottom, like STI SP001 for shop-fabricated steel ASTs. (For convenience and clarity, this method refers to API 653 throughout this method when referring to an out-of-service internal inspection of an AST (or a bulk UST). Any reference to API 653 made in this method, however, can be replaced with a reference to any of the other applicable standards that also require an out-of-service internal inspection in which the corrosion of the tank bottom controls the life expectancy of the service life of the tank and in which the distributions of the corrosion rates provided in this method are applicable or can be obtained or generated for the tank of interest.

5.1.10 This method can be re-applied more than once during the service life of a tank.

5.1.11 If TNI determined by this method is greater than 10 years, then this method requires that TNI be limited to 10 years. TNI can be re-assessed using this method at 10 years or at any time during this 10-year interval.

5.1.12 The maximum time interval between out-of-service internal inspections established in Sections 6.4.2.1 and 6.4.2.2 of API 653 can be used to limit the TNI determined by this method. If the value of TNI determined by TNI-ER exceeds the maximum time interval established by API 653, the value of TNI-ER may still be used if certain limiting criteria defined in this method are met. To be in compliance with API 653, the maximum time between internal inspections stated in API 653 is 20 years for a tank without a release prevention barrier (RPB) and 30 years for a tank with a release prevention barrier (RPB).

5.1.13 This method can be applied to both single- and double-bottom tanks.

5.1.14 For single-bottom tanks, Section 5.1.5 of this method shall include (1) passing a leak detection integrity test performed with a leak detection method that was evaluated by an independent, third-party using an industry accepted evaluation protocol like those developed by or accepted by one of the following: (a) the NWGLDE or (b) an industry recognized evaluation organization, (c) a nationally or internationally recognized standards organization, or (d) the controlling regulatory agency; (2) making measurements of the thickness and the average or uniform corrosion rate of the bottom of the tank of interest at one or more locations; (3) performing an acoustic emission (AE) corrosion activity test (AECAT), where the result indicates no or minimal corrosion activity; and (4) having completed an API 653 external inspection within the last 5 years indicating that the tank does not need to be taken out of service for an API 653 internal inspection. Section 5.1.5 may also include the use of the bottom thickness measurement results made in a previous out-of-service API 653 internal inspection, which (a) were performed in accordance with API 653, (b) meet the criteria for their use specified in this method, and (c) updates proportionally the maximum corrosion rate determined in this previous API 653 internal inspection using the thickness and corrosion measurements made in (2) of this section.

5.1.15 For double bottom tanks, Section 5.1.5 of this method shall include (1) passing a leak detection integrity test performed with a leak detection method (a) that was evaluated by an independent, third-party using an industry accepted evaluation protocol like those developed by or accepted by the NWGLDE, an industry recognized evaluation organization, a nationally or internationally recognized standards organization, or the controlling regulatory agency, or (b) that is a method that is approved by a PE or a certified API 653 inspector, or (c) by passing a leak detection integrity test specified for a single-bottom tank in Section 5.1.14; (2) making measurements of the thickness and the average or uniform corrosion rate of the bottom of the tank of interest at one or more locations; (3) performing an acoustic emission (AE) corrosion activity test (AECAT), where the result indicates no or minimal corrosion activity; and (4) having completed an API 653 external inspection within the last 5 years indicating that the tank does not need to be taken out of service for an API 653 internal inspection. Section 5.1.5 may also include the use of the bottom thickness measurement results made in a previous out-of-service API 653 internal inspection, which (a) was performed in accordance with API 653, (b) meets the criteria for its use specified in this method, and (c) updates proportionally the maximum corrosion rate determined in this previous API 653 internal inspection using the thickness and corrosion measurements made in (2) of this section.

5.1.16 Any leak detection integrity test that is listed by the NWGLDE or was evaluated by an independent, third-party using an evaluation protocol developed or accepted by the NWGLDE is approved for use in Section 5.1.14 (1) or Section 5.1.15 (1) of this method.

5.1.17 This method requires that an external inspection shall continue to be performed in accordance with API 653 on a 5-year schedule during the entire TNI time interval, or TNI shall be defined by the 5-year anniversary of the last 5-year external inspection performed.

5.1.18 This method can be used for ASTs containing products other than refined petroleum products or water when the corrosion conditions of the tank bottom are appropriately accounted for, either by using the corrosion data provided in this method for generating the corrosion rate distribution for the tank of interest, if applicable, or by using the alternative method provided in this method for generating a new corrosion rate probability distribution applicable for the product and tank of interest.

5.1.19 An Excel-compatible Workbook was developed and is used to implement the method by allowing the input of the measurement, test, and inspection results, perform the calculations required by the method to determine TNI, and output and display the results.

5.1.20 The values stated in inch-pound units are to be regarded as standard. The values given in parentheses are mathematical conversions to SI units that are provided for information only and are not considered standard.

5.1.21 This method does not purport to address all of the safety concerns, if any, associated with its use. It is the responsibility of the user of this method to establish appropriate safety and health practices and determine the applicability of regulatory limitations prior to use.

5.2 Overview of the Method

Figure 1:
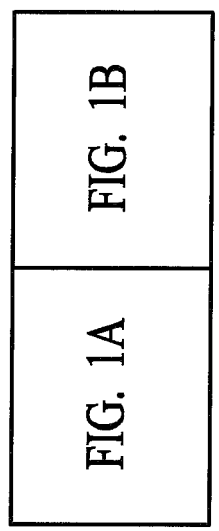
FIG. 1 is a diagramatic layout showing the relationship of FIG. 1A and FIG. 1B.
Figure 1A:
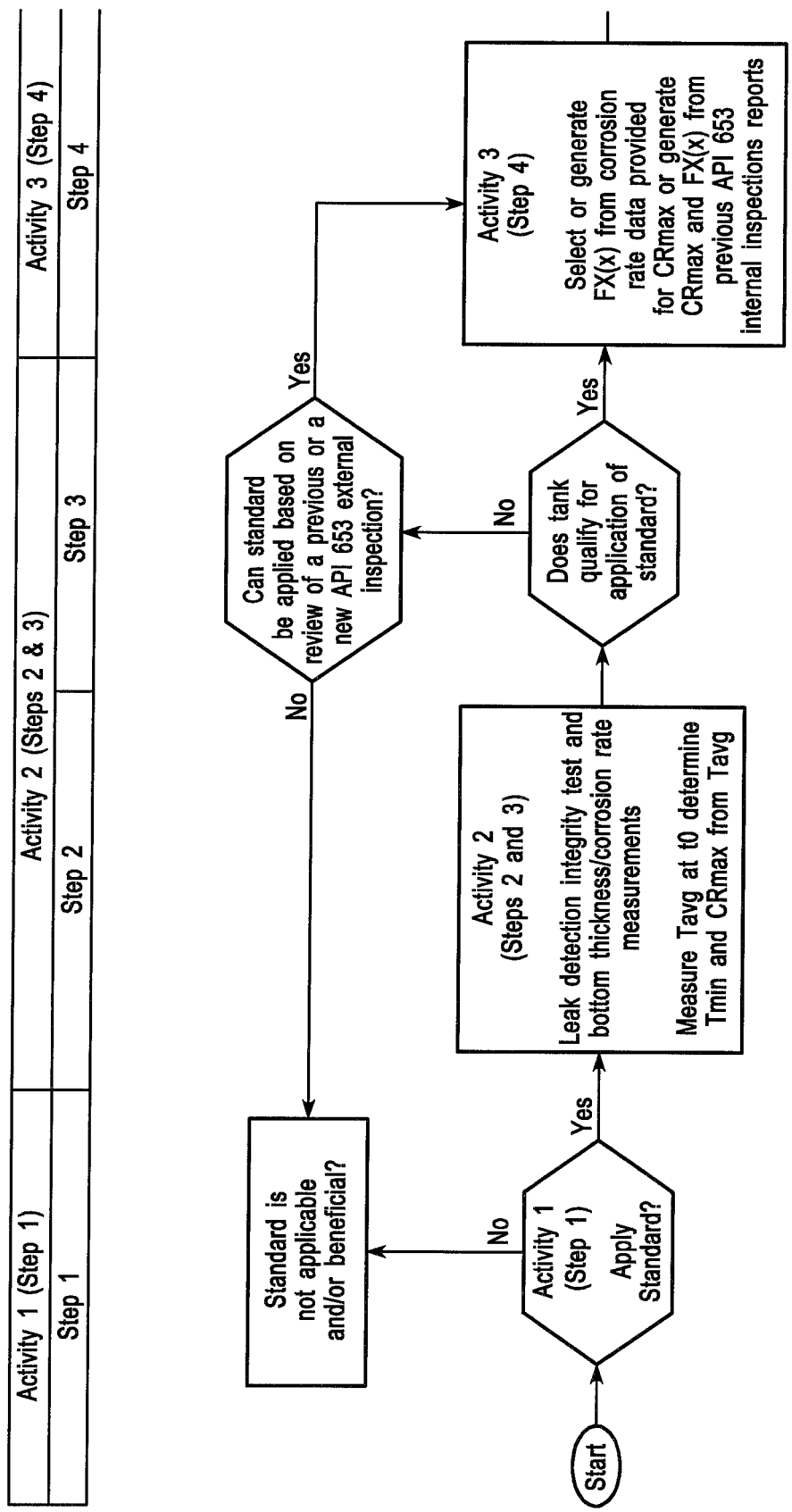
FIG. 1A illustrates part one of a full graphical image of an overview flow chart of the six major activities to implement this method.
Figure 1B:
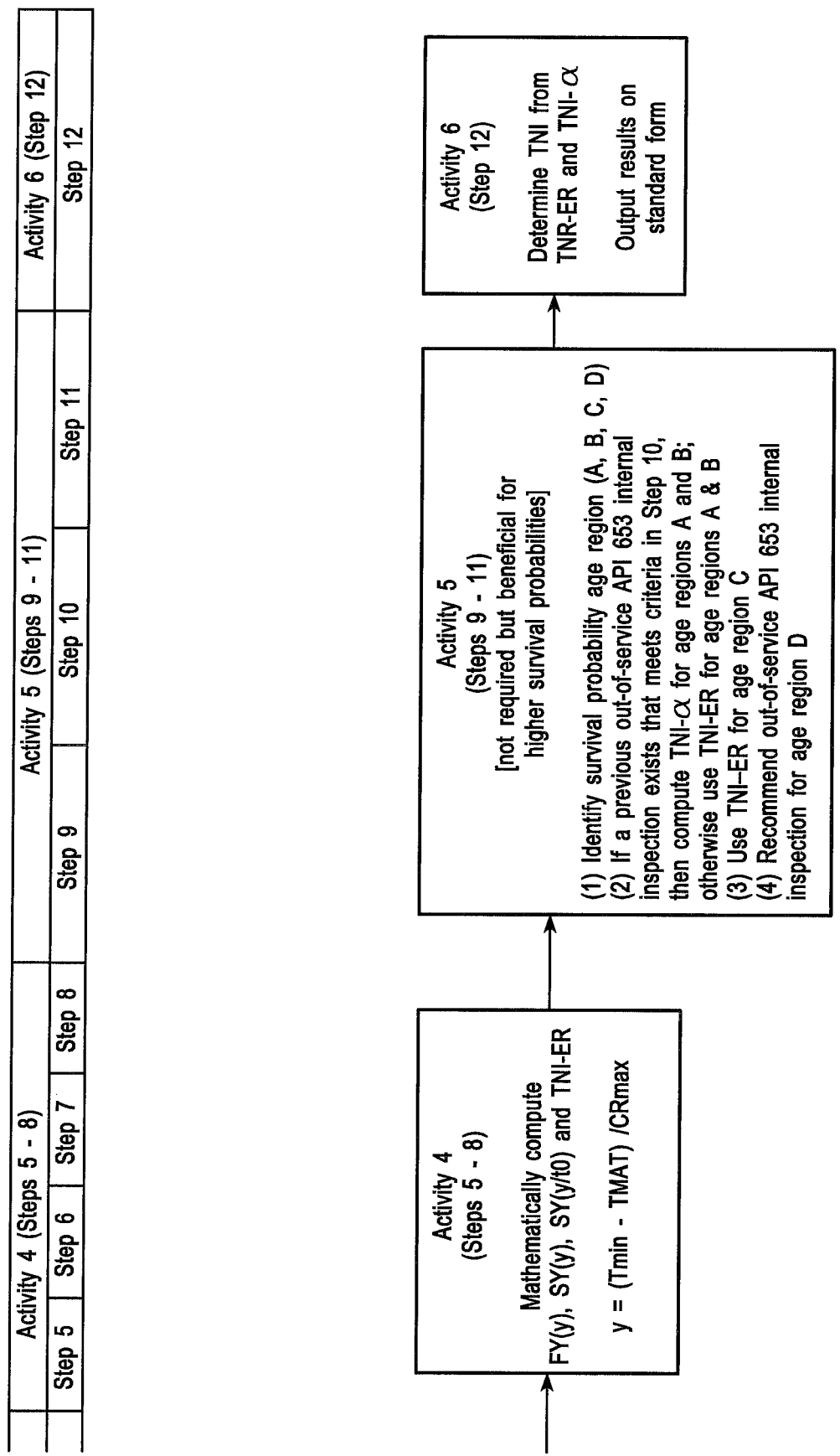
FIG. 1B illustrates part two of a full graphical image of an overview flow chart of the six major activities to implement this method.

This method is described in six major Activities comprised of 12 Steps. Table 1 lists the six activities and the output of each activity needed to implement this method. Table 2 lists the 12 steps that need to be followed to complete these six activities, where each activity may be comprised of 1 to 4 steps. FIG. 1 presents a flow chart of the six Activities; a more detailed flow chart illustrating each of the 12 steps is provided as FIG. 2 in Appendix X2.

This section presents an overview of the methodology and describes the six major activities comprising the method. A detailed description of how to implement each of the 12 steps presented in Table 2 is provided in Section 5.1.1. Tables 4 and 5 in Section 5.11 list the 5 Annexes and the 15 Appendices, respectively, that support and illustrate the implementation of this method. Section 5.14 presents the precision and bias, which is met if the bottom thickness measurement sensor has a precision and bias of at least 0.010 in., is calibrated annually, and is used to make the minimum number of bottom thickness measurements at each tank bottom location specified in Step 2.

Table 3, which is provided and described in Section 5.2.2, summarizes an efficient way to implement the method using the Excel-compatible Workbook. This Workbook performs all of the statistical and mathematical calculations required to determine TNI and outputs the results in tables and graphical displays. The use of the Excel-compatible Workbook is the recommended approach for implementing this method, because it is straightforward to use and eliminates the need to perform complex mathematical calculations.

TABLE 1

Summary of the Six-Activity, 12-Step Method

| Activity | Activity Title | Steps | Input/Output |
|---|---|---|---|
| 1 | Does the Tank Owner/Operator Want to Use this Method, i.e., What Benefit (or Benefits) Does the Tank Owner/Operator Receive by Applying this Method? | 1 | Do you want to use this method? Yes or No. |
| 2 | Perform In-Service Measurements on the Tank of Interest to Determine If the Tank Meets the Minimum Requirements for the Application of the Method, i.e. Can the Method be Used, and if so, to Use these Measurements in the Application of this Method. | 2, 3 | Do you meet the minimum criteria to use this method? Yes or No. Measure $CR_{max}$ and $T_{min}$ |
| 3 | Determine the Corrosion Rate Distribution, $F_X(x)$, due to Maximum Pitting for the Tank of Interest. | 4 | Generate or Select $F_X(x)$ |
| 4 | Determine the TNI based on the Survival Probability of the Tank, $S_Y(y)$, and Equivalent Risk (TNI-ER). | 5-8 | Generate $F_Y(y)$, $S_Y(y)$, and $S_Y(y/t_0)$ from $F_X(x)$, and Compute TNI-ER |
| 5 | Determine the TNI based on a previous out-of-service API 653 internal inspection (TNI-a). | 9-11 | Determine TNI-α |
| 6 | Determine TNI from TNI-ER and TNI-a. | 12 | Determine TNI |

TABLE 2

Summary of the 12-Step Method

| Step | Step Title | Activity | Output |
|---|---|---|---|
| 1 | Determine Whether or not the Tank Owner/Operator Wants to Use this Method, and if so, What Benefit (or Benefits) Does the Tank Owner/Operator Receive by Applying this Method? | 1 | Do you want to use this method? Yes or No. |
| 2 | Make In-service Measurements of the Integrity, Thickness, and Corrosion Rate of the Tank Bottom at $t_0$. | 2 | Perform Leak Detection Integrity Test, AECAT Test, Uniform Corrosion Rate Measurements of $T_{avg}$ and $CR_{avg}$ at $t_0$, and Determine if API 653 External Inspection is current on a 5-year Schedule. |
| 3 | Does the Tank Meet the Minimum Qualification to Apply this Method? | 2 | Yes or No. |
| 4 | Select or Generate a Corrosion Rate Distribution, $F_X(x)$, of the Tank Bottom for the Tank of Interest. | 3 | Generate $F_X(x)$ from $CR_{avg}$ |
| 5 | Generate a Tank Failure or Life Expectancy Probability Distribution CDF, $F_Y(y)$, for the Tank of Interest. | 4 | Mathematically compute $F_Y(y)$ from $F_X(x)$ |
| 6 | Generate a Tank Survival Probability Distribution CDF, $S_Y(y)$, for the Tank of Interest. | 4 | Mathematically compute $S_Y(y) = 1 - F_Y(y)$ from $F_Y(y)$ |
| 7 | Generate the Bayesian Survival Probability Distribution $S_Y(y/t_0)$. | 4 | Mathematically compute $S_Y(y/t_0)$ from $S_Y(y)$ |
| 8 | Determine the Time to the Next Internal Inspection (TNI-ER) based on Equivalent Risk, | 4 | Determine TNI-ER using Equivalent Risk based on $S_Y(y/t_0)$ |
| 9 | Determine if a Previous Out-of-Service API 653 Internal Inspection is Available and Can Be Used? | 5 | Does the Previous Out-of-Service API 653 Internal Inspection Qualify for Use and if so, Determine if this Additional Information Can Be Used based on the Survival Probability Age Region? |
| 10 | Determine the Minimum Bottom Thickness and the Maximum Corrosion Rate for the Entire Tank Bottom Based on a Previous Out-of-Service API 653 Internal Inspection. | 5 | Determine $CR_{max}$ and $T_{avg\ 0}$ based on the Tank Bottom Measurements in Step 2 and a Previous Out-of-Service API 653 Internal Inspection Report |
| 11 | Determine the Time to the Next Internal Inspection (TNI-α) based on the Minimum Bottom Thickness and the Maximum Corrosion Rate Made in Step 10. | 5 | Determine TNI-α from the Thickness and Corrosion Rate Measurements Reported in Step 10 |
| 12 | Determine TNI from TNI-ER and TNI-a. | 6 | Determine TNI from TNI-ER and TNI-α using Table 10 |

The activities and steps presented in Tables 1, 2, and 3 are summarized in three incremental descriptions in Sections 5.2.1, 5.2.2, and 5.2.3, respectively. A simple flow chart FIG. 1 is used in Section 5.2.3.1 to describe the method, and a more detailed flow chart FIG. 2 in Appendix X2 is used to further describe the method in Section 5.2.3.2. Section 5.1.1 provides a general overview of the method and presents the background of the method. Section 5.1.2 provides an efficient way to implement this method using an Excel-compatible Workbook to perform the calculations and to output the results. Section 5.1.3 provides a more detailed overview of all 6 activities that need to be addressed to implement this method. Appendix X2 presents additional details.

Table 3 summarizes how to efficiently implement this method using Excel-compatible Workbook with the tank bottom measurements, tests, and inspections performed in Step 2 of Activity 2 and Step 9 of Activity 5. The Workbook will perform and output the results of all of the calculations in Steps 3-12 that are needed to determine TNI. This Workbook implementation of the method eliminates the need for the performance of the statistical and mathematical calculations that are used to implement the method. The Workbook is straightforward to use and only requires the input of a number of straightforward parameters like the age of the tank, the results of a test as a PASS or FAIL, and in-service measurements of tank bottom thickness and corrosion rate. This Workbook approach is described in more detail in Section 5.2.2. Alternatively, the computations to implement this method can be done analytically using the equations provided in Annexes A2-A5.

5.2.1 General Overview. An overview of the background of this method is provided in Appendix X2. This method provides a Method for checking or updating the Internal Inspection Interval determined for an initial or a subsequent out-of-service API 653 internal inspection of a field-erected, steel, refined petroleum AST. The Internal Inspection Interval is defined in Section 6.4.2 of API 653 for both conventional inspection methods (Section 6.4.2.1.1) and risk based inspection (RBI) methods (Section 6.4.2.1.2) for determining both the initial (Section 6.4.2.1) and the subsequent (Section 6.4.2.2) intervals.

This method can be applied at any time during the service life of an AST. It provides an in-service, measurement-based method for determining the time (TNI) between (1) the application of this method and (2) the time at which the next out-of-service API 653 internal inspection of the AST should be performed. At that time, the condition of the tank bottom can be re-assessed using this method to determine if additional service life remains. In this method, as in API 653, tank bottom "failure" is defined by the minimum allowable thickness, $T_{MAT}$, of the tank bottom (typically 0.10 in.). The key for implementation of this method is the use of a corrosion rate distribution, $F_X(x)$, which was developed for maximum pitting, of the tank of interest. This method provides distributions of $F_X(x)$ to use in Step 4 of this method and recommends the use of these distributions. These distributions are described in Appendix X8; the corrosion data used to generate these distributions is described in Appendix X7. This method also provides a method in Step 4 for developing $F_X(x)$ for the tank of interest using previous, out-of-service API 653 internal inspection reports.

Four different types of In-service Measurements, Tests, and Inspections, which are commonly used by the petroleum industry, are used to as input to the Analysis Methods used by this method to determine TNI. They include: (1) tank bottom thickness measurements to determine the uniform corrosion rate of the tank bottom; (2) a leak detection integrity test to determine if the tank bottom has integrity, i.e., has survived to the to, the time of application of this method; (3) an acoustic emission corrosion activity test (AECAT) to identify tank bottoms without any corrosion activity or with only minimal corrosion activity and with no highly localized corrosion activity; and (4) an API 653 External Inspection to rule out non-tank bottom issues. In addition, the results of a previous API 653 internal inspection may also be used provided that it meets the criteria in this method.

The Analysis Methods used in this method are similar to those used by the life insurance industry (and other industries) to determine life expectancy (i.e., survival expectancy) from the survival probability distributions. This method, however, does not try to explicitly predict the life expectancy of a tank. Rather, the distributions describing life or survival expectancy are updated at the time of the application of this method and are used to determine the time interval over which the life or survival expectancy is greater than or the same as when the method is applied. This time interval is TNI, and the application of an internal inspection of the tank bottom could have been done at any time during this interval with less risk of tank bottom failure than when the method was applied. TNI is based on Equivalent Risk.

5.2.2 Implementation Using an Excel-compatible Workbook. As summarized in Table 3, the most straightforward way to implement this method is to use the Excel-compatible Workbook indicated in Section 5.1.19. The method can be implemented solely by providing the input requested by the Workbook. Once the measurements, test results, and inspection results are entered into the Workbook, TNI will be determined and output in tabular and graphical form.

This method uses (a) the in-service measurements specified in Step 2 and Step 9 that were made in the tank of interest and (b) the corrosion rate distribution, $F_X(x)$, for different corrosion conditions, as described in Step 4, and is provided in the Workbook. If the results of the leak detection integrity test, the AECAT test, the tank bottom thickness measurements, and the API 653 external inspection meet the criteria in Step 3, the average tank bottom corrosion data measured in Step 2 and the corrosion rate distributions, $F_X(x)$, specified in Step 4, can be used to output the TNI-ER in Step 8. If a previous out-of-service API 653 internal inspection is used, as specified in Step 10, then a second estimate of TNI can be determined, i.e., TNI-α, as described and specified in Step 11. If the probability of survival of the tank bottom is greater than 50%, then both TNI-ER and TNI-a can be used in determining TNI as described by Table 10. If the probability of survival is less than 50% or if a previous out-of-service API 653 internal inspection report is not available or does not meet the requirements specified in Step 10, then TNI=TNI-ER.

TABLE 3

Implementation of this Method with the Excel-compatible Workbook Workbook

| Procedure | Description of Procedure |
|---|---|
| 1 | Perform Steps 1, 2, and 3 to determine if the method can be used, and if it can, to obtain the input corrosion rate data for Input to the Excel-compatible Workbook. This information includes $CR_{avg}$ at $t_0$, $T_{avg}$ at $t_0$, $T_{avg}$ at $t_P$, $T_{MAT}$, $t_0$, and $t_P$ |
| 2 | Use Excel-compatible Workbook and Enter the Applicable Information from Steps 2 and 3. Enter the results of the measurements, tests, and inspections into the Excel-compatible Workbook by addressing the questions. If the results of the Integrity Test was not a PASS, or if the API 653 external inspection indicates problems that should be addressed immediately, or if $T_{avg}$ is too small to prevent a breach of the tank bottom, then this method shall not be used and this method recommends performing an out-of-service API 653 internal inspection. |
| 3 | Enter the Applicable Information from Steps 10 and 11 into the Excel-compatible Workbook, if previous out-of-service API 653 internal inspection exists that meets the criteria in Step 10. |
| 4 | Output the results from Step 12 using providing the information in Annex A1. |

Alternatively, instead of using the $F_X(x)$s generated from the corrosion rate database and provided in the method, this method can be applied by first developing and qualifying an extensive corrosion rate database from previous out-of-service API 653 internal inspection reports to develop an $F_X(x)$ for ASTs with the same corrosion and operational conditions as the tank of interest. Once $F_X(x)$ is selected or generated, this method can be applied by directly solving the statistical and mathematical equations provided as part of this method for $F_X(x)$ $F_Y(y)$, $S_Y(y)$, and $S_Y(y/t_0)$ using the equations in Annexes A3-A5 of this method. In essence, the user can develop a special version of the Excel-compatible Workbook indicated in Section 5.1.19 and then use it to implement this method. If the distributions for $F_X(x)$ provided in this method are used, then the user can use the Excel-compatible Workbook indicated in Section 5.1.19. If the Excel-compatible Workbook that is provided with this method is used, all of the calculations in this 12-step procedure will be implemented in the Workbook. If the Excel-compatible Workbook is not used, then the 12 step procedure must be implemented on a step-by-step basis as described in detail by this method in Section 5.11 and summarized briefly in Section 4.3. Use of the Excel-compatible Workbook indicated in Section 5.1.19 is therefore the most straightforward way to implement this method.

If the Excel-compatible Workbook is used, then this method requires only the following quantities, measurements, and test results to determine TNI: (1) the age of the tank when this method is applied, $t_{0\ age}$, where to is the relative time of the application of this method since a previous out-of-service AI 653 internal inspection or when the tank bottom was new or newly refurbished, i.e., $t_0 = t_{0\ age} - t_{P\ age}$; (2) the age of the tank at the time of a previous out-of-service internal inspection or when the tank bottom was new or newly refurbished, $t_{P\ age}$, where $t_P$ is the relative time of the application of this method since the previous out-of-service AI 653 internal inspection or when the tank bottom was new, i.e., $t_P = t_{P\ age}, -t_{P\ age} = 0$; (3) the in-service measurement of the average tank bottom thickness, $T_{0\ avg}$ in mpy, that is made in Step 2 as part of this method at $t_{0\ age}$ or to; (4) the measurement of the average bottom thickness, $T_{P\ min}$, at $t_P$, from the previous out-of-service API 653 internal inspection (or new/newly refurbished tank bottom thickness) after maintenance and repairs in close proximity to the location of the measurement of $T_{0\ avg}$, made in Step 2; (5) a test result of PASS for a leak detection integrity test performed at $t_0$ using a method that meets the criteria of this method; (6) a test result of PASS for an AECAT indicating that there is no or minimal active corrosion activity or areas of highly localized corrosion present in the tank bottom at the time of application of this method, $t_0$; and (7) a test result of PASS from an up-to-date API 653 external inspection indicating that the results of the inspection did not prohibit the use of this method (i.e., suggest that a potential failure problems exists at another location besides the tank bottom). With these data, the Workbook can compute TNI-ER for the tank.

If a previous out-of-service API 653 internal inspection report is not available, or does not meet the criteria specified in Step 10 of Activity 5, or is not acceptable to a certified API 653 inspector, a PE, or an SME, the Excel-compatible Workbook calculates TNI using only TNI-ER. If a previous out-of-service API 653 internal inspection report is used, as described in Steps 10 and 11 of Activity 5, then TNI-a can be calculated as described in Step 11 and used in conjunction with TNI-ER in Step 12 to determine TNI. Table 10 summarizes how to combine TNI-ER and TNI-α to determine TNI. The information required as input to the Workbook that can be obtained in a previous out-of-service API 653 internal inspection is summarized in Step 10.

If the tank bottom does not pass the integrity test in Step 2, then this method shall not be applied, because the tank bottom structural integrity is questionable. If the thickness of the tank bottom is less than $T_{MAT}$, then this method shall not be applied, because failure as defined by API 653 has already occurred. If the tank bottom does not pass the AECAT test, then this method shall not be applied unless the results of a previous out-of-service API 653 internal inspection allows an estimate to be made in accordance with Table 10.

The output of this method, TNI, shall be reported in accordance with Annex X1 and can be reported on a Method Form, such as the one illustrated in Appendix X1, or in a report that contains, at a minimum, the same information. This output will include (1) TNI, (2) TNI-ER, (3) TNI-α. In addition, the output will include (a) the uniform or average corrosion rate, $CR_{avg} = CR_{uniform}$; (b) $F_X(x)$, or the mean, median, and method deviation of $F_X(x)$ of the maximum corrosion rate due to pitting; (c) the survival probability at $t_0$ (i.e., $S_Y(y=t_0)$); (d) a graph of the CFD of the Corrosion rate data due to maximum pitting and a Weibull CDF probability distribution for $F_X(x)$; and (e) graphs of the Weibull CDF probability distributions for $F_Y(y)$, $S_Y(y)$, and $S_Y(y/t_0)$ developed from $F_X(x)$. If a previous out-of-service API 653 internal inspection is used, the thickness of the tank bottom before and after repairs, the minimum thickness before and after repairs, and the maximum corrosion rate due to pitting, thinning, or cracking, or other penetrations, $CR_{P\ max}$, before repairs, will be reported, before and after the proportional adjustment by the tank bottom corrosion measurements made in Step 2 and reported. Illustrations of the CDFs of $F_X(x)$, $F_Y(y)$, $S_Y(y)$, and $S_Y(y/t_0)$ are provided in Appendices X3-X6. Illustrations are provided in Appendix X12 using output from the Excel-compatible Workbook indicated in Section 5.1.19.

5.2.3 Summary Flow Chart—Overview. The flowchart presented in FIG. 1 briefly summarized the decision process needed to implement the 6 activities summarized in Table 1. Each activity, which is comprised of one to four of the 12 individual steps, is briefly summarized below. A more detailed discussion is found in Appendix X2. The flowchart in FIG. 2 in Appendix X2 presents a more detailed description of the decision process illustrated in FIG. 1.

5.2.3.1 Activity Flow Chart in FIG. 3. The objective of the first activity (Activity 1), which is addressed by Step 1, is to determine whether or not the tank operator/owner wants to use this method. This determination, among other things, depends on whether or not there is a beneficial application for checking or updating the internal inspection interval computed at the last out-of-service API 653 internal inspection or when the tank was installed or refurbished. Beneficial applications are determined by a reduction in inspection costs, maintaining operations, or reducing environmental impacts. The objective of the second activity (Activity 2), which is addressed in Steps 2 and 3, is to determine whether or not this method can be used, and if so, to determine the uniform corrosion rate of the tank bottom, $CR_{avg}$, to use in generating $F_X(x)$ in Step 4, where $F_X(x)$ is an empirically generated distribution produced by the maximum corrosion rate due to pitting of the tank bottom. This decision is based on the measurements of the integrity, thickness, and corrosion of the tank bottom in the tank of interest made in Step 2.

If this method is applicable and can be used, then the next activity (Activity 3), which is addressed by Step 4, is to generate a cumulative distribution function (CDF) of the maximum corrosion rate distribution to which the tank of interest belongs, $F_X(x)$, where x is the corrosion rate from a group of tank bottoms with the same corrosion and operational conditions. $F_X(x)$ is generated by fitting a Weibull CDF to an empirically derived cumulative frequency distribution (CFD) of the corrosion rate data that represents the tank bottom corrosion and operational conditions as the tank of interest. This fit is done by trial and error and must have a least squares error of ±0.5 mpy, or less, in corrosion rate and ±0.5%, or less, in cumulative probability of occurrence. A Weibull CDF was used, rather than the empirical CFD of the corrosion rate data, to simplify the analysis. While other extreme-valued functions could also have been used, a Weibull distribution is used by this method, because it is the most frequently distribution used for such failure, survival, and reliability problems of this type. This method provides $F_X(x)$ as a function of $CR_{avg}$ that can be used to implement this method (see Appendix 8).

The fourth activity (Activity 4), which is addressed by Steps 5-8, is to develop a failure probability distribution for the tank of interest, $F_Y(y)$, and then to generate a survival probability distribution, $S_Y(y)$, and a Bayesian update of this survival distribution, $S_Y(y/t_0)$, for this tank. $S_Y(y)$ and $S_Y(y/t_0)$ are then used to compute TNI-ER, the time to the next out-of-service internal inspection (TNI), based on Equivalent Risk (ER). All of the mathematical calculations required to implement Activities 3 and 4 (Steps 4 through 8) are provided in the equations in Annexes A2-A5. The solution and the output from these equations are provided in the Workbook indicated in Section 5.1.19. Appendices X3-X6, X9, and X10 illustrate the results graphically.

If a previous out-of-service API 653 internal inspection was performed and meets the criteria specified in Steps 9 and 10 of Activity 5, it can be used in Step 11 to make a second estimate of TNI, which is denoted in this method by TNI-α, and used in Step 12 of Activity 6 in conjunction with TNI-ER to determine TNI.

Finally, in the sixth activity (Activity 6), which is addressed by Step 12, TNI is determined from TNI-ER or from the combination of TNI-ER and TNI-α. If the selected TNI is greater than 10 years, then TNI should be set to 10 years. A re-assessment may be made at the completion of TNI by re-applying this method. TNI, as noted below, may also be limited by the maximum internal inspection interval established by API 653 in Section 6.4.2. Finally, TNI is valid providing that API 653 external inspections are performed on a 5-year schedule; if not, either this method should be re-applied or an out-of-service API 653 internal inspection should be considered.

Note that this method cannot be applied unless it can be established that the tank has survived to $t_0$, i.e., the tank bottom has integrity at $t_0$. Tank survival is verified by passing a leak detection integrity test with a test method that meets the minimum requirements of this this method. To be in compliance with API 653, the maximum time between out-of-service API 653 internal inspections should be no longer than the maximum interval established by API 653. In API 653, this maximum interval is 20 years for a tank without a release prevention barrier (RPB) and 30 years for tanks with a RPB. If TNI determined by this method extends beyond the maximum times between internal inspections specified in API 653, then to be in compliance with API 653, TNI shall be limited to the difference in this maximum time and the time of application of this method, to. This method does allow, however, these maximum time intervals to be exceeded under special conditions as described in Step 12 of Section 13.2.

5.2.3.2 Detailed Flow Chart. FIG. 2 shows a more detailed description of the six activities and 12 steps, previously summarized in Tables 1 and 2, that are needed to implement this method. The Activities are briefly described below and are explained in more detail in Section 13 and in the Annexes A1-A5 and Appendices X1-X12.

Activity 1 (Step 1): Does the Tank Owner/Operator Want to Use this Method, i.e., What Benefit (or Benefits) Does the Tank Owner/Operator Receive by Applying this Method? Activity 1, which includes Step 1 of the 12-step method, is used to determine whether or not the tank operator or owner wants to apply this method, i.e., can the tank owner/operator benefit by applying this method to (1) check or (2) update the internal inspection interval. Some of the benefits were summarized in Section 4.1 and some of the beneficial applications were indicated in Section 5.1.7. The flow chart in FIG. 2 indicates that the method can be applied at any time in the service life of a tank, including when the tank is ready for a scheduled out-of-service API 653 internal inspection. It also allows a decision to be made to perform an out-of-service API 653 internal inspection even if the application of this method were to indicate that the tank bottom has additional life.

Activity 2 (Steps 2 and 3): Perform In-Service Measurements on the Tank of Interest to Determine If the Tank Meets the Minimum Requirements for the Application of the Method, i.e. Can the Method be Used, and if so, to Use the Measurements in the Application of this Method. Activity 2, which includes Step 2, is to make specific in-service measurements on the tank of interest to determine whether or not this method can be used, and if the method can be used, to use these in-service measurements to implement the method.

The following four sets of measurements shall be made as part of Step 2: (1) a leak detection integrity test with a test method/system that meets the criteria specified in this method for single- and double-bottom ASTs (and bulk USTs) to determine if the tank bottom has survived to $t_0$; (2) in-service measurements of the average thickness due to uniform corrosion, $T_{avg}=T_{0\ avg}=T_{uniform}$ and the average corrosion rate due to uniform corrosion, $CR_{avg}=CR_{0\ avg}=CR_{uniform}$ of the tank bottom at one or more locations in the tank. $CR_{avg}$ will be used in Step 4, Activity 3, to select (or generate) the CDF of the maximum corrosion rate due to pitting, $F_X(x)$; (3) an AE corrosion activity test (AECAT) that meets the criteria specified in this method to determine if no or minimal active corrosion is present in the tank, and (4) the results of an API 653 external inspection completed within the previous 5 years as a check on the assumption that the tank bottom controls the determination of TNI and that no other part of the tank are experiencing potential failure modes not associated with the tank bottom that would preclude the application of this method. In general this method recommends that an external inspection be performed as part of this method.

There is no priority for when the measurements and tests in (1)-(3) should be made. This method recognizes that inspection and measurement priority decisions can be made based on cost, environmental, safety, and/or operational impacts. All of these measurements and tests shall be completed within a two-month period of the application of this method. The date of application of this method is designated as the date when all three of the measurements and tests in (1)-(3) have all been completed.

This method assumes, in accordance with an out-of-service API 653 internal inspection, that TNI is controlled by corrosion of the tank bottom. Whether or not this is true or whether or not this method can be used is determined in Step 3 and is based on the interpretation of the measurements, tests, and inspections obtained in Step 2. It should be noted that if $T_{avg}$ measured in Step 2 is less than $T_{MAT}$, then this method shall be not applied, and this method highly recommends that the tank be taken out-of-service for an API 653 internal inspection.

As described by Eq. (5.11.1) in Section 5.11, $CR_{0\ avg}$ is determined from the average of the in-service thickness measurements, $T_{0\ avg}$, made in the tank of interest at time $t_0$, and $T_{P\ avg}$, made in the tank of interest at time $t_P$, at approximately the same location as $T_{0\ avg}$, when the tank bottom was new or after repairs were made in a previous out-of-service API 653 internal inspection.

The bottom thickness measurements should be made with a sensor system that has a precision and bias of at least 0.010 in. As described in Section 13, $T_{0\ avg}$ is determined from a minimum of 8 (in 4 pairs of 2) and preferably 10 measurements (in 5 pairs of 2) of the bottom thickness at each location. The second thickness measurement of each pair, or replicate, is made by lifting the probe off the bottom and then again placing it on the bottom. In general, $T_{P\ avg}$, which is typically determined at the last out-of-service internal inspection, will be comprised of only one, or at most several thickness measurements, but this is acceptable because the measurements can be made more reliably when the tank is out-of-service and the operator making the measurements can clean and visually see the tank bottom.

It should be emphasized that the objective of the AECAT test used in this method is to identify tanks without or with only minimal corrosion activity, which is the opposite of the usual objective of such AE tests, where the objective is usually to detect the presence of active corrosion. Previous studies indicate that the use of AECAT for identifying the lack of corrosion activity is highly reliable [11]. This conclusion was verified by conducting AE tests on 147 tanks and then taking these tanks out-of-service to perform an API 653 internal inspection to assess the AE test results [11]. This study indicated that 55% of the tanks that were taken out-of-service for an API 653 internal inspection with no or minimal corrosion activity (Grade A or B) could be identified with an AECAT test, and more importantly, none of these tanks actually needed any maintenance or repair of the tank bottom. This study also indicated that 65% of the tanks taken out-of-service for an API 653 internal inspection did need any maintenance or repair and that another 20% of the tanks taken out of service needed only minor maintenance which could have been postponed without any adverse effects to the tank bottom. Thus, based on this study, a total of up to 85% of the tanks taken out of service did not actually need to be inspected at that time, and these tanks could have safely remained in operation for additional years of service [11]. The advantage of this AECAT approach is that the results are (1) current, (2) apply to the entire tank bottom, and (3) cover at least 55% and up to 85% of all of the tanks for which this method may be applied.

If the results of an AECAT test indicate that there is no or minimal active corrosion activity of the tank bottom (i.e., a PASS), then it can be safely assumed that (1) the tank bottom is not actively corroding, (2) the thickness and corrosion rate measurements of the tank bottom made at one location on the tank bottom is representative of the entire tank bottom, and (3) there are no active man-made or operationally induced areas of high or localized corrosion or pitting occurring. Item (2) only confirms historical data that indicates a single location can be used to estimate the uniform corrosion rate of the entire tank bottom. If the AECAT test result is a PASS, then this method can be applied to determine TNI. (Under the special conditions described in Activity 5, the use of a previous out-of-service API 653 internal inspection may still allow the use of this method, even if there is some active corrosion (Grade C), but with TNI being decreased over what it might be with a AECAT test result of PASS.)

Activity 3 (Step 4): Determine the Corrosion Rate Distribution, $F_X(x)$, for the Tank of Interest. Activity 3, which is comprised of Step 4, provides, once the tank has met the minimum tank bottom criteria in Activity 2, a method (and an alternative method) for selecting or generating a corrosion rate distribution, $F_X(x)$, due to maximum pitting of the tank bottom. This corrosion rate distribution is applicable to a group of tanks with tank bottoms that have the same corrosion and operational conditions as the tank of interest. This method recommends using the corrosion rate distributions, $F_X(x)$, provided in Appendix X8 as part of this method. These distributions were developed from the corrosion data provided in a comprehensive study performed over an 18-year period at 47 sites located throughout the lower 48 states of the United States. This study and the corrosion rate data are described briefly in Appendix X7. The average corrosion rate, $CR_{avg}$, measured in Step 2 of Activity 2, is used to select the $F_X(x)$ to use.

The corrosion rate data, which is comprised of a uniform corrosion rate and a maximum pitting corrosion rate for each sample, were sorted into three independent groups according to the uniform corrosion rate: (1) 0 to 0.50 mpy, (2) 0.5 to 1.0 mpy, and (3) 1.0 to 3.0 mpy. Cumulative frequency distributions (CFDs) of the uniform corrosion rate and the maximum corrosion rate due to pitting were generated for each group. The three groups were considered independent, because the uniform corrosion rate CFDs did not overlap, except in the tails of the CFD. For mathematical convenience, a Weibull distribution was fit to the CFDs of the maximum corrosion rate to develop three $F_X(x)$ distributions to implement this method. These are presented in Appendix 8. The average or uniform corrosion rate measured in Step 2 is then used to select $F_X(x)$ based on which group $CR_{avg}$ belongs. It is important to note that $F_X(x)$ is comprised of not only the maximum corrosion rate of the tank of interest, but all possible maximum corrosion rates due to pitting that could occur for a tank with the measured uniform corrosion rate. Thus, $F_X(x)$ is obtained by measuring $CR_{avg}$ in Step 2, determining which of the three groups of uniform corrosion rate it belongs, and then selecting the corrosion rate distribution due to maximum pitting, $F_X(x)$, associated with that group.

The alternative method uses the bottom thickness and corrosion measurements in previous out-of-service API 653 internal inspection reports that belong to a group of tanks with the same corrosion and operational conditions as the tank of interest. This alternative method requires at least 50 independent API 653 reports be used, where only one report can be used per tank. The corrosion rate distributions provided by this method cover most corrosion and operational conditions for atmospheric ASTs containing refined petroleum products (or water) located over geographic and climatic conditions like those represented by the continental United States. This method recommends using the $F_X(x)$s provided in Appendix 8 unless corrosion environment, operational conditions, or products of the tank of interest are considerably different than those represented by the provided $F_X(x)$s. Highly caustic chemical tanks might be an example of a tank where the alternative method should be applied. Heated petroleum tanks might be another example.

Regardless of which method is used to generate $F_X(x)$, it is developed using empirical corrosion rate data that are fit by a Weibull CDF using a trial and error least square fitting algorithm, where the fit must meet minimum least squares error criteria in both x (±0.5 mpy) and $F_X(x)$ (±0.05=+5.0%). A Weibull CDF is used, because it accurately describes the corrosion rate data and a mathematical function more easily facilitates the mathematical calculations required to generate the tank failure and tank survival distributions ($F_Y(y)$, $S_Y(y)$, and $S_Y(y/t_0)$) from $F_X(x)$.

Activity 4 (Steps 5, 6, 7, and 8): Determine the TNI based on the Survival Probability of the Tank, $S_Y(y)$, and Equivalent Risk (TNI-ER). Steps 5-7 of Activity 4 are followed to generate a tank bottom failure CDF, $F_Y(y)$, a survival probability CDF, $S_Y(y)$, and a Bayesian update of $S_Y(y)$, $S_Y(y/t_0)$. Step 8 is then followed to make a determination of TNI based on Equivalent Risk, i.e., TNI-ER. The objective of Step 5 is to generate $F_Y(y)$ from a mathematical transformation of the Weibull corrosion rate probability distribution, $F_X(x)$. This is accomplished in the Excel-compatible Workbook, but mathematical equations are also provided to compute $F_Y(y)$ in Annex A3. The objective of Step 6 is to generate $S_Y(y)$ from $F_Y(y)$, which is straightforward, because $S_Y(y)$ is obtained by a simple subtraction from one, i.e., $S_Y(y)=1-F_Y(y)$. The objective of Step 7 is to generate $S_Y(y/t_0)$, the Bayesian update of $S_Y(y)$, where $S_Y(y/t_0)$ is the probability of survival given that the tank bottom has survived to $t_0$. $S_Y(y/t_0)$ is computed directly from $S_Y(y)$. This can be accomplished mathematically, as described in Annex A5. Survival to $t_0$ is determined by passing the leak detection integrity test in Step 2. Once $S_Y(y)$ and $S_Y(y/t_0)$ are generated, TNI-ER=$t_N$-$t_0$ is determined in Step 8 by finding the time $y_2$=$t_N$, where $S_Y(y_2/t_0)$ equals $S_Y(y_1)$ at $y_1$=$t_0$.

This method recognizes that the failure of the tank bottom in this method can be defined in a number of ways. It can be defined when the tank bottom actually fails (e.g., due to a hole or crack in the tank bottom). For out-of-service API 653 internal inspections, however, failure is defined when the thickness of the tank bottom has corroded to a minimum allowable thickness ($T_{MAT}$) that is defined by API 653 (either 0.05 in. when a RPB is present, or 0.10 in. when a RPB is not present). When $T_{MAT}$ has been reached, maintenance, repair, refurbishment, or replacement of the tank bottom should be considered. This method recommends defining failure of the tank bottom using $T_{MAT}$=0.10 in., but $T_{MAT}$ may be applied as described in API 653. For most ASTs (and bulk USTs), which typically have a tank bottom thickness of 0.25 in., $T_{MAT}$ provides a very large built-in factor of safety when generating $S_Y(y)$ and $S_Y(y/t_0)$ to use in determining TNI, because TNI is not determined when the tank bottom actually fails.

Activity 5 (Steps 9, 10, and 11): Determine the TNI-α based on the Use of a Previous Out-of-Service API 653 Internal Inspection. Activity 5, which is addressed by Steps 9, 10, and 11, can be used to make another estimate of TNI (i.e., TNI-α), but only if (a) a previous out-of-service API 653 internal inspection has been performed and meets the criteria of this method and (b) the survival probability, $S_Y(y)$, at time y=$t_0$ is greater than 50%. These criteria include (1) certain information and data that must be included in the report and (2) at least one thickness measurement made during the previous internal inspection in proximity to the in-service bottom thickness measurements made in Step 2 of this method. Activity 5 provides a method for determining TNI-α. Table 10, which is provided in Step 12 of Activity 6, describes how to determine TNI using TNI-α and TNI-ER. It is important to note that a previous out-of-service API 653 internal inspection is not required to implement this method, but if one is available, it can be used to include the worse conditions previously experienced in the tank of interest with the current measurements of the integrity, thickness, and corrosion rate conditions in the tank.

This method uses four survival probability age regions to determine TNI, with Survival Probability Age Regions A and D (Age Regions A and D) representing the tails of the survival probability distribution, $S_Y(y)$, and the Survival Probability Age Regions B and C (Age Regions B and C) representing the central portions of the distribution. The four survival probability age regions are defined below and illustrated in FIGS. X8.1 and X8.2 in Appendix 8:

Survival Probability Age Region A: $S_Y(y)$>95%)
Survival Probability Age Region B: 50%≤$S_Y(y)$≤95%
Survival Probability Age Region C: 5%≤$S_Y(y)$<50%)
Survival Probability Age Region D: $S_Y(y)$<5%

In this method, TNI-ER can be determined for Survival Probability Age Regions A, B, and C. If $S_Y(y)$ falls into Survival Probability Age Region D, which is defined by the upper tail of the $S_Y(y)$ distribution where (a) the probability of survival is extremely low, (b) the corrosion rates used to generate $S_Y(y)$ are extremely high, and (c) the corrosion rate data used to generate $S_Y(y)$ in this region are typically insufficient to accurately describe the tails of the distribution, then TNI-ER shall not be determined and this method recommends that an out-of-service API 653 internal inspection be performed. If $S_Y(y)$ is in the high Survival Probability Age Regions A or B (i.e., survival probabilities are greater than 50%), then a previous out-of-service API 653 internal inspection may be considered for use in determining TNI. For these higher Survival Probability Age Regions, TNI is usually controlled by TNI-α. If $S_Y(y)$ is in Survival Probability Age Region C, where the probability of survival is less than 50%, then TNI can only be determined using TNI-ER.

If a previous out-of-service API 653 internal inspection report has been performed, it shall be used to compute TNI-α unless (1) the report or the inspection was determined by a certified API 653 inspector, a PE, or a SME to be incomplete, poor, inadequate, or not sufficiently reliable to use in this method, (2) the bottom thickness measurements and corrosion rates were not made in the approximate location of the measurements made in Step 2 of this method, or (3) the measurements of the minimum thickness and maximum corrosion rate reported in the API 653 report cannot be verified or justified by the measurements presented in the report.

If the results of a tank bottom inspection reported in a previous out-of-service API 653 internal inspection are used to make an estimate of the minimum thickness and maximum corrosion rate for the entire tank bottom, this is accomplished by proportionately adjusting the maximum corrosion rate, $CR_{max}$, determined in the previous out-of-service API 653 internal inspection by the ratio of the average corrosion rate measured in Step 2 and the average corrosion rate measured in the previous API 653 internal inspection at the same approximate tank-bottom location ($CR_{ratio}$), where $CR_{ratio}$ is set equal to 2.0 if $CR_{ratio}$>2.0 and 0.5 if $CR_{ratio}$<0.5. It is assumed that the areas of highest corrosion (mainly due pitting, extreme thinning, cracking, or other penetrations) that were identified or measured in the previous internal inspection continue to corrode at the same rate even though the source of corrosion may have been removed and these areas may have been repaired during this last internal inspection. The use of a previous out-of-service API 653 internal inspection is also important, because it includes a detailed history of the previous corrosion conditions of the tank and whether or not or which areas of the tank bottom were repaired before the tank was put back into service.

Activity 6 (Step 12): Determine TNI from TNI-ER and TNI-α. Activity 6, comprised of Step 12, determines TNI from Table 10 using TNI-ER determined in Step 8 and TNI-a determined in Step 11. The Excel-compatible Workbook indicated in Section 5.1.19 automatically outputs TNI based on Table 10. The Excel-compatible Workbook also outputs TNI-ER and TNI-α, and displays graphically the CDFs of $F_X(x)$, $F_Y(y)$, $S_Y(y)$, and $S_Y(y/t_0)$. The proportionally adjusted values of $CR_{max}$ and $T_{min}$, used to determine TNI-α are also displayed.

This method limits TNI to 10 years or less, but allows TNI to be updated at the end of the TNI time interval by re-applying this method. To be in compliance with API 653, this method limits the value of TNI such that the maximum time interval of 20 or 30 years (without and with a RPB, respectively) since the previous out-of-service API 653 internal inspections is not exceeded. This method also allows, however, for these maximum time intervals to be exceeded under special conditions as described in Step 12 of Section 13.2. If TNI <1 year, TNI is set equal to 1 year, and this method recommends that the tank owner/operator perform an out-of-service API 653 internal inspection during this one-year time period, but this decision is up to the tank owner/operator. A minimum of 1 year is used, because the tank bottom passed a leak detection integrity test.

5.3. Significance and Use 5.3.1. This method provides a quantitative method for checking or updating the time (i.e., internal inspection interval) until the next out-of-service internal inspections as used by API Recommend Practice 653 or by other consensus and/or regulatory methods based on the condition of the bottom of an AST (or a bulk UST) being considered for an out-of-service internal inspection. This method uses a measurement-based, in-service tank assessment method on the tank of interest without requiring the use of nearby tanks, a control tank, or an evaluation of all of the tanks in the entire storage tank facility.

5.3.2. This method provides a quantitative procedure for checking or updating the time until the next out-of-service internal inspection, TNI, at any time during the life of a tank based on the corrosion and operational conditions of the tank bottom without taking the tank out-of-service by performing an in-service tank bottom assessment of the integrity, thickness and corrosion rate of the tank bottom.

5.3.3. This method can be used to determine TNI without increasing the risk or probability of failure of the tank during the entire TNI time period.

5.3.4. This method can be used to determine whether or not a tank scheduled for an out-of-service internal inspection needs to be done when scheduled, or can the inspection be rescheduled to a later time based on an updated determination of the internal inspection interval, which may have been determined over 10 years ago, that allows continued service of the tank.

5.3.5. This method can also be used to determine the Initial Internal Inspection Interval for a new tank.

5.3.6. This method can also be used to perform a 10-year re-assessment of a tank that used an RBI method to determine the internal inspection interval in API 653 ($3^{rd}$, $4^{th}$, and $5^{th}$ eds.).

5.3.7. This method uses the results of measurement, test, and inspection methods on the tank of interest that are well known to the petroleum industry when determining TNI.

5.3.8. This method uses the results of actuarial analysis methods that are well known to the insurance and manufacturing industries when determining TNI.

5.9.1 This method can be used to minimize the number of out-of-service API 653 internal inspections, which (1) significantly minimizes the potential for environmental pollution that occurs every time an out-of-service internal inspection occurs when a tank is opened to the atmosphere, drained, and cleaned, (2) significantly reduces the actual costs associated with unneeded inspections, maintenance, and repair, (3) significantly reduces the loss of the associated revenue associated with the loss of operational service that occurs when unneeded inspections, maintenance, and repair are performed, and (4) significantly reduces the avoidance costs associated with undetected leaks or tank bottom failures.

5.4 Apparatus

Five different types of in-service tank measurement, test, and inspection methods, which are in accordance with the precision and bias of this method, may be used to provide the data to implement this method: (1) a leak-detection integrity test; (2) tank bottom thickness measurements at one or more tank bottom locations; (3) an acoustic emission (AE) corrosion activity test (AECAT), (4) an API 653 external inspection, and (5) the thickness measurements and corrosion rates from a previous out-of-service API 653 internal inspection of the tank bottom. Each of these types of measurements has potential sources of interference that need to be addressed to meet the precision and bias criteria in Section 5.14. This method requires the use of the first four measurement sensor systems in Activity 2, Steps 2 and 3. The previous out-of-service API 653 internal inspection used to address (5) does not have to be used when implementing this method, but if available and if it meets the criteria specified in this method, it should be used.

This method does not require the use of a specific type of leak detection integrity method or system, a specific type of tank bottom thickness measurement sensor or sensor technology, or a specific type of AE sensor or AE Corrosion Activity Test method or system. This method does require that the methods or sensor systems used to test the tank for integrity, for bottom thickness, and for corrosion rate meet a specified level of demonstrated performance. If this level of performance is met, then TNI determined by this method can be used.

5.4.1 Leak Detection Integrity Methods or Systems. Only leak detection integrity test methods that meet the following criteria shall be used to test the tank for integrity.

5.4.1.1 Single-bottom ASTs (and bulk USTs) shall be tested for integrity using only leak-detection integrity tests methods or systems that have been evaluated for performance by an independent third-party following one of the standard evaluation protocols developed by or accepted by the NWGLDE, a nationally recognized evaluation organization, a recognized industry standards organization, a national or international consensus standards organization, or the controlling regulatory agency. Both in-tank and ex-tank methods are acceptable.

5.4.1.2 Double-bottom tanks shall be tested for integrity using only leak detection methods that have either (1) been approved by and performed under the supervision of a PE or a certified API 653 inspector, or (2) been evaluated for performance by an independent third-party following one of the standard evaluation protocols developed by or accepted by the NWGLDE, a nationally recognized evaluation organization, a recognized industry standards organization, a national or international consensus standards organization, or the controlling regulatory agency. Both in-tank, ex-tank, and interstitial (space between the double bottoms) methods are acceptable.

5.4.1.3. The individual measurement systems comprising the leak detection integrity methods for both single- and double-bottom ASTs must be calibrated annually according to the manufacturer's specification.

5.4.1.4 For all single-bottom tanks, the results of the performance evaluation shall be documented in a report prepared by an independent, third-party evaluator following the guidelines specified in the evaluation protocol.

5.4.1.5 The leak-detection integrity test method for single-bottom tanks shall be operated in accordance with the evaluation report to achieve the evaluated performance. For most methods used to test ASTs, this means that the test method should be operated to achieve a probability of detection ($P_D$) of 95%, or greater, against a specified leak rate (LR) and a probability of false alarm ($P_{FA}$) of 5%, or less. Leak rates of 0.50 gal/h or less are most commonly used.

5.4.1.6 The leak detection integrity test method for double-bottom tanks shall be operated in accordance with the instructions of a PE or a certified API 653 inspector, or in accordance with an evaluation report to achieve the desired level of performance.

5.4.1.7 Any leak detection method that is currently listed by the NWGLDE or has been evaluated by Ken Wilcox &

Associates, or another equivalent nationally recognized evaluation organization, can be used to perform a leak-detection integrity test.

5.4.2 Bottom or Floor Thickness Measurement Sensor System. The tank bottom thickness measurements shall be shall be performed with a sensor system that is capable of measuring the thickness of the bottom or floor plate with a precision and bias of 0.010 in. Averaging or combining multiple measurements using standard statistical methods can be used to meet or improve upon the precision and bias of the sensor system.

5.4.3 AE Sensors used in an AE Corrosion Activity Test (AECAT). There are a number of different types and brands of acoustic sensors and acoustic methods for measuring the corrosion activity of the bottom of a tank. A corrosion activity test is comprised of an array of AE sensors placed on the external shell of the tank or submerged in the product in the tank, where the coverage achieved at one or more measurement locations is sufficient to detect corrosion activity at any location on the tank bottom. The acoustic measurement array should be comprised of a minimum of three sensors, where each sensor should have sufficient SNR to detect corrosion activity over a designated area covering the tank bottom. Preferably, at least one of the three sensors should be at a different elevation than the other two sensors to distinguish false acoustic signals generated at the product surface. The SNR of each sensor shall be demonstrated before or after each test through a simple calibration test showing that the system can detect a calibration signal with sufficient SNR to achieve a minimum SNR of 10 dB when detecting corrosion activity signals. As with the leak detection methods, the data processing algorithms required to detect the presence of the corrosion activity are usually considered proprietary.

5.4.4 API External Inspection. The API 653 external inspection should be performed following the requirements for external inspections in API 653 by a certified API 653 inspector. The external inspection should be performed within 5 years of the application of this method and in each succeeding 5-year period to continue to use the results of the method during the TNI time period determined by this method. While not required, this method highly recommends performing an API 653 external inspection at the time when this method is applied.

5.4.5 API 653 Internal Inspection Report. In addition to the four types of measurements, tests, and inspections specified in sections 6.1-6.4, this method may use the thickness measurements made over the entire tank bottom from a previous out-of-service API 653 internal inspection provided that the previous API 653 internal inspection meets the criteria in this method. The maximum corrosion rate and the minimum thickness of the tank bottom made in this previous inspection should be updated by the ratio of the average bottom thickness obtained with the current in-service measurement of bottom thickness in Step 2 and a previous bottom thickness obtained from the previous API 653 Report in the same approximately location as the current measurement, where this ratio cannot be any greater than 2.0 or less than 0.50.

5.5 Interferences

Each of the measurements and tests used to assess the condition of the tank bottom has potential sources of interference (or noise) that need to be addressed to obtain the performance specified by the manufacturer.

5.5.1 Leak-Detection Integrity Test. The survival of a tank at $t_0$ is determined by whether or not the tank bottom has integrity. Integrity is assessed by PASSing a leak-detection integrity test in accordance with the criteria specified in this method. The test methods used to assess tank bottom integrity in ASTs (and bulk USTs) require that a number of sources of interference, which may impact the results, be compensated for or addressed as part of the test method, because these sources of interference may be as large as, or larger than the leak to be detected. These sources of interference, i.e., instrumentation system and ambient background noise, which they are also referred, may produce false alarms or missed detections. Each type of method will be affected by different sources of interference or noise. The third-party evaluation protocol is designed to evaluate the method under a wide range of interferences or noise. The third-party performance report indicates how well this was accomplished.

As an illustration, the thermal expansion/contraction liquid product in the tank, the tank walls, the measurement sensors, and the mounting systems are all examples of sources of interference for testing ASTs using an in-tank method like a mass-based or volumetric leak detection method. As another illustration, external methods of leak detection, which are based on the analysis of a tracer chemical, which may be present in the liquid product or added to the liquid product and that escapes from a hole in the bottom of the tank, either a gas or a liquid, may be degraded by the presence of these tracers already present in the backfill and soil beneath the tank. As part of this method, a determination shall be made for the important sources of interference as to whether or not these sources of interference will affect the stated performance of the method. How well the leak detection method does in addressing these interferences is determined by the performance of the method achieved during a third-party evaluation or by calculation if these sources of noise are too small to affect the performance. Performing a third-party evaluation of performance using an evaluation protocol that includes a wide range of these interferences during the evaluation is the recommended way to address how well the method does in addressing these interferences. Evaluation protocols developed by or accepted by the NWGLDE, a nationally recognized evaluation organization, a recognized industry standards organization, a national or international consensus standards organization, or the controlling regulatory agency are acceptable, because such interferences are included in these evaluation protocols.

5.5.2 Tank Bottom Thickness Measurement. There are many types of sensors that can measure the thickness of the bottom steel plate of the tank. Coatings, liners, sludge, sediment, water, uneven bottom surfaces, or pitting may impact the precision and bias of the bottom thickness measurements. For each type of sensor system, the sources of interference shall be described and a determination shall be made as to whether or not these sources of interference adversely affect the measurement. How well the bottom thickness sensor systems address these sources of interference is determined by the precision and bias of the sensors when evaluated under such interferences.

5.5.3 AE Corrosion Activity Test. There are many types of acoustic sensors and acoustic methods for measuring the corrosion activity of the tank bottom. The sources of interference for this measurement method shall be described and a determination shall be made as to whether or not these sources of interference affect the measurement, and if they do, how these interferences are addressed. Each AE Corrosion Activity Test (AECAT) shall include the use of a calibration signal that insures the AE has sufficient signal-to-noise ratio (SNR) in the presence of these sources of interference to detect the corrosion activity. This signal can be generated in the product or on the external wall of the tank. The calibration method will be described and used as part of the AE method. The pencil-lead calibration method is described in ASTM E1106-12 [12] meets this criterion.

5.5.4 API 653 External Inspection. The external and internal inspections performed or used as part of this method shall be in accordance with API 653 by a certified API 653 inspector, or another industry accepted industry standard and certified inspector, and the criteria specified in this method. Only complete and properly performed and reported inspections shall be used, as determined by a certified API 653 inspector, a PE, or a SME.

5.6. Personnel Qualifications 5.6.1 The assessment method described in this method for determining TNI shall only be performed by personnel who have been trained to implement this method and who are under the supervision of either a Certified API 653 Inspector or a professional engineer (P.E.).

5.6.2 The personnel performing a leak-detection integrity test shall be trained in the use of the method by the testing company or under the supervision of a professional Engineer (P.E.).

5.6.3 An API 653 External Inspection of an AST shall be performed only by personnel who are certified by and have successfully completed an API training class to become a certified inspector, or an equivalent.

5.6.4 The tank bottom or floor thickness measurements shall be shall be performed by personnel who are certified by NACE, API, or other equivalent professional organizations in the specific bottom measurement system being used, or personnel who are trained by and work under the supervision of a Certified API 653 Inspector or a P.E.

5.6.5 Only out-of-service API 653 Internal Inspection Reports that (a) are performed by a certified API 653 inspector, (b) include and report sufficient tank bottom thickness measurements that indicate the underlying mean (or median) and minimum bottom thickness of the entire tank bottom due to localized uniform corrosion, pitting, thinning, cracking, or other penetrations, and (c) include and report one or more thickness measurements in close proximity to the bottom thickness measurement made in Step 2 of this method (i.e., usually on the same welded bottom plate or adjacent plates) shall be used. The minimum thickness and maximum corrosion rate determined in the previous API 653 internal inspection shall be updated proportionally to the current in-tank measurement of the bottom thickness by the ratio of the bottom thickness measurements made at the location of the bottom thickness measurements made in Step 2 of this method, which ration should be no greater than 2.0 or less than 0.5.

5.7 Hazards

Sensors, sensor system, electronic system, data acquisition systems, and/or computers shall meet the appropriate safety methods in accordance with the storage tank facility safety requirements.

5.8 Sampling, Test Specimens, and Test Units 5.8.1 Leak Detection Integrity Methods or Systems. An AST with a single-bottom shall be tested for integrity following the testing protocol specified in the independent third-party evaluation report. The output of the leak detection integrity test will be a Pass or a Fail using one or more thresholds to declare a leak at the specified level of performance. For in-tank volumetric, mass-based, and tracer test methods, the leak detection test will be operated as indicated by the third-party evaluation report to detect a specified leak rate where the system is operated to have a $P_D \geq 95\%$ and a $P_{FA} \leq 5\%$. For other systems, the threshold will be specified in the third-party evaluation report. The data collected and the analysis performed to obtain the test result will follow the protocol in the third-party evaluation report.

An AST with a double-bottom shall be tested for integrity following the testing protocol specified by the manufacturer and approved by a PE or a certified API 653 inspector. The data collected and the analysis performed to obtain the test result will follow the protocol specified by the manufacturer or developer of the method and approved by a PE or a certified API 653 inspector. If a tank with a double-bottom is tested for integrity with a third-party evaluated method, the test should be performed following the same procedure as described for single-bottom tank tests.

5.8.2 Bottom Thickness Measurement Sensor System. A minimum of four, and up to 5, independent replicate measurements of the thickness of the tank bottom shall be made in at least one location on the bottom of the tank; these replicate measurements result in a total of 8 and preferably 10 bottom thickness measurements at each location. The mean, median, maximum, minimum, and standard deviation shall be computed. The thickness of the bottom plate shall be determined by the mean or median provided that all of the individual data points are within three, and no more than five, standard deviations the from the mean value. If not, the outlier points should be removed when determining the mean provided that a minimum of eight thickness measurements are used; if not, the thickness measurements shall be repeated. If the same result occurs, the thickness measurements should be made at another location. The objective is to determine the average tank bottom thickness so that the uniform corrosion rate of the tank can be determined.

5.8.3 AE Corrosion Activity Test (AECAT). An AE Corrosion Activity Test shall be performed following the manufacturer's testing protocol. Most test protocols require AE measurements to be made at a specified product level as a percentage of capacity, use a waiting period of 6 to 12 h or longer, and to collect 30 min to 1 h of AE data. The level of active corrosion of the bottom of the tank is determined from the number and spatial distribution of the individual corrosion activity impulsive signals that are detected and located on the bottom (or floor) of the tank.

The results are graded from A to E following [11]. Grade A indicates that there is no active corrosion activity of the tank bottom and that no maintenance or repair of the tank bottom is required. Grade B indicates some active corrosion activity may be occurring, but no maintenance or repair of the tank bottom is required. The AECAT test result is a pass if a Grade A result is achieved. A Grade B test result is also a pass provided that the AECAT test does not indicate the presence of localized or spot corrosion, as evidenced by a local accumulation of corrosion activity noise hits on the tank bottom. Under special circumstances, Grade C results can also be used if a previous out-of-service API 653 internal inspection report is available and meets the criteria specified below.

Grade C can only be used if the method is implemented meeting the following six criteria. First, the AECAT test does not indicate the presence of localized or spot corrosion, as evidenced by a local accumulation of corrosion activity noise hits on the tank bottom. Second, a previous out-of-service API 653 internal inspection that meets the criteria specified in this method in Steps 9 and 10 are available and are used. Third, the tank bottom has a minimum of five (5) years of thickness remaining before the minimum allowable thickness, $T_{MAT}$, is reached when computed using the mean corrosion rate distribution due to pitting, $<CR_{max}>$, of the distribution used for $F_X(x)$ and the minimum tank bottom thickness in the previous API 653 internal inspection, $T_{P\ min}$. For this criteria to be met, $[(T_{P\ min}-T_{MAT})-((t_0+5)*<CR_{max}>T_{P\ min})]\geq 0$. Fourth, the third criterion stated above is met using the maximum corrosion rate determined in the API 653 internal inspection. Fifth, in the opinion of a PE, the results of the previous out-of-service API 653 internal inspection indicates that the tank bottom is in such good condition that an estimate of TNI can be made with a Grade C AECAT test result. Sixth, a PE approves the use of a Grade C test result.

5.8.4 API External Inspection. If an external inspection of the tank is performed, it shall be performed following the requirements for external inspections in API 653. The number and type of measurements are specified in API 653.

5.8.4 Out-of-Service API 653 Internal Inspection. If a previous out-of-service API 653 internal inspection report has been performed that meets the criteria specified in Steps 9 and 10, it shall be used to compute TNI-α and TNI unless (1) the report or the inspection was determined by a certified API 653 Inspector, a PE, or a SME to be poor, inadequate, or not sufficiently reliable to use in this method; (2) the bottom thickness measurements and corrosion rates were not made in the approximate location of the measurements made in Step 2 as part of this method; or (3) the measurements of the minimum thickness and maximum corrosion rate reported in the API 653 report cannot be justified by the measurements presented in the report.

5.9 Preparation of Apparatus 5.9.1 Leak Detection Integrity Method or System. The leak-detection integrity system used to determine whether or not the bottom of the tank has integrity shall be prepared (and implemented) in accordance with the third-party evaluation report and the manufacturer's recommendations.

5.9.2 Bottom Thickness Measurement Sensor System. The sensor system used to make thickness measurements of the bottom of the tank shall be prepared (and implemented) in accordance with the manufacturer's recommendations.

5.9.3 AE Corrosion Activity Test (AECAT). The AE Corrosion Activity Testing System used to determine whether or not active corrosion is occurring on the bottom of the tank shall be prepared (and implemented) in accordance with the manufacturer's recommendations.

5.9.4 In-Service API 653 External Inspection. The sensor systems used to make the measurements in an API 653 External Inspection shall be prepared (and implemented) in accordance with API 653 and the manufacturer's recommendations.

5.10 Calibration and Standardization

Each of the sensors or measurement systems used in the implementation of this method shall be calibrated on an annual basis in accordance with the manufacturer's specification to verify the measurement sensors comprising the total measurement system are in compliance with the precision and bias specified by the manufacturer and as required by this method.

5.10.1 Leak Detection Integrity Method or Test System. The tank sensors comprising the leak detection integrity method or system shall be calibrated on an annual basis in accordance with the manufacturer's specifications. (NOTE: Calibration is required whenever the sensors are removed from service for maintenance or repair.)

5.10.2 Bottom Thickness Measurement Sensor System. The tank bottom thickness measurement system shall be calibrated on an annual basis in accordance with the manufacturer's specifications to determine the precision and bias of the thickness measurements. In addition, a field calibration check of the tank bottom thickness measurement sensor should be performed during each application of this method to ensure the sensor is functional.

5.10.2 AE Sensors used in a AE Corrosion Activity Test (AECAT). The AE sensors shall be calibrated in accordance with the manufacturer's specifications. The AE sensors and electronics used during the implementation of this method should be checked in the field to insure the AE sensors are responding with a minimum SNR as specified in Section 6.3. For AE tests performed with AE sensors mounted on the walls, a 0.5 mm lead in a mechanical pencil could be broken at one or more locations of the tank wall to insure that each AE sensor could detect reliably this broken lead signal if it were to occur anywhere on the bottom of the tank. Alternatively, or in addition to the pencil-lead test, a mechanical clicker can be placed in and near the bottom of the product contained in the tank to produce impulsive signals like those produced by active corrosion pulses.

5.11 Procedure

As illustrated in FIGS. 1-3, FIG. 2, and Tables 1-3, there are six major activities comprised of 12 steps that shall be considered when using this method. Section 4 presented an overview of the method and the major activities. In this section, the individual steps to implement this method are described in detail. The Excel-compatible Workbook indicated in Section 5.1.19 can be used to implement this 12-step procedure.

5.11.1 Overview of the 12-Step Method. There are five Annexes and 12 Appendices included in this method. These annexes and appendices are listed in Tables 4 and 5. Annex A1 provides the minimum information required to report the output of this method. The input data used to implement this method and the output results of the method are presented on this form; this form also includes graphical displays of $F_X(x)$, $F_Y(y)$, $S_Y(y)$, and $S_Y(y/t_0)$ used in the analysis. Annex A2 presents the equations that are solved in the Workbook, or need to be solved if the Workbook is not used to generate the PDFs and the CDFs of $F_X(x)$, $F_Y(y)$, $S_Y(y)$, and $S_Y(y/t_0)$. Annex A3 describes a general approach for developing a Weibull corrosion rate distribution, $F_X(x)$, from an empirical CFD of maximum corrosion rates for the tank of interest. Annex A4 describes how to mathematically transform the corrosion rate distribution, $F_X(x)$, to obtain the tank failure distribution, $F_Y(y)$, and Annex A5 presents the equations and describes how to determine TN-ER using the tank survival distribution $S_Y(y)$ and the Bayesian update, $S_Y(y/t_0)$, of the survival distribution.

Appendix X1 provides a standard form that could be used for reporting the TNI results of this method, and Appendices A2-A12 provide illustrations of the implementation of the method. Appendix X2 provides a detailed flowchart of this 12-step method showing the logic for implementation of the activities and steps summarized in Table 2. Appendices X3-X6 provides example illustrations of the probability density functions (PDFs) and the cumulative distribution functions (CDFs) of the four statistical distributions ($F_X(x)$ $F_Y(Y)$ $S_Y(y)$, and $S_Y(y/t_0)$) required to implement this method. Appendix X3 illustrates a CFD developed from the corrosion rate data in Appendix A7 and a least squares fit to this CFD using a Weibull CDF to develop $F_X(x)$. The $F_X(x)$ CDF shown is for uniform corrosion rates between 0 and 0.50 mpy. Once $F_X(x)$ has been generated for the tank of interest, the remaining distributions ($F_Y(y)$, $S_Y(y)$, and $S_Y(y/t_0)$) and the determination of TNI-ER follow mathematically. Appendices X4-X6 present graphical illustrations of $F_Y(y)$, $S_Y(y)$, and $S_Y(y/t_0)$ for this $F_X(x)$.

Appendix X7 describes the corrosion rate data that can be used to implement this method. Appendix A8 presents three $F_X(x)$s to use in implementing this method that are Weibull fits to the CFDs of maximum corrosion rate distributions developed from the corrosion rate data in Appendix 7 and that are associated with three uniform corrosion rate conditions. A total of 312 corrosion rate data samples were used to generate these three $F_X(x)$s; each $F_X(x)$ was developed using 80 to 128 corrosion samples. While the use of these corrosion rate data is not required, this method recommends their use, because the data set is large, comprehensive, conservative, and acquired under a controlled study over an 18 year period at 47 locations throughout in the continental United States. The corrosion rate distributions due to maximum pitting that are used in this method, $F_X(x)$, were generated from the corrosion rates that occurred 9.6 to 12.1 years after installation.

Appendix X9 presents graphical illustrations of $F_Y(y)$, $S_Y(y)$, and $S_Y(y/t_0)$ for different survival probability age regions, and Appendix X10 presents graphical illustrations of the use of $S_Y(y)$ and $S_Y(y/t_0)$ to determine TNI-ER using Equivalent Risk for different survival probability age regions. These illustrations show graphs of $S_Y(y/t_0)$ superimposed on $S_Y(y)$ between $y=t_0$ and $y=t_N$, where $S_Y(y=t_N/t_0)=S_Y(y=t_0)$.

Appendix 11 presents an overview of how to use the Excel-compatible Workbook indicated in Section 5.1.9, and Appendix 12 describes and presents illustrations of the input and output of the Workbook for two tank assessment scenarios in the Excel-compatible Workbook indicated in Section 5.1.19.

nation of TNI-ER. If a previous out-of-service API 653 internal inspection is available and meets the criteria in this method, a second estimate of TNI can be made, TNI-α, and used in combination with TNI-ER to determine TNI.

A detailed description of the 6-activity, 12-step method provided in Tables 1 and 2, and FIGS. 1 and X2.1, is provided below. As indicated by Table 3 and described briefly in Section 4.2, it should be noted that this 12-step method can be implemented very efficiently, as described and illustrated in Appendices X11 and X12, using the Excel-compatible Workbook indicated in Section 5.1.19. The tank owner/operator can compute TNI-ER using the Excel-compatible spreadsheet once the tank (1) PASSES a leak detection integrity test indicating that the tank has survived to the application of this method with integrity; (2) PASSES an acoustic emission corrosion activity test (AE-CAT) indicating no or minimal corrosion activity is occurring; (3) PASSES a review of an API 653 external inspection performed in the last 5 years indicating that this review does not prohibit the use of this method for non-tank-bottom issues; and (4) MADE eight to ten measurements of the tank bottom thickness at each of one or more locations in the tank of interest. TNI-α can contribute to the calculation of TNI if (l) a previous out-of-service API 653 internal inspection exists and meets the criteria in this method; (2) measurements of bottom thickness and corrosion rate in the previous API 653 internal inspection were made in the approximate vicinity as those measurements made in Step 2; and (3) the survival probability of the tank bottom is greater than 50% (Survival Probability Age Regions A and B).

TABLE 4

List of the Annexes supporting the calculations and illustrating the output of this method.
Annexes

| | |
|---|---|
| Annex A1. | Reporting the TNI Results of this Method |
| Annex A2. | Equations for Generating Weibull CDFs for $F_X(x)$, $F_Y(y)$, $S_Y(y)$, $S_Y(y/t_0)$, and TNI-ER |
| Annex A3. | General Approach for Developing $F_X(x)$ from a CFD of Tank Bottom Corrosion Rates |
| Annex A4. | Mathematical Transformation of $F_Y(y)$ from $F_X(x)$ |
| Annex A5. | Equations for Computing TN-ER from $S_Y(y)$ and $S_Y(y/t_0)$ |

TABLE 5

List of the Appendices supporting the calculations and illustrating the output of this method.
Appendices

| | |
|---|---|
| Appendix X1. | Standard Form for Reporting the TNI Results of this Method |
| Appendix X2. | Background and Overview of the Method |
| Appendix X3. | Illustration of $F_X(x)$ and $f_X(x)$ Developed from a CFD of the Maximum Corrosion Rate due to Pitting for Uniform Corrosion Rates between 0.50 and 1.0 mpy |
| Appendix X4. | Illustration of $F_Y(y)$ and $f_Y(y)$ for $F_X(x)$ in Appendix X3 |
| Appendix X5. | Illustration of $S_Y(y)$ and $s_Y(y)$ for $F_Y(y)$ and $f_Y(y)$ in Appendix X4 |
| Appendix X6. | Illustration of $S_Y(y)$ and $S_Y(y/t_0)$ for $F_X(x)$ in Appendix X3 Used to Compute TNI-ER |
| Appendix X7. | Description of the Corrosion Data Used to Develop $F_X(x)$ |
| Appendix X8. | Corrosion Rate Distributions for $F_X(x)$ due to Maximum Pitting as a Function of Uniform Corrosion Rate Distributions to Use in Step 4 and to develop $F_Y(y)$ in Step 5 |
| Appendix X9. | Illustration of Survival Age Regions (A, B, C, and D) |
| Appendix X10. | Illustration of TNI-ER for Different Survival Age Regions for $F_X(x)$ in Appendix X3 |
| Appendix X11. | Overview of the Excel-compatible Workbook to Generate $F_X(x)$, $F_Y(y)$, $S_Y(y)$, $S_Y(y/t_0)$, TNI-ER, TNI-α, and TNI |
| Appendix X12. | Numerical Illustrations of the 12-Step Method Using the Excel-compatible Workbook |
| Appendix X13. | Definitions |
| Appendix X14. | Mathematical Symbols |
| Appendix X15. | Acronyms and Abbreviations |
| Appendix X16. | Basiic Input and Output Parameters |

5.11.2 The 12-Step Method. The time to the next out-of-service API 653 internal inspection of the tank bottom, $TNI=t_0-t_N$, is determined in this method from the determi- The computation of TNI-ER requires that the tank bottom has survived to $t_0$ and that the measurement of the average corrosion rate, $CR_{avg}$, made from a few bottom thickness measurements obtained at one location in the tank is representative of the uniform corrosion rate of the entire tank bottom. The leak detection integrity test determines whether or not the tank bottom has survived. A PASS indicates survival. Analysis of the UT bottom thickness measurements made in many previous API 653 internal inspection reports indicates that the local measurements of tank thickness made at one location is sufficient to determine the uniform corrosion rate for the entire tank bottom. A PASS for the AECAT test indicates that no or minimal active corrosion activity is present in the tank bottom (Grade A, or Grade B without areas of high corrosion) and confirms that the local bottom thickness measurements are representative of the entire tank bottom. The average corrosion rate made from the bottom thickness measurements is used to select a corrosion rate distribution, $F_X(x)$, for the maximum pitting corrosion rate in the tank of interest. Once $F_X(x)$ is selected, TNI-ER can be determined. If a previous out-of-service API 653 internal inspection exists and meets the criteria specified in this method, TNI-α can be determined by entering the corrosion rate data into the Excel-compatible Workbook. TNI, TNI-ER, and TNI-α are output by the Workbook. In addition, the Workbook output graphs of the probability distributions $F_X(x)$, $F_{X'}(x)$, $F_Y(y)$, $S_Y(y)$, and $S_Y(y/t_0)$. The current API 653 external inspection is used only to indicate if the tank of interest may have other issues that control the survival of the tank that are more critical than the tank bottom.

Activity 1 (Step 1): Does the Tank Owner/Operator Want to Apply this Method?

Step 1—Determine Whether or not the Tank Owner/Operator Wants to Use this Method, and if so, What Benefit (or Benefits) Does the Tank Owner/Operator Receive by Applying this Method? The objective of Step 1 is to determine whether or not there is a need or benefit for applying this method. Such needs or benefits, which were discussed briefly in Section 4, may include operational, cost, or environmental benefits. Two important applications of this method were presented in Section 5.1.7.

This method and the corrosion rate data provided as part of this method are intended to address atmospheric, field-erected, steel ASTs containing refined petroleum products (or water), where the useful service life of the tank or the time between out-of-service internal inspections is controlled by the corrosion of the bottom or floor of the tank. This method, however, can also be used for bulk UST with vertical walls and a flat bottom and for shop fabricated ASTs containing refined petroleum and water.

It should be noted that this method allows the tank operator/owner to perform an out-of-service API 653 internal inspection at any time, regardless of the magnitude of TNI. Also, if the tank owner/operator decides not to apply this method and the tank is scheduled for an out-of-service API 653 internal inspection, then this method recommends that such an inspection be performed as scheduled.

Activity 2 (Steps 2 and 3): Perform In-Service Measurements on the Tank of Interest to Determine If the Tank Meets the Minimum Requirements for the Application of the Method, i.e. Can the Method be Used, and if so, to Use these Measurements in the Application of this Method.

Four sets of in-service measurements that meet the criteria specified in this method shall be performed before this method can be applied. If the tank does not meet the criteria specified for each set of these measurements, then this method shall not be applied. These measurements can be performed in any order, but the requirements for all of the tests must be met in order to determine TNI using this method. Operational, cost, and environmental impacts are all valid reasons for determining which set of tests or measurement are implemented first. The required measurements made as part of this method are described in Step 2, and the applicability of this method is determined in Step 3.

Step 2—Make In-service Measurements of the Integrity, Thickness, and Corrosion Rate of the Tank Bottom at $t_0$. Four sets of in-service measurements of the tank bottom shall be performed as part of this method. These in-service measurements include:

(1) A Leak Detection Integrity Test
(2) An Acoustic Emission (AE) Corrosion Activity Test (AECAT)
(3) Thickness measurements of the tank bottom at one or more locations in the tank
(4) An API 653 External Inspection that has been completed within the last 5 years (and continues to be performed on a 5-year schedule)

The objective of (1) is to determine whether or not the bottom of the tank of interest, which is not accessible or inspected during an API 653 external inspection, has survived to $t_0$. The tank has survived to $t_0$, if the result of the leak detection integrity test is a PASS. If the test result is a FAIL, then this method cannot be applied.

The objective of (2) is to determine if there is any active corrosion activity in the tank. If the AECAT test results show no or minimal active corrosion activity (i.e., a PASS), then this method can be applied. A pass indicates that there are no localized concentrations of high corrosion activity. A pass also confirms that a local measurement of the uniform corrosion rate is representative of the entire tank. A Grade A test result, which is defined in [11], and shows no active corrosion activity and requires no maintenance or repair to the tank bottom, is designated as a PASS for this method. A Grade B, which is also defined in [11], and shows only minimal active corrosion activity and requires no maintenance or repairs to the tank bottom, is designated as a PASS for this method provided that there are no local concentrations of corrosion activity. If the test result is a FAIL, then this method cannot be applied, unless, as described in Step 10, the results of a previous out-of-service API 653 internal inspection, as determined by a PE, a certified API 653 inspector, or a SME provides sufficient additional information about the previous corrosion of the tank bottom to permit the use of this method.

The objective of (3) is to determine the average thickness, $T_{avg}$, and the uniform corrosion rate, $CR_{avg}$, of the tank bottom to use in selecting the corrosion rate distribution, $F_X(x)$, due to maximum pitting of the tank bottom. A total of 8 to 10 thickness measurements should be made at each location, preferably using 4 to 5 replicates, over a region of about 6 in. to 3 ft, or more.

The objective of (4) is to determine if the accessible portions of the tank, such as the walls, roof, chime, or appurtenances, have immediate maintenance or repair needs that override the existing internal inspection interval based on the tank bottom or suggest that the tank bottom should be inspected at this time. This external inspection is considered a PASS for this method if no maintenance and repair activities need to be performed immediately, and TNI, which is based on the condition of the tank bottom, can be determined using this method. This decision is made by a certified API 653 inspector. It should be noted that it is a requirement of this method that in-service API 653 external inspections be performed on a 5-year schedule during the TNI time interval, or TNI should be shortened to meet the valid external inspection coverage period. The internal inspection interval or TNI should also be shortened if the results of the external inspection indicate potential problems in the roof, walls, or appurtenances that can only be addressed during an out-of-service API 653 internal inspection. In general, this method recommends that an in-service API 653 external inspection be performed as part of this method.

Leak Detection Integrity Test A Leak Detection Integrity Test (also called, for example, a Precision Tank Test, a Tank Tightness Test, or a Tank Integrity Test) is performed to determine whether or not the tank has survived to $t_0$. A PASS indicates that the tank of interest has survived to $t_0$. If the tank has survived to $t_0$, then the Bayesian update, $S_Y(y/t_0)$, of the underlying survival probability CDF, $S_Y(y)$, can be generated in Step 7 and used to compute TNI-ER in Step 8.

The leak detection integrity test can be performed with an in-tank or an ex-tank leak detection system or method provided that it meets the criteria specified in this method. Survival is determined by whether or not the tank has integrity, i.e., whether or not it is leaking, and survival is assessed in this method by whether or not the tank PASSes the leak detection integrity test. Step 2 requires the conduct of a leak detection test with a test method for a single-bottom or a double-bottom AST (or bulk UST) in accordance with the apparatus, calibration, personnel, and test method performance criteria in Sections 6, 7, 8, and 10 of this method. For single-bottom tanks, the tank shall PASS a test with a Leak Detection Integrity Test using a test method that has been evaluated for performance by an independent, nationally recognized, third-party. Any method (1) listed by or (2) evaluated in accordance with (1) the NWGLDE or (2) a national recognized method qualifies. For double-bottom tanks, the tank shall PASS a test with a Leak Detection Integrity Test using a test method that (1) meets the method for a single-bottom tank or (2) has been evaluated by or used by a PE or a certified API 653 inspector in accordance with industry practice or nationally recognized methods. If the tank FAILs (i.e., does not PASS) a leak detection test, this method recommends, after checking and verifying the leak detection result, that the tank should be taken out-of-service and internally inspected following API 653.

If the tank PASSes a leak detection test, it meets a critical criteria to be a candidate for application of this method, because a passing test result indicates that the tank bottom still has life remaining, and thus, it meets the minimum criteria for use of the Bayesian update of the survival distribution, $S_Y(y)$, to determine TNI-ER. However, until further measurements of the tank bottom thickness and corrosion rate are made, it is not known how much life remains. How much life remains will depend on the tank bottom thickness and corrosion rate measurements made in Step 2 (and Step 10, if a previous API 653 internal inspection exists and meets the criteria in this method).

AECAT Test Results. An AECAT test is performed (1) to determine if there is active corrosion in the tank, (2) to confirm that local measurements of bottom thickness at one, or at most, only a few locations, can be assumed to be representative of the entire tank bottom, and (3) to determine if there are localized regions of the tank bottom that that have a high rate of corrosion.

In-service API 653 External Inspection. API recommends that an in-service API 653 external inspection be performed on a 5-year interval. This in-service assessment is used to determine if the AST needs maintenance or repairs on an interval that is shorter than the one associated with an out-of-service API 653 internal inspection. The time interval between internal inspections, which is controlled by the thickness and corrosion rate of the tank bottom, is determined from the minimum thickness, $T_{min}$, and maximum corrosion rate, $CR_{max}$, of the tank bottom and is usually between 10 and no more than a maximum of 20 years for tanks without a RPB and 30 years for tanks with a RPB. If the external inspection indicates hat there are no maintenance or repair problems, then it shall be assumed that tank bottom corrosion controls the implementation of this method.

Bottom Thickness Measurements. The in-service measurement of the average (or median) bottom thickness, $T_{avg}$, and the average corrosion rate, $CR_{avg}$, have three purposes. First, they are used as a first check, or pre-screening check, to determine if the tank bottom has sufficient thickness to allow the use of this method. Two simple checks, which are based on these thickness measurements, are made. Second, they are used to select or generate the corrosion rate distribution, $F_X(x)$, in Step 4, which is due to the maximum pitting of the tank bottom. $F_X(x)$ is then used to determine $F_Y(y)$, $S_Y(y)$, and $S_Y(y/t_0)$ in Steps 5-7 for use in determining TNI-ER in Step 8. Third, they are used in conjunction with the results from a previous out-of-service API 653 internal inspection to determine TNI-α.

The bottom thickness measurements made in this method can be used to determine the uniform corrosion rate, $CR_{uniform}$, for the entire tank bottom. $CR_{uniform}$ is then used to select the distribution of the maximum corrosion rate, $F_X(x)$, of the tank bottom due to pitting that is associated with this uniform corrosion rate. $T_{avg}$ measured in Step 2 is used to compute the average corrosion rate, $CR_{avg}$, where it is assumed that $CR_{avg}=CR_{uniform}$ for the tank bottom. This assumption has been validated on many occasions by comparing the corrosion rate measured using any UT bottom thickness measurement in previous out-of-service API 653 internal inspections to any other thickness measurement made. This is further verified, because pitting corrosion cannot be measured accurately using a UT sensor. Finally, a PASS in the AECAT test means no unusually large local or active corrosion due to pitting, thinning, cracking, or other penetration is occurring in the tank.

A minimum of 4 replicates measurements and preferably 5, (i.e., 8 to 10 thickness measurements) shall be made at one or more locations in the tank of interest. Step 2 describes how to make the bottom thickness measurements and how to verify that $CR_{avg}=CR_{uniform}$. $T_{avg}$ and $CR_{avg}$ are first used to determine if the value of $T_{MAT}$, which is used to define tank bottom failure, is sufficient. $T_{MAT}$ is sufficient if $T_{avg} \geq T_{MAT}$ and the maximum error in $CR_{avg}$ does not result in a thickness error over the time interval $t_0$-$t_p$ that is larger than $T_{MAT}$. The maximum error is defined as three times the standard deviation of the average corrosion rate determined from the 8 to 10 bottom thickness measurements made in Step 2. If it is determined that $T_{MAT}$ is not sufficient (in providing a factor of safety in defining tank bottom failure), this method recommends that either $T_{MAT}$ be increased by 0.05 in., or preferably, that an out-of-service API 653 internal inspection be performed.

The tank bottom thickness measurements, $T_{i,j}$, where i=1, 2, ..., n are number of locations where tank bottom thickness measurements are made, and j=1, 2, ..., 8, ..., N are the number of sensor thickness measurements made at each location, i, should be with a sensor system with a precision and bias of at least 0.010 in., respectively. The actual precision and bias will depend on (1) the precision and bias of the sensor as specified by the manufacturer and verified during the annual calibration certification of the thickness sensor system and (2) the number of thickness measurements average together. The measurements can be made at any convenient tank opening and shall be made on the tank bottom and not on a strike plate or other protective plate covering the bottom. The mean or average, median, minimum, maximum, and standard deviation should be determined from a minimum of four and preferably five independent replicate measurements of bottom thickness measurements made at each location, i.e., a total of 8 to 10 measurements. Each replicate thickness measurement should be non-overlapping so that measurement independence can be maintained. At a minimum, small position differences of 1 to 6 in., or more, are recommended for each of the replicate measurements. This method recommends a square or rectangular sampling pattern with two measurements made in the center of the square or rectangle and with two measurements made at each corner of the square or rectangle. If an in-tank thickness sensor is used, it should be lifted from or near the bottom and placed back on or near the bottom for each measurement.

The measurements of bottom thickness, $T_{i,j}$, are made when this method is applied, to, to determine the mean (or median) bottom thickness, $T_{avg}$ at $t_0$ or $T_{0\ avg}$. The mean (or median) corrosion rate, $CR_{avg}$ at $t_0$ or $CR_{0\ avg}$, is determined from the change in the mean (or median) thickness since the last time, $t_P$, that measurement of bottom thickness was measured at approximately the same location in the tank. This would typically be either the age of the tank when it was initially constructed or when the tank was last taken out-of-service for an API 653 internal inspection. The mean (or median) corrosion rate, $CR_{avg}$, is determined using Eq. (5.11.1).

$$CR_{avg} = CR_{0\ avg} = [(T_{0\ avg} - T_{P\ avg})]/[t_0 - t_P] \qquad (5.11.1)$$

The measurement of thickness at $t_P$ during a previous out-of-service API 653 internal inspection, $T_{0\ avg}$, may be comprised of only one measurement, because only a few tank bottom measurements may have been made at the same proximity at $t_P$ as those made in Step 2 at $t_0$. This is taken into account when checking the precision and bias in Section 16. The thickness at $t_P$ measured is considered highly reliable, because it was made by a person in the tank while the tank was out-of-service, did not have fuel in the tank, and the bottom had been cleaned of any sediment, sludge, or debris.

If bottom thickness measurements are made at multiple locations, i.e., the average value of bottom thickness should be used. If one or more locations clearly show local thinning, which is not due to the average or uniform corrosion rate of the tank bottom, these bottom thickness measurements should be removed from the average when determining $T_{0\ avg}$, because $T_{0\ avg}$ should be the best estimate of $T_{0\ uniform}$ so that it can be used to determine the uniform corrosion rate of the than bottom, $CR_{0\ avg}$.

In most instances, measurements of $T_{i,j}$ that are made to determine $T_{avg}$ and $CR_{avg}$ will be only made at one location, i=1, and will be comprised of j=8 and preferably j=10 independent measurements. At each bottom thickness measurement location, i, three measurement checks will be made. The first check is to determine the validity of each of the in-service thickness measurements made. The second measurement check is to determine if the measurements are representative of the uniform corrosion rate. The third check is to determine if location i is a location of local thinning and not representative of uniform corrosion.

The first check is accomplished by determining if there are any large or obvious differences in any of the replicate measurements, and if there are, to make a determination of whether or not either or both of the two measurements are valid. Differences might be observed, for example, if the presence of sludge at the bottom of the tank makes it difficult to make solid contact with the actual tank bottom. In most instances, such differences in the replicate measurements can be addressed in the field while the measurements are being made by repeating the measurement until good agreement is obtained. If a difference still exists after the measurements are complete, one or more of the thickness measurements can be removed before computing the average thickness. This can be determined quantitatively by comparing each thickness measurement to the mean thickness $T_{avg}$ determined from the other valid thickness measurements. One or both thickness measurements should be included in the average if one or both of the thickness measurements are within five standard deviations of the mean thickness.

The second check is accomplished by comparing each of the valid thickness measurements j to the mean or average thickness, $T_{0\ avg}$, at each location i to determine if these measurement differences are within five standard deviations, $S_{i,j}$, of the mean. Previous studies, each with many UT sensor thickness measurements of the tank bottom from previous out-of-service API 653 internal inspection reports, indicate that the average thickness of the tank is controlled by the uniform corrosion rate of the tank bottom and the average corrosion rate determined from all of the thickness measurements controlled by uniform corrosion are generally within 3, and no more than 4 to 5, standard deviations of the average corrosion rate. Thus, the corrosion rate determined at any location i will be within 5 standard deviations of the average or mean corrosion rate, $CR_{0\ avg}$. If a corrosion rate is more or less than 5 standard deviations of the mean corrosion rate, $CR_{0\ avg}$, it can be assumed that it is not controlled by uniform corrosion and should be removed from the average. A minimum of 8 corrosion rate measurements should be used to determine $CR_{0\ avg}$.

The third check is designed to identify locations controlled by local thinning produced by corrosion rates higher than the uniform corrosion rate. These accomplished if the mean corrosion rate is greater than 2 mpy. If $CR_{0\ avg} > 2$ mpy, bottom thickness measurements should be made at another location in the tank to determine $CR_{0\ avg}$ representative of the uniform corrosion rate of the tank.

In summary, Step 2 requires

Use of a sensor system that will measure the thickness of the tank bottom with a precision and bias of at least 0.010 in.;

Eight to 10 (4 to 5 replicate samples) independent thickness measurements of the tank bottom will be made and averaged at each location to determine $T_{0\ avg}$ and $CR_{0\ avg}$ by making at least four non-overlapping measurements at one or more locations;

The mean (average) and standard deviation will be computed from the thickness measurements made at each location;

Three separate checks will be at each location to qualify the bottom thickness measurements.

$CR_{0\ avg}$ is the main output of this step and it will be used in Step 4 to select $F_X(x)$.

Step 3—Does the Tank Meet the Minimum Qualification to Apply this Method? The objective of Step 3 is to determine whether or not the tank bottom thickness measurements were made and the results of each test performed as part of Step 2 meet the criteria specified in this method. This method can be applied if (1) The results of the leak detection integrity test is a PASS, which means the tank bottom has survived to $t_0$, the time of application of this method;
(2) The results of the AECAT test is a PASS, which means there is no or minimal corrosion activity (Grade A, or Grade B with no concentration of corrosion activity), including any localized spots of pitting and high corrosion, and the bottom thickness measurements made in Step 2 can be assumed to be representative of the entire tank bottom;
(3) The results of a current API 653 external inspection (i.e., completed within the last 5 years) does not indicate that the tank has to be taken out-of-service for an API 653 internal inspection or have maintenance or repair issues that will occur sooner than that of the tank bottom that require the tank to be taken out-of-service; and
(4) The results of a minimum of 8 and preferably 10 independent tank bottom thickness measurements from at least one location in the tank that meet the three criteria described in Step 2 and that are necessary to determine $CR_{avg}$.

If all of these criteria are met, this method can be applied. This method provides one exception. With the review and approval of a PE, an SME, or a certified API 653 inspector, this method may also be implemented under special circumstances, as described in Step 11, if a previous out-of-service API 653 internal inspection is used and the results of the AECAT Test is designated as a Grade C with only small amounts of corrosion activity and no local concentrations of corrosion activity. While this method provides for this exception, it does not recommend its use except in special circumstances.

Activity 3 (Step 4): Determine the Corrosion Rate Distribution, $F_X(x)$, due to Maximum Pitting for the Tank of Interest.

Step 4—Select or Generate a Corrosion Rate Distribution, $F_X(x)$, of the Tank Bottom for the Tank of Interest. A CDF of the maximum corrosion rate, $F_X(x)$, due to pitting, is selected for the tank of interest in Appendix 8 based on the measured value of $CR_{avg}$ determined in Step 2.

This method also provides an alternative method for generating $F_X(x)$ based on the measurements of bottom thickness, uniform corrosion rates, and maximum corrosion rates due to pitting from a minimum of 50 independent, previous out-of-service API 653 internal inspections obtained where the inspected tanks experience the same corrosion and operational conditions as the tank of interest. This method recommends using the corrosion rate distributions provided by this method.

Table 6 summarizes the Weibull CDFs of the maximum corrosion rate due to pitting, $F_X(x)$, presented as a function of the uniform (i.e., average corrosion rate), $CR_{avg}$. $F_X(x)$ was developed from the corrosion rate data obtained over 18 years at 47 locations in the continental United States [11]. See Appendix 7 for a description of the corrosion rate data. $CR_{avg}$ is measured in Step 2 and is used to select $F_X(x)$ from Table 6. The CDFs developed from the measurements of the uniform or average corrosion rates, $CR_{avg}$, and the maximum corrosion rates due to pitting, $CR_{max}$, are presented graphically in Appendix 8. Table 6. Summary of the Weibull CDFs of the Maximum Corrosion Rate Due to Pitting, $F_X(x)$, presented as a function of the Uniform Corrosion Rate, $CR_{avg}$, Developed from the Maximum Corrosion Rate Data due to Pitting obtained over 18 years at 47. Locations in the United States [11].

TABLE 6

Summary of the Weibull CDFs of the Maximum Corrosion Rate Due to Pitting, $F_X(x)$, presented as a function of the Uniform Corrosion Rate, $CR_{avg}$, Developed from the Maximum Corrosion Rate Data due to Pitting obtained over 18 years at 47 Locations in the United States [11].

| $CR_{avg}$ | n | Mean $CR_{max}$ (mpy) | Median $CR_{max}$ (mpy) | StDev $CR_{max}$ (mpy) | γ | β | η | MSE Y | MSE X (mpy) |
|---|---|---|---|---|---|---|---|---|---|
| 0 to 0.5 | 80 | 4.641 | 4.530 | 1.755 | 0.10 | 5.10 | 2.80 | 0.03 | 0.22 |
| 2.80 | 128 | 5.753 | 5.075 | 2.615 | 1.55 | 4.70 | 1.65 | 0.03 | 0.27 |
| 1.65 | 104 | 8.176 | 7.740 | 3.308 | 1.00 | 8.10 | 8.10 | 8.10 | 0.27 |
| 2.30 1.80 | 312 | 6.258 | 5.877 | 2.965 | 1.10 | 5.81 | 5.80 | 1.80 | 0.26 |

The Excel-compatible Workbook indicated in Section 5.1.19 provides maximum corrosion data and determines the three parameters of a Weibull CDF (γ, β, and η) using a trial and error least squares curve fit to a cumulative frequency distribution (CFD) of the maximum corrosion rate data due to pitting used in this method. These parameters and the statistics of $F_X(x)$ are shown in Table 6. The trial and error fit minimized the error in corrosion rate, x, and the error in probability of occurrence, $F_X(x)$, where any error less than or equal $t_0+0.5$ mpy in x and less than or equal $t_0+0.05=+5\%$ in $F_X(x)$, is acceptable. Graphical displays of $F_X(x)$ are shown in Appendix 8. Thus, if the uniform corrosion rate, for example, is between 0 and 0.50 mpy, as determined by $CR_{avg}$ in Step 2, then $F_X(x)$ is defined by the three parameters in Table 6 (i.e., α=0.10, β=2.80, and η=5.10); FIG. 8.3 presents the graph of $F_X(x)$. If the alternative method of generating $F_X(x)$ is used, 50 or more out-of-service API 653 internal inspection reports that have the same corrosion and operating conditions as the tank of interest would have to be used to develop a CFD of the maximum corrosion rates.

Once $F_X(x)$ in Step 4 is selected from Appendix 8, the CDFs of $F_Y(y)$ in Step 5, $S_Y(y)$ in Step 6, and $S_Y(y/t_0)$ in Step 7 are computed mathematically and are then used to mathematically compute TNI-ER in Step 8. TNI-ER=$t_N$-$t_0$ is computed from $S_Y(y)$ evaluated at y=$t_0$ and $S_Y(y/t_0)$ evaluated at y=$t_N$ where $S_Y(y=t_N/t_0)=S_Y(y=t_0)$. This method provides both (a) mathematical expressions for $F_X(x)$, $F_Y(y)$, $S_Y(y)$, and $S_Y(y/t_0)$ in Annexes A.2-A.5, and (b) an Excel-compatible Workbook as indicated in Section 5.1.19 to perform the calculations, output the results, and provide graphical displays of these distributions. This method recommends that tank failure and tank survival distributions ($F_Y(y)$, $S_Y(y)$, and $S_Y(y/t_0)$) be determined using the Minimum Allowable Thickness, $T_{MAT}$, as specified in API 653, to define tank bottom failure, where $T_{MAT}$=0.05 in. for a tank with a RPB and $T_{MAT}$=0.10 in. for a tank without an RPB. To be conservative $T_{MAT}$=0.10 in. should be used.

As illustrated in Appendix X3, the CFD of the corrosion rate data, $F_X(x)$, is extreme-valued. While a number of extreme-valued CDF distributions could be used to describe the corrosion rate data, this method uses a Weibull CDF probability distribution to fit the corrosion rate data, because a Weibull distribution is historically used to describe failure, survival, and reliability problems like this one. This Weibull probability distribution is then transformed, as described in Step 5 and Annex A4, to generate $F_Y(y)$. Three-parameter Weibull distributions were generated from least squares fits of the empirically derive cumulative frequency distributions, CFDs, of corrosion rates over a wide range of corrosion conditions. (Note: A normal probability distribution, which is typically. used to describe many statistical variables, does not fit the corrosion rate data well and is not used to generate $F_X(x)$. Even if were used, when $F_X(x)$ is transformed to generate $F_Y(y)$, the result would still be an extreme-valued function.)

Table 7 summarizes the type of corrosion data required from previous out-of-service API internal inspection reports if the alternative method of generating $F_X(x)$ for the tank of interest is used. Other tanks with the same corrosion conditions and the same operating conditions can also use $F_X(x)$. Once these corrosion data are obtained and tabulated, the maximum corrosion rate data needs to be sorted to develop a CFD and a Weibull CDF needs to be fit to the CFD to generate $F_X(x)$.

TABLE 7

Summary of the Corrosion Data Needed from Out-of-Service API 653 Internal Inspection Reports to Generate $F_X(x)$ for a Population of Tanks Operating in the Same Corrosion Environment as the Tank of Interest.

| Number | $CR_{uniform} =$ $CR_{avg}$ (mpy) | $CR_{P\ max-ext-br} =$ $CR_{max-ext-br}$ (mpy) | $CR_{P\ max-int} =$ $CR_{max-int}$ (mpy) | $CR_{P\ max-sum} =$ $CR_{max-sum}$ (mpy) |
|---|---|---|---|---|
| 1 | | | | |
| 2 | | | | |
| 3 | | | | |
| . | | | | |
| N ≥ 50 | | | | |

Activity 4 (Steps 5 through 9): Determine TNI-ER

Step 5—Generate a Tank Failure Probability Distribution CDF, $F_Y(y)$, for the Tank of Interest. The cumulative distribution function (CDF) of the tank failure probability distribution, $F_Y(y)$, to which the tank of interest belongs, is computed in Step 5 directly from $F_X(x)$ generated in Step 4 by a well-established mathematical transformation relating $f_Y(y)$ and $f_X(x)$. This transformation, which is described in Annex 4, describes how to generate a probability density function (i.e., $f_Y(y)$), where one random variable (i.e., Y=tank bottom age at failure) is a strictly increasing function (i.e., Y=g(X)) of another random variable (i.e., X=corrosion rate of the tank bottom) [10]. This function relates the individual measurements of tank age, y, and corrosion rate, x, of the tank bottom using the minimum remaining thickness before tank bottom failure, where y=c/x. Tank bottom failure is defined $T_{MAT}$, and c=$T_{P\ min-ar}$-$T_{MAT}$.

The probability density function, $f_Y(y)$, can be generated from the corrosion rate probability density function, $f_X(x)$ using Eqs. (5.11.2)-(5.11.4), where $f_X(x)$ is generated from $F_X(x)$. Once $f_Y(y)$ is determined, the cumulative distribution function, $F_Y(y)$, can then obtained directly by integrating $f_Y(y)$ from 0 to infinity. In this method, $F_X(x)$ is generated by fitting a three-parameter Weibull CDF to a cumulative frequency distribution (CFD) developed from a corrosion rate data set containing the maximum corrosion rates due to pitting. $F_X(x)$ is given in Eq. (5.11.5). Once the values of the three Weibull parameters ($\gamma$, $\beta$, and $\eta$) are known, both $f_X(x)$ and $F_X(x)$ can be determined directly using Eq. (5.11.4) for $f_X(x)$ and Eq. (5.11.5) for $F_X(x)$. $f_Y(y)$ is then computed by substituting Eq. (5.11.3) and (5.11.4) into Eq. (5.11.2) to get Eq. (5.11.6).

$$f_Y(y)=f_X(g^{-1}(y))*\text{abs}[d(g^{-1}(y))/dy] \qquad (5.11.2)$$

$$\text{where } x=g^{-1}(y)=c/y \qquad (5.11.3)$$

$$f_X(x)=(\eta/\beta)[(x+\gamma)/\beta)^{(\eta-1)}][EXP\{-((x+\gamma)/\beta)^\eta\}] \qquad (5.11.4)$$

$$F_X(x)=1-EXP\{-((x+\gamma)/\beta)^\eta\} \qquad (5.11.5)$$

$$f_Y(y)=(\eta/\beta)[((c/y)+\gamma)/\beta)^{(\eta-1)}][EXP\{-(((c/y)+\gamma)/\beta)^\eta\}][\text{abs}\{(-c/y^2)\}] \qquad (5.11.6)$$

The Excel-compatible Workbook indicated in Section 5.1.19 solves these equations and outputs graphs of these probability distributions. FIG. 4 in Appendix X4 illustrates such a computation graphically.

It is important to note that this transformation is not simply a calculation of tank age from corrosion rate and the measured bottom thickness using Eq. (5.11.3). While not intuitive, the resulting PDF (and CDF) of $f_Y(y)$ (and $F_Y(y)$) will always be a non-symmetrical probability function even if $f_X(x)$ (and $F_X(x)$) were a symmetrical probability function.

The tank failure distribution, $F_Y(y)$, also known as the life expectancy distribution, can be developed in a number of ways. $F_Y(y)$ could be generated directly from a CFD of the corrosion rate data. To facilitate the calculations, in this method, $F_Y(y)$ is generated from a Weibull CDF for $F_X(x)$ that was developed from a CFD of the maximum corrosion rate due to pitting.

Alternatively, $F_Y(y)$ could also be developed directly from a population of tanks with the same corrosion and operational conditions that have actually failed. The data to develop $F_Y(y)$ based on "actual" tank failures would be difficult to obtain and would not be large enough to produce reliable estimates of $F_X(x)$ or cover the range of conditions expected. The use of $T_{MAT}$ to define tank bottom failure is significantly more reliable. Furthermore, the use of corrosion rate data to generate $F_X(x)$ is much larger, easier to obtain and use, and consistent with industry practice.

To be clear, the tank bottom has not actually failed once the minimum allowable thickness, $T_{MAT}$, has been reached, but good industry practice recommends that maintenance and repair be done at that time to avoid the potential of future problems due to corrosion rats higher than expected. While this method recognizes the validity of the alternative methods of generating $F_Y(y)$, this method only uses the corrosion rate distributions for $F_X(x)$ data to develop $F_Y(y)$.

Step 6—Generate a Tank Survival Probability Distribution CDF, $S_Y(y)$, for the Tank Being Evaluated. The cumulative density function (CDF) of the survival probability distribution ($S_Y(y)$) is computed directly from $F_Y(y)$ in Step 5 using the equation $S_Y(y)=1-F_Y(y)$. This is straightforward, because $S_Y(y)$ is obtained by subtracting each value of $F_Y(y)$ from 1.0 for all values of y. The Excel-compatible Workbook was used to develop the plot of $S_Y(y)$ in FIG. 5.1 in Appendix X5 from $F_Y(y)$ in FIG. 4 in Appendix X4.

Step 7—Generate the Bayesian Survival Probability Distribution $S_Y(y/t_0)$. Step 7 is to generate $S_Y(y/t_0)$, the Bayesian update of $S_Y(y)$, where $S_Y(y/t_0)$ is the probability of survival given that the tank bottom has survived to an age of $y=t_0$. The sole purpose of the leak detection integrity test performed in Step 2 is to determine whether or not the tank has survived to its present age, to, so that $S_Y(y/t_0)$ and TNI-ER can be calculated. Given that the test result of the integrity test is a PASS, $S_Y(y/t_0)$ can computed directly from $S_Y(y)$. Annex A5 shows how to compute $S_Y(y/t_0)$ from $S_Y(y)$. The Excel-compatible Workbook performs these calculations and illustrates the results graphically for $S_Y(y/t_0)$ in FIG. 6 in Appendix X6. $S_Y(y/t_0)$ is shown only for tank ages older than to.

Step 8—Determine the Time to the Next Internal Inspection (TNI-ER) using Equivalent Risk. TNI-ER is determined from $S_Y(y)$ and $S_Y(y/t_0)$ using Equivalent Risk, where TNI-ER=$y_2-y_1=t_N-t_0$ is the difference in age when the conditional survival probability at $y_2=t_N$ (i.e., $S(y_2/y_1)=S(t_N/t_0)$) given that the tank has survived to age $y_1=t_0$ is the same as the unconditional probability, $S_Y(y=y_1=t_0)$, at age $y_1=t_0$. If the probabilities of survival are the same at two different times, $y_1=t_0$ and $y_2=t_N$, and the tank is scheduled for an out-of-service API 653 internal inspection at $y_1=t_0$, then the inspection can be performed at either time, $y_1=t_0$ or $y_2=t_N$, with the same risk or probability of survival (or failure). Furthermore, the probability of survival is higher than $S_Y(y=y_1=t_0)$ at $y_1=t_0$ for the entire time interval between $y_1=t_0$ and $y_2=t_N$.

Eq. (A5.6) in Annex A5 indicates that conditional probability at age $y_2$, $S(y_2/y_1)$, is equal to the unconditional probability at age $y_1$, $S(y_1)$, when the unconditional probability at age $y_2$, $S(y_2)$ is equal to the square of $S(y_1)$, i.e., $[S(y_1)]^2$. Thus, $S(y=t_N/t_0)$ can be computed directly from $[S(y=t_0)]^2$, because $S(y=t_N/t_0)=S(y=t_0)$ when $S(y=t_N)=[S(y=t_0)]^2$ and TNI-ER=$t_N-t_0$.

As an illustration, assume that the survival distribution, $S_Y(y)$, is described by a Weibull distribution with $\gamma=0$, $\beta=2$, and $\eta=25$ and the tank operator/owner wants to determine the time to the next out-of-service API 653 internal inspection based on Equivalent Risk, TNI-ER, given that it has been $y_1=t_0=20$ years since the last inspection and given that the tank has passed an integrity test at $y_1=t_0=20$ years. The survival probability at 20 years is $S_Y(y_1=20 \text{ yrs})=0.5273$ and the square of the survival probability at 20 years is $S_Y(y_1=20 \text{ yrs})^2=(0.5273)^2=0.2780$. The age at $y=y_2$ can be determined from the Weibull probability tables ($y_2=28.2840$), or it can be computed directly using the inverse function of the Weibull Survival Distribution, $S^{-1}(y_2)=\eta*\text{EXP}[\ln(-\ln(S_Y(y_2))/\beta]=25*\text{EXP}[\ln(-\ln(0.278037)/2]=25*1.131371=28.284$. TNI-ER=$y_2-y_1=28.2840-20=8.2840$ years.

The Excel-compatible Workbook indicated in Section 5.1.19 computes TNI-ER=$y_2-y_1=t_N-t_0$ directly. As stated above, the Excel-compatible spreadsheet will yield TNI-ER once the following parameters are entered into the spreadsheet:

(1) the current age of the tank in years since the last out-of-service bottom inspection of the tank bottom (either a previous API 653 internal inspection or when the tank was new) at the time of the application of this method, $t_{0\ age}$, where $t_0=t_{0\ age}-t_{P\ age}$, (2) the bottom thickness measurements made in Step 2, (3) the age of the tank in years when the thickness of the tank bottom was last made, $t_{P\ age}$, where $t_P=t_{P\ age}$, − $t_{P\ age}=0.0$, and (4) the mean thickness of the tank bottom, $T_{P\ age}$, at $t_{P\ age}$.

If no additional bottom thickness and corrosion rate information are available through a previous out-of-service API 653 internal inspection, then TNI=TNI-ER. If a previous out-of-service API 653 internal inspection is used, the Workbook will also compute TNI-α as described in Activity 5, Steps 9-11, and then output TNI based on both TNI-ER and TNI-α, Step 12.

It should also be noted that the TNI-ER for tanks computed using Equivalent Risk tends to increase with decreasing survival probability, $S_Y(y)$. This occurs, because, as the tank ages, it is no longer subject to many of the failure mechanisms that may have impacted younger tanks. The opposite is also true, i.e., the Equivalent Risk decreases with increasing survival probability, which accounts for the fact if a tank is young, the impact of certain failure mechanisms, like excessive tank bottom corrosion, may not have had sufficient time to produce a failure. Thus, the TNI-ER computed when $S_Y(y)<50\%$ is greater than when $S_Y(y)>50\%$. This result may seem counterintuitive, but it is correct. Once the tank has aged through one or more of these failure mechanisms without experiencing failure, it will have a longer service life expectancy, i.e., the longer the tank survives, the longer the tank will survive. Table X10.1 illustrates how TNI-ER changes for different ages and survival probabilities based on the graphical illustrations in FIGS. X10.1-X10.4 in Appendix X10.

The tank owner/operator can take advantage of a higher survival probability in determining TNI in this method if a previous out-of-service API 653 internal inspection has been and meets the minimum criteria specified in this method. Steps 9 through 11 describe methods of determining TNI-α when a previous out-of-service API 653 internal inspection is used and how it can be used in determining TNI with TNI-ER.

Activity 5 (Steps 9 through 11): Determine TNI-α

Step 9—Determine if a Previous Out-of-Service API 653 Internal Inspection is Available and Can Be Used? Steps 9-11 are used to a second estimate of TNI (i.e., TNI-α), but only if (1) a previous out-of-service API 653 internal inspection has been conducted that meets the minimum criteria specified below and (2) the tank bottom has a survival probability at time when this method is being applied, to, that is greater than 50%. Step 12 describes how to determine TNI using TNI-α and TNI-ER.

Step 9 describes how to determine the minimum thickness, To min, and the maximum corrosion rate, $CR_{0\ max}$, using the measurements made in the last out-of-service API 653 internal inspection. $CR_{0\ max}$ is determined by adjusting the maximum corrosion rate determined in the last API 653 internal inspection, $CR_{P\ maxprev\ API\ 653}$, as described in this method in proportion to the ratio, $CR_{ratio}$, of (a) the uniform corrosion rate, $CR_{0\ avg}$, measured in Step 2 and (b) the uniform corrosion rate, $CR_{P\ avg\ prev\ API\ 653}$, measured at the same approximate location during the previous API 653 inspection. This method sets the adjusted proportional value of $CR_{ratio}$ to 0.50 if $CR_{ratio}<0.50$, and to 2.0, if $CR_{ratio}>2.0$. These limits were set to prevent unusually small or unusually large values of $CR_{ratio}$ from being calculated and used due to the small values of the uniform corrosion rates typically measured. In general, it is expected that $CR_{ratio}$ will be less than 1.0. Step 11 indicates how to compute TNI-α based on the adjusted tank bottom measurements from the previous internal inspection.

The flowchart in FIG. 2 shows the procedure for determining if and how to use a previous out-of-service API 653 internal inspection in determining TNI-u. As indicated in Step 9, TNI-α can be used only if the survival probability, $S_Y(y)$, of the tank bottom is high. It is important to note that TNI can always be determined using TNI-ER without the use of a previous out-of-service API 653 internal inspection.

It is also important to note that an out-of-service API 653 internal inspection may be qualitatively useful even if the survival probability region is low (less than 50%) or cannot be defined, particularly if the magnitude or the coverage of pitting is very severe. While this method would indicate that TNI=TNI-ER, it really means TNI <TNI-ER, because it is always possible to use a value smaller than what was determined without adversely affecting the result. Thus, even if the survival probability is less than 50%, one could always consider using a value for TNI that is less than TNI-ER, if TNI-α, which is determined from the proportionally adjusted maximum corrosion rate (i.e., minimum bottom thickness), is less than TNI-ER.

Step 9 provides eight criteria that should be met if a previous out-of-service API 653 internal inspection, or equivalent, is used to compute TNI-α. Step 10 provides a list of the measurements or quantities needed to address these criteria. All of these criteria are straightforward and the information needed is what is normally provided in an API 653 report. These criteria are:

(1) What year was the tank constructed, $Y_i$? If a previous out-of-service API 653 internal inspection was performed, what year or date was it performed, $Y_0$? If there has been no previous internal inspections then $t_{P\ age}=Y_i$; otherwise $t_{P\ age}=Y_0$. Criterion: If the information stated is provided to determine $t_{P\ age}$, then Qualification (1) is met.

(2) If an out-of-service API 653 internal inspection was previously performed, were measurements of the maximum external (i.e., bottom or soil side) corrosion penetration depth ($D_{MUCD}$) and of the maximum internal (or topside) corrosion depth ($D_{MICD}$) made before any repairs were made and reported? Also, were the measurements made with instruments that were in calibration at the time of the measurements? Criterion: If the answer is yes to both questions, then Qualification (2) is met and will be used to determine the maximum external corrosion rate and the maximum internal corrosion rate in the previous out-of-service API 653 internal inspection.

(3) Did the report indicate which measurements in (2) were due to local thinning/penetrations and which measurements were due to pitting? Were the pitting or thinning/penetration problems repaired before bringing the tank back into service? Were the root causes of these problems determined and eliminated? Criterion: Qualification (3) is met if the three questions specified above were addressed. If the root causes of the corrosion problems were not eliminated then $CR_{0\ max}$ will be equal to $CR_{P\ max}$, which was determined from the maximum penetration depth before any repairs were made.

(4) Did the report indicate what the measured minimum remaining thickness of the tank bottom after maintenance and repairs was in the previous out-of-service API 653 internal inspection (i.e., RTbc and RTip))? Criterion: Qualification (4) is met if the minimum remaining thickness of the tank bottom after maintenance and repairs was measured and was stated in the report.

(5) If a previous out-of-service API 653 internal inspection has not yet been performed, were measurements of the nominal, average, or minimum thickness of the tank bottom made and reported at the time of installation or refurbishment of the tank before it was brought into service? If yes, what is the thickness and what type of measurements were made? Criterion: If the information stated is provided, then Qualification (5) is met.

(6) Were one or more of the bottom thickness measurements made in the previous API 653 inspection made in the approximate vicinity of those made in Step 2 that can be used to proportionally adjust the maximum corrosion rate determined by the maximum internal and external penetrations during the period covered by the previous API 653 internal inspection by the ratio of the current and previous measurements of the average or uniform corrosion rate of the tank bottom, $CR_{ratio}$, where this ratio will be set to 2.0 if greater than 2.0 and set to 0.50 if less than 0.50. These measurements are normally made in an API 653 internal inspection using a UT sensor. Criterion: Are these measurements on or close to the same plate as those measured in Step 2? If yes, then Qualification (6) is met.

(7) Even if a previous out-of-service API 653 internal inspection report is available, it may not be used, if in the opinion of a PE, a certified API 653 inspector or a SME, there are deficiencies in the report that would disqualify its use. Criterion: Qualification (7) is met if an existing API 653 internal inspection report is not used based on the decision of a PE, a certified API 653 inspector, or a SME.

(8) If a previous out-of-service API 653 internal inspection report is available and if it satisfactorily addresses all seven of the criteria above, then, with one exception, it shall be used be used in determining TNI. The user of this method can make a decision not to use the results of a previous-out-of-service API 653 internal inspection if TNI-α≥TNI-ER and if in the opinion of a PE, a certified API 653 inspector, or a SME, the corrosion conditions reported in the previous out-of-service API 653 internal inspection are not representative of future corrosion conditions. Such a decision may be made, for example, if (a) measurements of the minimum thickness of the tank bottom before repairs have been made were not provided, or (b) measurements of the minimum thickness of the tank bottom after repairs have been made were not provided.

In addition to the eight criteria above, whether or not a previous out-of-service API 653 internal inspection can be used depends on the Survival Probability Age Region at the time of the implementation of this method. As described in Step 9 in Section 5.2.3.2, the survival probability distribution is divided into four Survival Probability Age Regions for this purpose.

The mean, median, or mode (i.e., peak) of the distribution can be used to define the two central Survival Probability Age Regions. If the age of the tank at $t_0$ is in Survival Probability Age Region D, then this method shall not be used and this method recommends that an out-of-service API 653 internal inspection be performed.

Survival Probability Age Region D is defined by the upper 5% tail. If the age of the tank at $t_0$ is in Survival Probability Age Regions A or B, which means the survival probability is greater than or equal to 50%, then a previous out-of-service API 653 internal inspection, which meets the 8 criteria above, can be used to determine TNI-α in Step 11. TNI-α is then used in Step 12 in conjunction with the TNI-ER determined in Step 8 to determine TNI. If the age of the tank at $t_0$ is in Survival Probability Age Regions C, which means the survival probability is less than 50% and greater than 5%, then TNI in Step 12 is determined solely by TNI-ER from Step 8.

Note that while TNI-ER could be determined for Survival Probability Age Region D, it is not used in this method, because it is difficult to accurately define $S_Y(y)$ in this region due to the lack of data used to define $S_Y(y)$ in this region. The user of this method could consider using smaller tails like 2.5% to increase the size of Region C, if it can be demonstrated by a PE, a certified API 653 inspector, or an SME that the tails of the CDF are supported by sufficient data to allow such a definition. This method recommends using the Survival Probability Age Regions as defined in this step.

Step 10—Determine the Minimum Bottom Thickness and the Maximum Corrosion Rate for the Entire Tank Bottom Based on a Previous Out-of-Service API 653 Internal Inspection. a previous out-of-service API 653 internal inspection has been performed and a report is available and meets the minimum criteria specified in Step 9, then a second estimate of TNI can be made (TNI-α). This step requires the determination of the adjusted values of the maximum corrosion rate at $t_0$, $CR_{0\ max}$, and the minimum bottom thickness at $t_0$, $T_{0\ min}$.

Previous Out-of-Service API 653 Internal Inspection. The maximum corrosion rates for the soil side (external or bottom side) and topside corrosion are needed from the previous out-of-service API 653 internal inspection. They are computed by using the maximum penetration depth (before repairs) of the underside (external) corrosion ($D_{MUCD}$) and maximum penetration depth (before repairs) of the topside (internal) corrosion ($D_{MICD}$) divided by the time period over which these penetrations occurred ($t_{duration\ prev\ API\ 653}$). The time period over which the corrosion occurred is the time between the time of the previous API 653 internal inspection and the time prior to that API 653 internal inspection in which the tank bottom thickness was measured. The following measurements or calculated quantities are needed or are based from the previous out-of-service API 653 internal inspection report:

$D_{MUCD}$ is the Maximum Underside Corrosion Depth (or external or soil side corrosion penetration depth) that is determined from the previous API 653 internal inspection before any repairs.

$D_{MICD}$ is the Maximum Internal Corrosion Depth (or topside corrosion penetration depth) that is determined from the previous API 653 internal inspection before any repairs.

$CR_{P\ max\ ext\ prev\ API\ 653}$ is the maximum rate of corrosion on the underside (or external side) determined from the previous out-of-service API 653 internal inspection by dividing $D_{MICD}$ by the time period over which $D_{MICD}$ occurred.

$CR_{P\ max\ intp\ rev\ API\ 653}$ is the maximum rate of corrosion on the topside (or internal side) determined from the previous out-of-service API 653 internal inspection by dividing $D_MIC_D$ by the time period over which $D_{MICD}$ occurred.

$T_{P\ min\text{-}ext\text{-}arprev\ API\ 653}$=RTbc is the minimum remaining thickness from bottom side corrosion after repairs reported in the previous out-of-service API 653 internal inspection were made. If the tank was new or newly re-furbished, then RTbc is typically the average or nominal thickness of the tank bottom.

$T_{P\ min\text{-}int\text{-}arprev\ API\ 653}$=RTip is the minimum remaining thickness from internal corrosion after repairs reported in the previous out-of-service API 653 internal inspection were made. If the tank was new or newly re-furbished, then RTip is typically the average or nominal thickness of the tank bottom.

$T_{MAT}$ is the minimum allowable thickness of the tank bottom determined by Table 4.4 in API 653 (i.e., 0.10 in. for tanks without a RPB and 0.050 in. for tanks with a RPB). This method prefers the use of 0.10 in. when determining TNI, regardless of whether or not an RPB is present.

API 653 indicates that that the maximum soil side (external) and topside (internal) corrosion rate should be set to zero when the tank has effective cathodic protection and when the tank bottom is coated, respectively. API 653 indicates that the corrosion rate used to determine the time to the next internal inspection is calculated using the minimum remaining thickness after repairs have been made assuming a linear rate.

Uniform Corrosion Rate. The uniform corrosion rate of the tank at $t_0$, $CR_{avg}$ at $t_0=CR_{uniform}$ at $t_0$, is determined in Step 2 of this method. The uniform corrosion rate of the tank at $t_P$, $CR_{avg}$ at $t_P=CR_{uniform}$ at $t_P=CR_{avg}$ prey API 653, is determined from those measurement of the tank bottom thickness made in a previous out-of-service API 653 internal inspection at the approximate location of those measurements made in Step 2. The ratio of these uniform corrosion rates, which is defined in Eq. (5.11.7), is used to adjust the values of the bottom corrosion rate made in this previous API 653 internal inspection when determining TNI-α in Step 11.

$$CR_{ratio}=CR_{avg\ at\ t0}/CR_{avg\ at\ tP} \quad (5.11.7)$$

The adjusted corrosion rate and the minimum tank bottom thickness to use in determining TNI-α using UPr, StPr, and $CR_{ratio}$ is given in Eqs. (5.11.8) and (5.11.9).

$$CR_{adj\ max\ prev\ API\ 653}=CR_{max\ prev\ API\ 653}*(CR_{ratio})=(UPr+StPr)*(CR_{ratio}) \quad (5.11.8)$$

$$T_{min\ adj\ prev\ API\ 653}=(T_{P\ prev\ API\ 653}-T_{min\ prev\ API\ 653})*(CR_{ratio}) \quad (5.11.9)$$

where $$T_{MRT\ after\ repairs}=T_{min\ prev\ API\ 653}=\min\{RTbc\ or\ RTip\} \quad (5.11.10)$$

All of these measurements, except $CR_{avg\ at\ t0}$ measured in Step 2, were made during the previous out-of-service API 653 internal inspection.

Step 11—Determine the Time to the Next Internal Inspection (TNI-α) based on Measurements of the Minimum Thickness and Maximum Corrosion Rate Made in Step 10. This method provides a method for determining TNI-α in Survival Probability Age Regions A and B based on the adjusted measurements of the minimum of the remaining underside or internal thickness after repairs, $T_P=T_{MRT\ after\ repairs}=T_{MRT\ prev\ API\ 653}=\min\{RTbc\ or\ RTip\}$ and the sum of the underside and internal corrosion rate, $CR_{max\ prev\ API\ 653}$=UPr+StPr made in the previous out-of-service API 653 internal inspection and determined in Step 10. TNI-α is determined using Eq. (5.11.11).

$$TNI\text{-}\alpha=(T_{MRT\ adj\ prev\ API\ 653}-T_{MAT})/CR_{adj\ max\ prev\ API\ 653} \quad (5.11.11)$$

If $t_0 \geq 10$ years and TNI-α determined using Eq. (5.11.11) is greater than 10 years, this method requires that the user of this method set TNI-α to 10 years. Additional life may be present in the tank bottom, but this would need to be verified by re-applying this method in 10 years.

Table 8 summarizes TNI-α derived as a function of the results of the AECAT test and whether or not a previous out-of-service API 653 internal inspection, which meets the eight criteria in Step 9, is used.

TABLE 8

Summary of the Determination of TNI-α*,**

| Results AECAT | Previous API 653 | CRmax prev API 653 (mpy) | TNI-ER (mpy) | TNI-α (mpy) |
|---|---|---|---|---|
| Pass - No Active Corrosion | No | N/A | Yes | N/A |
| Fail - Active Corrosion | No | N/A | No | N/A |
| Pass - No Active Corrosion | Yes | Adj[$CR_{int}$ + $CR_{ext}$] = | Yes | Yes for Age Regions A&B, where TNI-α ≤ 10 yr |
| Fail - Active Corrosion | Yes | N/A | No | No |
| Fail - Grade C Active Corrosion | Yes | Max {Adj[$CR_{int}$ + $CR_{ext}$]; [$CR_{int}$ + $CR_{ext}$]; <$F_X(x)$>} | Yes | Yes for Age Regions A&B, where TNI-α ≤ 10 yr |

*Max TNI = 10 years; Min TNI = 1 year because Tank meets mm qualifications for use of this method
**$CR_{int}$ = $CR_{P\ max\ int\text{-}br}$; $CR_{ext}$ = $CR_{P\ max\ ext\text{-}br}$; $CR_{max\ prev\ API\ 653}$ = $CR_{P\ max\ prev\ API\ 653}$ Note that this method permits the computation of TNI-α if in the opinion of a PE, a certified API 653 inspector, or a SME, the results of an AECAT test is a Grade C have only mild corrosion and no locations with a concentration of corrosion activity. The maximum corrosion rate used in determining TNI-α is obtained from the maximum of one of the following three corrosion rates: (1) Adj[$CR_{int}$+$CR_{ext}$]; (2) [$CR_{int}$+$CR_{ext}$]; or (3) the mean corrosion rate from $F_X(x)$=<$F_X(x)$>. $CR_{int}$=$CR_{P\ max\ int\ prev\ API\ 653}$ and $CR_{ext}$=$CR_{P\ max\ ext\ prev\ API\ 653}$ in (2) are determined using the maximum penetration depths of the internal and external side of the tank bottom before any repairs have been made that were provided in a previous API 653 internal inspection. The minimum thickness to use in the determination of TNI-α is the thickness determined from the maximum corrosion rate determined in (1)-(3).

Activity 6 (Step 12): Determine TNI from TNI-ER and TNI-α.

Step 12—Determine TNI from TNI-ER and TNI-α. The objective of Step 12 is to determine the time to the next out-of-service API 653 internal inspection (TNI=$t_N$–$t_0$) based on the appropriate combination of TNI-ER and TNI-α. TNI-ER is determined in Step 8, and TNI-α is determined in Step 11.

TNI is summarized in Tables 9 and 10. Table 9 presents an overview for each Survival Probability Age Region, and Table 10 presents a detail summary on how to compute TNI from TNI-ER and TNI-α for the different combinations of the AECAT test results and the previous API 653 internal inspection results provided in Step 11.

TABLE 9

Computation of the Time to the Next Out-of-Service API 653 Internal Inspection (TNI)

| Survival Age Region | Integrity Test Result | TNI-ER | TNI-α | TNI |
|---|---|---|---|---|
| A | PASS | Max {TNI-ER; 1 yr} | TNI-α | Combination of TNI-ER & TNI-α (1 to 10 yrs) |
| B | PASS | Max {TNI-ER; 1 yr} | TNI-α | Combination of TNI-ER & TNI-α (1 to 10 yrs) |
| C | PASS | TNI-ER | N/A | TNI-ER (1 to 10 yrs) |
| D | PASS or FAIL | API 653 Internal Inspection Recommended | N/A | API 653 Internal Inspection Recommended |

TNI is dependent on the Survival Probability Age Region. As stated in Step 9, if the age of the tank at the time, to, falls into Survival Probability Age Region D, then this method cannot be used, and this method recommends that an out-of-service API 653 internal inspection be performed. If the age of the tank falls into Survival Age Region A or B and additional tank bottom information is provided through a previous out-of-service API 653 internal inspection that meets the criteria in Step 9, then TNI-α can be determined in Step 11 and used in combination with TNI-ER determined in Step 8 to determine TNI in Step 12. If the age of the tank falls into Survival Age Region C, which means the survival probability is less than or equal to 50% (or the mean or the mode of the distribution), then TNI-α cannot be used, and TNI is determined solely by TNI-ER.

TNI will be limited to a maximum of 10 years. If TNI is greater than 10 years, it will be set equal to 10 years. If TNI is less than 1 year, it will be set equal to 1 year (provided that the tank passed a leak detection integrity test). A re-assessment may be performed at the end of the TNI time interval using this method to determine whether or not additional service still remains 1993 in the tank bottom and whether or not TNI can be updated. If not, this method recommends that an out-of-service API 653 internal inspection be performed. To be in compliance with API 653, the total time between out-of-service API 653 internal inspections ($t_N$–$t_P$) should not be any longer than that specified in API 653 for tanks with an RPB, 30 years, and tanks without an RPB, 20 years. Thus, TNI shall be equal to (20–$t_0$) if ($t_N$–$t_P$)≥20 yrs without a RPB and (30–$t_0$)≥30 yrs with a RPB.

This method allows, however, for the completion of the TNI time period that may exceed these maxima under the supervision of a certified API 653 inspector for a TNI time interval determined using the Min{TNI-ER; avg[TNI-ER; TNI-α] } in Table 10 provided that (1) this maximum time interval has not been exceeded previously; (2) an API 653 external inspection was performed and passed at the time of the application of this method; (3) the AECAT showed no active corrosion activity with a passing test result of Grade A; and (4) the thickness of the bottom should not be less than $T_{MAT}$ at any time during TNI as determined using the mean maximum corrosion rate due to pitting determined from $F_X(x)$ in Step 4 (or Table 7).

As indicated in Table 10, TNI is more heavily weighted for TNI-ER than for TNI-α, because TNI-ER is based upon the most recent measurements of the tank bottom. The tank bottom measurements made in a previous out-of-service API 653 internal inspection are weighted less, because they were usually obtained at least 10 years earlier and any serious corrosion of the tank bottoms was most likely addressed and repaired. Even so, this previous inspection is important because of the potential for any local pitting or thinning/ penetrations in the tank bottom that were present in the previous inspection to reoccur in the future.

bottom thickness sensor systems used to implement this method, however, shall have a precision of 0.010 in., or less,

TABLE 10

Summary of the Determination of TNI from TNI-ER and TNT-α

| AECAT | Previous API 653 | TNI-ER (mpy) | TNI-α (mpy) | TNI (mpy) |
|---|---|---|---|---|
| Pass - No Active Corrosion | No | Yes, if AECAT is Grades A/B | N/A | TNI-ER* |
| Fail - Active Corrosion | No | No | N/A | No |
| Pass - No Active Corrosion | Yes | Yes, if AECAT is Grades A/B | Yes for Age Regions A&B | Max {TNI-ER; avg[TNI-ER;TNI-α]}*,** |
| Fail - Active Corrosion | Yes | No | No | No |
| Fail - Active Corrosion | Yes | Yes, if AECAT is Grade C*** | Yes for Age Regions A&B | Min{TNI-ER; TNI-α; avg[TNI-ER;TNI-α]} |

*Max TNI = 10 years, before a re-assessment or an out-of-service API 653 internal inspection should be performed. TNI is normally limited by the maximum time interval between out-of-service internal inspections.
**TNI may exceed the maximum time specified in API 653 between out-of-service internal inspections if TNI is determined as the Min{TNI-ER; avg[TNI-ER; TNI-α]} and all three criteria specified for this allowance are approved by a PE, an SME, or a certified API 653 inspector.
***Grade C as modified by this method and approved by a PE, an SME, or a certified API 653 inspector.

5.12 Calculation or Interpretation of Results

The output of this method is TNI, which is an update of the internal inspection interval, which was previously determined for the tank of interest in the last out-of-service API 653 internal inspection or when the tank was newly installed or newly re-furbished. The magnitude of TNI is based on the actual condition of the tank bottom at the time of application of this method. This method is based on in-service measurements performed within industry practice. When $T_{MAT}$ is used to determine TNI, which is followed by API 653 and is the recommended approach of this method, TNI is very conservative and has a built-in factor of safety. This method limits TNI to 10 years or less, but allows TNI to be updated at the completion of the TNI time interval by re-applying this method. This method limits the total time between out-of-service API 653 internal inspections to the time specified in API 653. Currently, the total time between out-of-service API 653 internal inspections is limited to 20 yrs for ASTs with an RPB and to 30 yrs for ASTs with an RPB. TNI can be calculated by using the equations in this method or by using the Excel-compatible Workbook provided to support this method.

It is important to note that the purpose of this method is to determine the time until the next out-of-service API 653 internal inspection should be considered without having a tank bottom failure. The method is designed to be conservative. Thus, it will be very possible that additional life remains in the tank bottom after the first TNI time interval has transpired and another implementation of the method might show that there is additional life in the tank bottom. Furthermore, it is also important to note that the purpose of this method is not to make an estimate the life expectancy of the tank bottom nor is it to make an accurate estimate of the minimum thickness or the maximum corrosion rate of the tank bottom.

5.13 Report

The output of this method, which is TNI, can be reported to the tank owner/operator using the Standard Form in Annex 1, or a form or report that includes this information.

5.14 Precision and Bias

The sensor systems and the measurement, test, and inspection methods used to implement this method shall meet the performance requirements specified by the manufacturers of the measurement sensors and systems. The tank bottom thickness sensor systems used to implement this method, however, shall have a precision of 0.010 in., or less, and a bias of 0.010 in., or less, as verified by the manufacturer's specification and an annual calibration. The precision and bias of the bottom thickness measurements made in Step 2 and in Step 10, if a previous out-of-service API 653 internal inspection report is used, is described below and shall be reported.

As illustrated by Eqs. (5.14.1) and (5.14.2), the output of this method, TNI, could be determined from the thickness measurements of the tank bottom and the corrosion rate determined from them.

$$TNI = (T_{0\ min-br} - T_{MAT})/CR_{max} \quad (5.14.1)$$

where $$CR_{max} = CR_{0\ max} = [(T_{P\ min-ar} - T_{0\ min-br})/(t_0 - t_P)] \quad (5.14.2)$$

In Eqs. (5.14.1) and (5.14.2), $T_{0\ min-br}$ is the minimum thickness of the tank bottom measured at $t_0$ before any repairs have been made, $T_{P\ min-ar}$ is the minimum thickness of the tank bottom measured at $t_P$ after tank bottom repairs have been made, and $CR_{0\ max}$ is the maximum corrosion rate determined during the time period between to and $t_P$ using the maximum penetration depth, $T_{P\ min-ar} - T_{0\ min-br}$, that has occurred in the tank bottom during this time period. In this method, instead of one value, the full range or distribution, $F_X(x)$, of maximum corrosion rates, $CR_{max}$, that could occur for the tank of interest in Eq. (5.14.2), from the very smallest to the very largest corrosion rates, is actually used to estimate TNI-ER. This allows the application of this method to any tank with or subjected to the same corrosion and operational conditions.

Step 4 describes two methods of determining maximum corrosion rate distribution, $F_X(x)$, but both methods require measurements of the tank bottom thickness at two points in time, $T_P$ at $t_P$ after repairs, and $T_{0\ min}$ at $t_0$ before repairs, to determine the maximum corrosion rate, $CR_{max}$, to develop this distribution. For simplicity, in this method, the precision and bias will be specified in terms of the precision and bias of making these bottom thickness measurements as if only one value of $T_P$ and $T_{0\ min}$ were required. This method requires that the bottom thickness measurement sensor system used to measure bottom thickness and corrosion rate at $t_0$ and $t_P$ have a precision of 0.010 in., or less, and a bias of 0.010 in., or less, where the actual precision and bias of these sensors is dependent upon the manufacturer's specification or the annual calibration of these sensors, and how many measurements are averaged together when making bottom thickness measurements at each location.

The 0.010-in. precision and bias requirements for measuring $T_P$ and $T_{0\ min}$ in this method were specified to insure that even if $CR_{max}$ determined from measurements of $T_{0\ min}$ and $T_P$ had a value equal to the three standard-deviation (SD) measure error in both the precision and the bias, the resulting maximum corrosion rate would not be large enough to exceed the $T_{MAT}$ thickness during the entire TNI period, where $T_{MAT}$ is the thickness at which tank bottom failure is defined. For most ASTs, $T_{MAT}$ is set equal to 0.10 in. As defined by API 653, the smallest value of $T_{MAT}$ is 0.050 in.; this value can be used if a release prevention barrier exists. If the AST does not include a release prevention barrier, however, then $T_{MAT}$ is 0.10 in.

Eq. (5.14.3) defines the one SD error in determining $CR_{max}$ in Eq. (5.14.2), $S_{CRmax}$, by the one standard deviation error in the difference term of $T_{P\ min-ar} - T_{0\ min-br}$, $S_{TP\ min-ar} - T_{0\ min-br}$, that is used to determine $CR_{max}$ as $$S_{TP\ min-ar} - T_{0\ min-br} = [((S_{TP\ min-ar}/n_P)^2 + (S_{T0\ min-br}/n_0)^2)]^{0.5}, \quad (5.14.3)$$

where $S_{CRmax} = S_{TP\ min-ar} - T_{0\ min-br}/(t_P - t_0)$; $S_{TP\ min-ar}$ is the precision or bias of the sensor system used to measure bottom thickness for a single measurement at time, $t_P$; $S_{T0\ min}$ is the precision or bias sensor system used to measure bottom thickness for a single measurement at time, $t_P$; $n_P$ is typically determined by one measurement made during the previous out-of-service API 653 internal inspection; and no is specified in this method in Step 2 as 8 to 10 in-service measurements at a location. The one SD error in $S_{CRmax}$ can be estimated using Eq. (16.3), because the error in measuring time, $t_P$ or $t_0$, is so small that it can be neglected.

Eq. (5.14.3) is used to determine the precision or the bias of the sensor system used to measure bottom thickness and corrosion rate. The combined error is determined from Eq. (5.14.4).

$$S_{Total} = [(S_{Precision})^2 + (S_{Bias})^2]^{0.5}, \quad (5.14.4)$$

where $S_{Precision}$ and $S_{Bias}$ are each defined by Eq. (5.14.3) and $S_{TP}$ and $S_{T0\ min}$ are provided by the manufacturer when the bottom thickness sensor is purchased or from the annual calibration of the sensor.

The precision and bias were specified so that the precision and bias of the bottom thickness sensor is sufficient so that a three standard deviation error in the bottom thickness measurements would not be large enough to offset the margin of safety provided by $T_{MAT}$. Thus, $S_{Precision}$ and $S_{Bias}$ need to be sufficiently small so that $S_{Total}$ satisfies Eq. (5.14.5) such that the minimum thickness, $T_{MT}$, is greater than zero.

$$T_{MT} = T_{MAT} - (3*[S_{Total}]) > 0.0 \quad (5.14.5)$$

As an illustration, $T_{MT}$ equals 0.0050 in., which is greater than zero, for the minimum number of measurements required by this method, i.e., when $T_{MAT}$=0.050 in., $n_P$=1, $n_0$=8, $S_{Precision}$=0.010 in., and $S_{Bias}$=0.010 in. Thus, Eq. (5.14.5) is always satisfied provided that $T_{MAT} \geq 0.050$ in., $n_P \geq 1$, $S_{Precision} \leq 0.010$ in., and $S_{Bias} \leq 0.010$ in., $n_P > 1$ and that $n_0 > 8$. This precision and bias is very conservative, because as described below, in most instances, standard industry practice uses bottom thickness sensors with a precision and bias of 0.005 in. or less.

This method recognizes that it would have been more direct to establish the precision and bias on TNI itself, either as an absolute error on TNI or as a percentage error on TNI. This is not practical, however, and was not used to define these quantities, because the error in TNI is largest when the corrosion rates are the smallest and provide the least risk to tank bottom failure. To illustrate this point, a set of calculations was performed with $T_{MAT}$=0.05 in., with $n_0$=8 thickness measurements made at $t_0$, and one thickness measurement made at $t_P$, both made using a sensor with a precision and bias of 0.010 in., respectively, where the one standard deviation error in TNI, $SD_{TNI}$, is given by Eq. (5.14.6). The calculations were performed assuming that the bottom thickness measurement, $T_P$, was 0.25 in. at $t_P$, and that the bottom thickness, $T_{0\ min}$, was 0.23 in. for the first set of calculations and 0.17 in. for the second set of calculations. This results in corrosion rates of 2 mpy and 8 mpy, respectively, for the two sets of calculations. For a corrosion rate of 2.0 mpy, TNI=90 years with absolute and % errors of $SD_{TNI}$=5.09 years and 5.7%, respectively. For a corrosion rate of 8 mpy, TNI=15 years with absolute and % errors of $SD_{TNI}$=0.49 years and 3.2%, respectively. Clearly, while the error is largest for the smaller corrosion rate (i.e. errors of 5.09 years versus 0.49 years or 5.7% versus 3.2%), the risk of tank bottom failure is definitely less for the smaller corrosion rate, because the TNI=90 years computed for the smaller corrosion rate is so much greater than the TNI=15 years computed for the higher corrosion rate.

$$\text{One SD Error of TNI in years} = SD_{TNI} = TNI*[\{(S_{T0\ min-br-TMAT}/n_0)^2/(T_0-T_{MAT})\} + \{((S_{TP\ min-ar}/n_P)^2 + (S_{T0\ min-br}/n_0)^2)/(CR_{max} = [(T_{P\ min-ar}-T_{0\ min-br})/(t_P-t_0)])\}]^{0.5} \quad (5.14.6)$$

It should be noted that the precision and bias for the measurement sensor or sensor systems used to measure the thickness and to determine corrosion rate in an out-of-service API 653 internal inspection are not specified in API 653. Instead, Appendix G of API 653 specifies in detail the criteria for how the tank bottom measurements should be made during an internal inspection.

Historically, the commonly accepted industry practice for the measurement of the bottom thickness measurements made by tank owners/operators, or their contractors, requires the use of measurement sensors with a precision and bias of 0.010 in., or better. In general, the bottom thickness measurements made as part of an out-of-service API 653 internal inspection are made with an ultrasonic (UT) sensor and a pitting caliper. The UT sensors that are used typically have a precision and bias of 0.005 in. and sometimes as low as 0.002 in. The resolution for these measurements is usually 0.001 in. to 0.002 in. The pitting calipers used typically have a precision and bias of 0.005 in. Thickness sensor measurement errors of 0.010, 0.005, and 0.002 in. result in relative thickness errors of 4.0, 2.0, and 0.8%, respectively, for a typical tank bottom that has a thickness of 0.25 in.

What is claimed:

1. A method for determining a time to the next out-of-service internal inspection of a steel aboveground storage tank (AST) containing refined petroleum products, TNI, from the time of application of this method, comprising the steps of:
   (a) performing and passing a leak detection integrity test;
   (b) measuring the thickness of the tank bottom in at least one location of the tank;
   (c) generating a survival probability distribution of said tank bottom from a corrosion rate probability distribution generated from empirical corrosion rate data that is based on the corrosion conditions of said tank;
   (d) generating a Bayesian update of said survival probability distribution for said tank; and
   (e) calculating TNI=TNI-ER from said survival probability distribution and said Bayesian update of said survival probability distribution by differencing the times when the probability of survival determined from said survival probability distribution at the time of application of said method is equal to the probability determined from said Bayesian update of said survival probability distribution.

2. The method of claim 1, where said next out-of-service internal inspection of said tank bottom, TNI=TNI-ER, is calculated in 1(e) from said probability of survival in 1(c) by differencing the times when said probability of survival determined from said survival probability distribution at the time of the application of said method and the time when said square of said probability of survival occurs.

3. The method of claim 1, where said TNI determined in claim 1 is also used to determine a time at which the method may be re-applied to determine if an out-of-service internal inspection needs to be performed.

4. The method of claim 1, where said method in claim 1 is also performed to update a time to the next out-of-service internal inspection of said tank.

5. The method of claim 1, where said method is used to prioritize the order for performing tank inspections.

6. The method of claim 1, further comprising making measurements of the corrosion of the tank bottom made using an acoustic emission (AE) corrosion activity test (AECAT) to support the determination of TNI.

7. The method of claim 6, where TNI is determined if said tank bottom passes said AECAT, where passing said AECAT means that said AECAT indicates no more than minimal active corrosion activity and no localized active corrosion activity of said tank bottom.

8. The method of claim 6, where said AECAT is performed using AE sensors submerged in the liquid product with at least three sensors, where at least one of said AE sensors is at a different elevation than the other remaining AE sensors.

9. The method of claim 6, where said AECAT is performed using AE sensors mounted on the external wall of an AST with at least three sensors, where at least one of said AE sensors is at a different elevation than the other remaining AE sensors.

10. The method of claim 1, further comprising an external inspection of said tank to support the determination of TNI.

11. The method of claim 10, where TNI is determined if said tank passes said external inspection, where passing said external inspection means said external inspection does not indicate damage, maintenance, or repair to said tank that would need service before the end of said TNI time period as determined in claim 1.

12. The method of claim 1, where said TNI=TNI-ER is determined by Equivalent Risk.

13. The method of claim 1, where said thickness of the tank bottom in at least one location of the tank is used to estimate the minimum thickness of the entire bottom of said tank.

14. The method of claim 1, where the corrosion rate determined from said thickness of the tank bottom in at least one location of the tank is used to estimate the maximum corrosion rate for the entire tank bottom of said tank.

15. The method of claim 1, where additional measurements obtained from an out-of-service internal inspection of the corrosion of the entire tank bottom of said tank are used to determine a second estimate of the time to the next internal inspection, TNI-$\alpha$, if the survival probability of said tank bottom is high, typically greater than 50%, and if said additional measurements can be used to determine the uniform and maximum corrosion rate of the tank bottom from the average thickness and the minimum thickness of said tank bottom.

16. The method of claim 1, where said thickness is measured with an ultrasonic thickness (UT) sensing system that measures the average thickness of said tank bottom.

17. The method of claim 1, where a method for determining whether the bottom of a tank has survived to the time of application of this method, comprised of a leak detection integrity test for a double-bottom storage tank with an in-tank measurement method that measures the physical or chemical properties inside the interstitial space of said double bottom.

18. The method of claim 17, where said in-tank measurement method is a pressure-based method that changes pressure in said interstitial space due a leak.

19. The method of claim 18, where said in-tank measurement method is a pressure-based method that measures said pressure with a pressure sensor, where said pressure in said interstitial space is initially atmospheric pressure at the beginning of a test, increases in pressure due to a leak.

20. The method of claim 19, where said pressure can be an absolute or differential pressure sensor.

21. The method of claim 19, where said initial pressure can be a negative pressure or positive pressure.

22. The method of claim 19, where said in-tank measurement method is comprised of a temperature sensing system for compensating the pressured-based temperature changes in said interstitial space and a pressure sensor for measuring atmospheric pressure outside said interstitial space for compensating atmospheric-based pressure changes in said interstitial space.

23. The method of claim 17, where said in-tank measurement method is a gas-sensing system capable of sensing a release of gas from any product released into said interstitial space.

24. The method of claim 17, where said in-tank measurement method is a gas-sensing system capable of sensing a release of gas from any tracer in any product released into said interstitial space.

25. The method of claim 17, where said in-tank measurement method is a liquid monitoring system capable of sensing an accumulation of liquid from the release of any product into said interstitial space.

26. The method of claim 17, where said in-tank measurement method is a cable-based sensing system capable of sensing a release of any liquid product into said interstitial space.

27. The method of claim 1, where a method for determining whether the bottom of a tank has survived to the time of application of this method, comprised of a leak detection integrity test for a double-bottom storage tank with an ex-tank measurement method that measures the physical or chemical properties that has been released from the interstitial space of said double bottom.

28. The method of claim 1, where said thickness measurement system is a magnetic flux sensing system.

29. The method of claim 1, where said thickness measurement system is an EMAT sensing system.

30. The method of claim 1, where said thickness measurement system is a LRUT sensing system.

31. The method of claim 1, where said leak detection integrity test is performed using a mass-based leak detection system and said thickness measurement is made using an ultrasonic thickness (UT) sensing system.

32. The method of claim 31, where said leak detection integrity test is an LRDP.

* * * * *